(12) United States Patent
Choi et al.

(10) Patent No.: US 10,911,818 B2
(45) Date of Patent: Feb. 2, 2021

(54) ELECTRONIC DEVICE AND METHOD FOR CONTROLLING THE SAME

(71) Applicant: Samsung Electronics Co., Ltd., Suwon-si (KR)

(72) Inventors: Bo-Kun Choi, Seoul (KR); Doo-Suk Kang, Suwon-si (KR); Yong-Joon Jeon, Hwaseong-si (KR); Geon-Soo Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 120 days.

(21) Appl. No.: 15/784,435

(22) Filed: Oct. 16, 2017

(65) Prior Publication Data

US 2018/0109751 A1 Apr. 19, 2018

(30) Foreign Application Priority Data

Oct. 18, 2016 (KR) .................. 10-2016-0134819

(51) Int. Cl.
*H04N 5/232* (2006.01)
*H04N 21/422* (2011.01)
*G06F 3/0488* (2013.01)
*G06K 9/00* (2006.01)
*G06F 1/16* (2006.01)
(Continued)

(52) U.S. Cl.
CPC ..... *H04N 21/42204* (2013.01); *G06F 1/1694* (2013.01); *G06F 3/011* (2013.01); *G06F 3/0304* (2013.01); *G06F 3/0416* (2013.01); *G06F 3/0488* (2013.01); *G06F 3/04815* (2013.01); *G06K 9/00624* (2013.01); *G06K 9/00671* (2013.01); *H04N 5/23296* (2013.01); *G06F 3/041* (2013.01); *G06F 2203/04105* (2013.01); *G06F 2203/04806* (2013.01); *G06K 9/00798* (2013.01); *G06T 7/70* (2017.01); *H04N 5/23216* (2013.01); *H04N 5/374* (2013.01); *H04N 5/44504* (2013.01); *H04N 21/42224* (2013.01)

(58) Field of Classification Search
None
See application file for complete search history.

(56) References Cited

U.S. PATENT DOCUMENTS

| 5,719,944 | A | 2/1998 | Banerjea |
|---|---|---|---|
| 6,256,043 | B1 | 7/2001 | Aho et al. |

(Continued)

*Primary Examiner* — Twyler L Haskins
*Assistant Examiner* — Wesley J Chiu
(74) *Attorney, Agent, or Firm* — Jefferson IP Law, LLP

(57) ABSTRACT

An electronic device and a method thereof are provided. The electronic device includes a housing including a first surface that faces in a first direction and a second surface that faces in a second direction which is an opposite direction of the first direction, a touchscreen display disposed between the first surface and the second surface and exposed through the first surface, a pressure sensor disposed between the first surface and the second surface and configured to detect a pressure by an external object on the touchscreen display, an image sensor disposed to be exposed through the second surface, a wireless communication circuit disposed inside the housing, at least one processor electrically connected with the touchscreen display, the pressure sensor, the image sensor, and the wireless communication circuit, and a memory electrically connected with the at least one processor.

10 Claims, 25 Drawing Sheets

(51) Int. Cl.
  *G06F 3/041* (2006.01)
  *G06F 3/01* (2006.01)
  *G06F 3/03* (2006.01)
  *G06F 3/0481* (2013.01)
  *G06T 7/70* (2017.01)
  *H04N 5/374* (2011.01)
  *H04N 5/445* (2011.01)

(56) References Cited

U.S. PATENT DOCUMENTS

| | | | |
|---|---|---|---|
| 6,567,085 B1 | 5/2003 | Edmark | |
| 8,893,164 B1 | 11/2014 | Teller | |
| 9,026,947 B2 * | 5/2015 | Lee | H04N 5/23216 715/851 |
| 9,251,722 B2 * | 2/2016 | Miyazawa | G06F 3/04883 |
| 2010/0115455 A1 * | 5/2010 | Kim | G06F 3/04883 715/781 |
| 2010/0215250 A1 * | 8/2010 | Zhu | G06T 17/05 382/154 |
| 2011/0310087 A1 * | 12/2011 | Wright, Jr. | G06T 13/80 345/419 |
| 2013/0086517 A1 * | 4/2013 | Van Lancker | G06F 3/04815 715/800 |
| 2013/0174087 A1 * | 7/2013 | Chen | G06F 3/0488 715/800 |
| 2013/0332066 A1 * | 12/2013 | Jeung | G01C 21/3602 701/420 |
| 2014/0344671 A1 * | 11/2014 | Wang | G06F 17/211 715/234 |
| 2015/0185873 A1 * | 7/2015 | Ofstad | G06F 16/29 345/158 |
| 2016/0124468 A1 * | 5/2016 | Kim | G06F 1/1626 345/173 |
| 2017/0205885 A1 * | 7/2017 | Schpok | G06F 3/0481 |

* cited by examiner

ELECTRONIC DEVICE AND METHOD FOR CONTROLLING THE SAME

CROSS-REFERENCE TO RELATED APPLICATION(S)

This application claims the benefit under 35 U.S.C. § 119(a) of a Korean patent application filed on Oct. 18, 2016 in the Korean Intellectual Property Office and assigned Serial number 10-2016-0134819, the entire disclosure of which is hereby incorporated by reference.

TECHNICAL FIELD

The present disclosure relates to electronic devices. More particularly, the present disclosure relates to methods for controlling reality services, such as virtual reality/augmented reality, using a pressure sensor and/or touch sensor of an electronic device.

BACKGROUND

The growth of electronic technology led to the development and spread of various types of electronic products. Among others, multi-functional electronic devices, such as smartphones or tablet personal computers (PCs), are recently being used more often.

The use of such electronic devices enables an implementation of reality service, e.g., virtual reality (VR) and/or augmented reality (AR). There is an ongoing effort to facilitate to control reality services by manipulation that is more intuitive and simple in a reality service environment.

Upon performing a reality service, a touch input and a pressure input may selectively be made depending on the intention to control the operation of an electronic device. As such, when there are multiple input sources for an electronic device, the user is required to study or learn more, overburdening the user.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an electronic device that may minimize the user's learning, which is required for virtual reality (VR) or augmented reality (AR), according to, e.g., the type, position, magnitude, strength, duration, number of times, or direction of input through a pressure sensor and/or touch sensor of the electronic device and that enables the user to intuitively control through an intuitive user interface (UI)/user experience (UX) corresponding to the characteristic of the input and a method for controlling the electronic device.

Another aspect of the present disclosure is to provide an electronic device may comprise a housing including a first surface that faces in a first direction and a second surface that faces in a second direction which is an opposite direction of the first direction, a touchscreen display disposed between the first surface and the second surface and exposed through the first surface, a pressure sensor disposed between the first surface and the second surface and configured to detect a pressure by an external object on the touchscreen display, an image sensor disposed to be exposed through the second surface, a wireless communication circuit disposed inside the housing, at least one processor electrically connected with the touchscreen display, the pressure sensor, the image sensor, and the wireless communication circuit, and a memory electrically connected with the at least one processor, wherein the memory may store instructions executed to enable the at least one processor to display a user interface on the touchscreen display, the user interface configured to show an image or a video based on at least a portion of data from the image sensor, detect a touch input for an object in the image or the video through the touchscreen display, display information related to the object on the user interface, detect a pressure by the external object on the touchscreen display using the pressure sensor while the image or the video is displayed, and perform a zooming operation on the image sensor based on at least a portion of the detected pressure.

In accordance with an aspect of the present disclosure, an electronic device is provided. The electronic device includes a housing including a first surface that faces in a first direction and a second surface that faces in a second direction which is an opposite direction of the first direction, a touchscreen display disposed between the first surface and the second surface and exposed through the first surface, an image sensor disposed to be exposed through the second surface, a wireless communication circuit disposed inside the housing, at least one processor electrically connected with the touchscreen display, the image sensor, and the wireless communication circuit and a memory electrically connected with the at least one processor, wherein the memory may store instructions executed to enable the at least one processor to display a user interface on the touchscreen display, the user interface configured to show an image or a video based on at least a portion of data from the image sensor, detect a first input for an object in the image or the video through the touchscreen display, display information related to the object on the user interface, detect a second input while the image or video is displayed, and perform a zooming operation on the image sensor in response to the second input.

In accordance with another aspect of the present disclosure, an electronic device is provided. The electronic device includes a housing including a first surface that faces in a first direction and a second surface that faces in a second direction which is an opposite direction of the first direction, a touchscreen display disposed between the first surface and the second surface and exposed through the first surface, a pressure sensor disposed between the first surface and the second surface and configured to detect a pressure by an external object on the touchscreen display, an image sensor disposed to be exposed through the second surface, a wireless communication circuit disposed inside the housing, at least one processor electrically connected with the touchscreen display, the pressure sensor, the image sensor, and the wireless communication circuit, and a memory electrically connected with the at least one processor, wherein the memory may store instructions executed to enable the at least one processor to display a user interface on the touchscreen display, the user interface configured to show an image or a video stored in the memory and/or received through the wireless communication circuit, detect a touch input for an object in the image or the video through the touchscreen display, display information related to the object on the user interface, detect a pressure by the external object on the touchscreen display using the pressure sensor while the image or the video is displayed, and perform a visual effect operation related to the image or video based on at least a portion of the detected pressure.

In accordance with another aspect of the present disclosure, an electronic device is provided. The electronic device includes an image sensor obtaining image data, a communication circuit receiving information related to the obtained image data from at least one external electronic device, a display outputting at least a portion of the obtained image data or the information related to the obtained image data, an input sensor detecting at least one input, and at least one processor configured to determine a current view point of the electronic device based on the obtained image data, when the input is detected while displaying a first virtual image generated at the determined current view point, determine a virtually-shifted view point of the electronic device corresponding to the detected input, and display a second virtual image generated at the determined virtually-shifted view point.

In accordance with another aspect of the present disclosure, a method for controlling an electronic device is provided. The method for controlling the electronic device includes obtaining image data, determining a current view point of the electronic device based on the obtained image data, when an input is detected while displaying a first virtual image generated at the determined current view point, determining a virtually-shifted view point of the electronic device corresponding to the detected input, and displaying a second virtual image generated at the determined virtually-shifted view point.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent the following description taken in conjunction with the accompanying drawings, in which.

Throughout the drawings, like reference numerals will be understood to refer to like parts, components, and structures.

DETAILED DESCRIPTION

Figure 1:
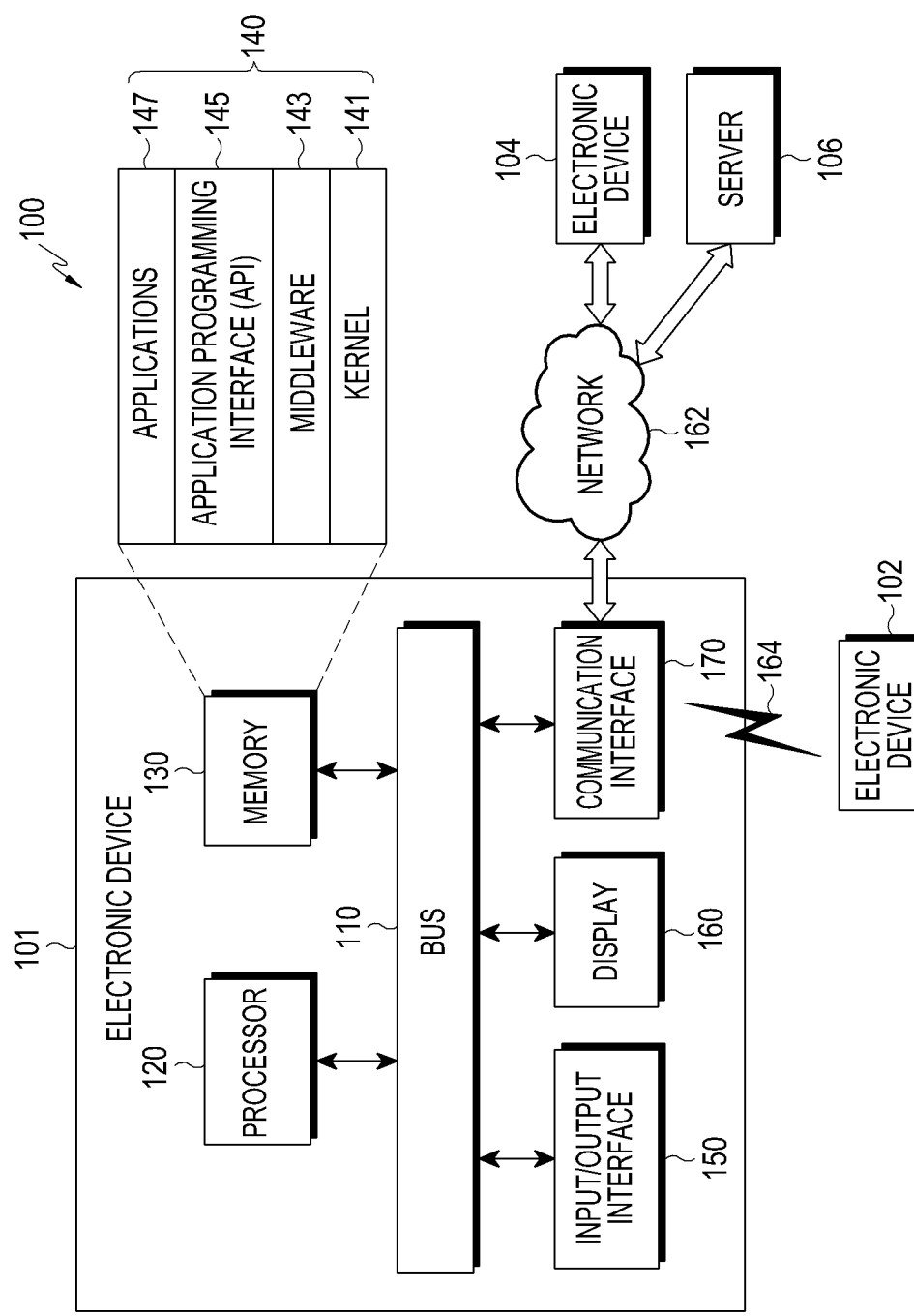
FIG. 1 is a view illustrating an electronic device in a network environment according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The same or similar reference denotations may be used to refer to the same or similar elements throughout the specification and the drawings. It is to be understood that the singular forms "a," "an," and "the" include plural references unless the context clearly dictates otherwise. As used herein, the terms "A or B" or "at least one of A and/or B" may include all possible combinations of A and B. As used herein, the terms "first" and "second" may modify various components regardless of importance and/or order and are used to distinguish a component from another without limiting the components. It will be understood that when an element (e.g., a first element) is referred to as being (operatively or communicatively) "coupled with/to," or "connected with/to" another element (e.g., a second element), it can be coupled or connected with/to the other element directly or via a third element.

As used herein, the terms "configured to" may be interchangeably used with other terms, such as "suitable for," "capable of," "modified to," "made to," "adapted to," "able to," or "designed to" in hardware or software in the context. Rather, the term "configured to" may mean that a device can perform an operation together with another device or parts. For example, the term "processor configured (or set) to perform A, B, and C" may mean a generic-purpose processor (e.g., a central processing unit (CPU) or application processor) that may perform the operations by executing one or more software programs stored in a memory device or a dedicated processor (e.g., an embedded processor) for performing the operations.

For example, examples of the electronic device according to embodiments of the present disclosure may include at least one of a smartphone, a tablet personal computer (PC), a mobile phone, a video phone, an e-book reader, a desktop PC, a laptop computer, a netbook computer, a workstation, a server, a personal digital assistant (PDA), a portable multimedia player (PMP), a Moving Picture Experts Group Layer-3 (MPEG-1 or MPEG-2) audio layer 3 (MP3) player, a medical device, a camera, or a wearable device. The wearable device may be included in at least one of an accessory-type device (e.g., a watch, a ring, a bracelet, an anklet, a necklace, glasses, contact lenses, or a head-mounted device (HMD)), a fabric- or clothes-integrated device (e.g., electronic clothes), a body attaching-type device (e.g., a skin pad or tattoo), or a body implantable device. In some embodiments, examples of the electronic device may include at least one of a television (TV), a digital versatile disc (DVD) player, an audio player, a refrigerator, an air conditioner, a cleaner, an oven, a microwave oven, a washer, a drier, an air cleaner, a set-top box, a home automation control panel, a security control panel, a TV box (e.g., Samsung HomeSync™, Apple TV™, or Google TV™) a gaming console (Xbox™, PlayStation™), an electronic dictionary, an electronic key, a camcorder, or an electronic picture frame.

According to an embodiment of the present disclosure, the electronic device may include at least one of various medical devices (e.g., diverse portable medical measuring devices (a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global navigation satellite system (GNSS) receiver, an event data recorder (EDR), a flight data recorder (FDR), an automotive infotainment device, an sailing electronic device (e.g., a sailing navigation device or a gyro compass), avionics, security devices, vehicular head units, industrial or home robots, drones, automatic teller's machines (ATMs), point of sales (POS) devices, or internet of things (IoT) devices (e.g., a bulb, various sensors, a sprinkler, a fire alarm, a thermostat, a street light, a toaster, fitness equipment, a hot water tank, a heater, or a boiler). According to various embodiments of the disclosure, examples of the electronic device may at least one of part of a piece of furniture, building/structure or vehicle, an electronic board, an electronic signature receiving device, a projector, or various measurement devices (e.g., devices for measuring water, electricity, gas, or electromagnetic waves). According to embodiments of the present disclosure, the electronic device may be flexible or may be a combination of the above-enumerated electronic devices. According to an embodiment of the present disclosure, the electronic device is not limited to the above-listed embodiments. As used herein, the term "user" may denote a human or another device (e.g., an artificial intelligent electronic device) using the electronic device.

FIG. 1 is a view illustrating an electronic device in a network environment according to an embodiment of the present disclosure.

Referring to FIG. 1, according to an embodiment of the present disclosure, an electronic device 101 is included in a network environment 100. The electronic device 101 may include a bus 110, a processor 120, a memory 130, an input/output interface 150, a display 160, and a communication interface 170. In some embodiments, the electronic device 101 may exclude at least one of the components or may add another component. The bus 110 may include a circuit for connecting the components 110 to 170 with one another and transferring communications (e.g., control messages or data) between the components. The processing module 120 may include one or more of a CPU, an application processor (AP), or a communication processor (CP). The processor 120 may perform control on at least one of the other components of the electronic device 101, and/or perform an operation or data processing relating to communication.

The memory 130 may include a volatile and/or non-volatile memory. For example, the memory 130 may store commands or data related to at least one other component of the electronic device 101. According to an embodiment of the present disclosure, the memory 130 may store software and/or a program 140. The program 140 may include, e.g., a kernel 141, middleware 143, an application programming interface (API) 145, and/or an application program (or "application") 147. At least a portion of the kernel 141, middleware 143, or API 145 may be denoted an operating system (OS). For example, the kernel 141 may control or manage system resources (e.g., the bus 110, processor 120, or a memory 130) used to perform operations or functions implemented in other programs (e.g., the middleware 143, API 145, or application program 147). The kernel 141 may provide an interface that allows the middleware 143, the API 145, or the application 147 to access the individual components of the electronic device 101 to control or manage the system resources.

The middleware 143 may function as a relay to allow the API 145 or the application 147 to communicate data with the kernel 141, for example. Further, the middleware 143 may process one or more task requests received from the application program 147 in order of priority. For example, the middleware 143 may assign a priority of using system resources (e.g., bus 110, processor 120, or memory 130) of the electronic device 101 to at least one of the application programs 147 and process one or more task requests. The API 145 is an interface allowing the application 147 to control functions provided from the kernel 141 or the middleware 143. For example, the API 145 may include at least one interface or function (e.g., a command) for filing control, window control, image processing or text control. For example, the input/output interface 150 may transfer commands or data input from the user or other external device to other component(s) of the electronic device 101 or may output commands or data received from other component(s) of the electronic device 101 to the user or other external devices.

The display 160 may include, e.g., a liquid crystal display (LCD), a light emitting diode (LED) display, an organic light emitting diode (OLED) display, or a microelectromechanical systems (MEMS) display, or an electronic paper display. The display 160 may display, e.g., various contents (e.g., text, images, videos, icons, or symbols) to the user. The display 160 may include a touchscreen and may receive, e.g., a touch, gesture, proximity or hovering input using an electronic pen or a body portion of the user. For example, the communication interface 170 may set up communication between the electronic device 101 and an external electronic device (e.g., a first electronic device 102, a second electronic device 104, or a server 106). For example, the communication interface 170 may be connected with the network 162 through wireless or wired communication to communicate with the external electronic device.

The wireless communication may include cellular communication which uses at least one of, e.g., long term evolution (LTE), long term evolution-advanced (LTE-A), code division multiple access (CDMA), wideband code division multiple access (WCDMA), universal mobile telecommunication system (UMTS), wireless broadband (WiBro), or global system for mobile communication (GSM). According to an embodiment of the present disclosure, the wireless communication may include at least one of, e.g., Wi-Fi, bluetooth, bluetooth low power (BLE), zigbee, near field communication (NFC), magnetic secure transmission (MST), radio frequency, or body area network (BAN). According to an embodiment of the present disclosure, the wireless communication may include global navigation satellite system (GNSS). The GNSS may be, e.g., global positioning system (GPS), global navigation satellite system (Glonass), Beidou navigation satellite system (hereinafter, "Beidou") or Galileo, or the European global satellite-based navigation system. Hereinafter, the terms "GPS" and the "GNSS" may be interchangeably used herein. The wired connection may include at least one of, e.g., universal serial bus (USB), high definition multimedia interface (HDMI), recommended standard (RS)-232, power line communication (PLC) or plain old telephone service (POTS). The network 162 may include at least one of telecommunication networks, e.g., a computer network (e.g., local area network (LAN) or wide area network (WAN)), Internet, or a telephone network.

The first and second external electronic devices 102 and 104 each may be a device of the same or a different type from the electronic device 101. According to an embodiment of the present disclosure, all or some of operations executed on the electronic device 101 may be executed on another or multiple other electronic devices (e.g., the electronic devices 102 and 104 or server 106). According to an embodiment of the present disclosure, when the electronic device 101 should perform some function or service automatically or at a request, the electronic device 101, instead of executing the function or service on its own or additionally, may request another device (e.g., the electronic device 102 or 104 or server 106) to perform at least some functions associated therewith. The other electronic device (e.g., the electronic device 102 or 104 or server 106) may execute the requested functions or additional functions and transfer a result of the execution to the electronic device 101. The electronic device 101 may provide a requested function or service by processing the received result as it is or additionally. To that end, a cloud computing, distributed computing, or client-server computing technique may be used, for example.

Figure 2:
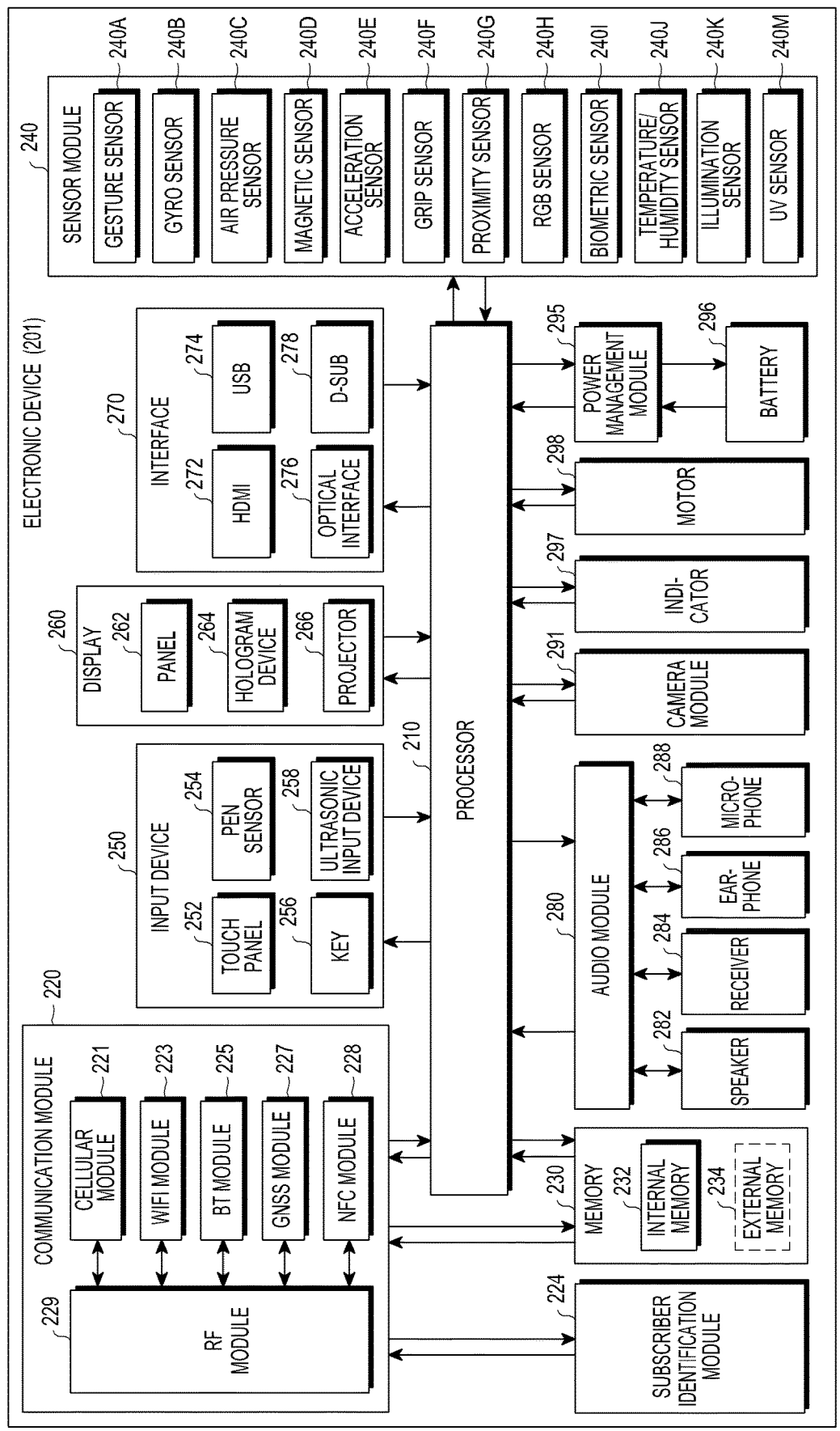
FIG. 2 is a block diagram illustrating an electronic device according to an embodiment of the present disclosure.

FIG. 2 is a block diagram illustrating an electronic device 201 according to an embodiment of the present disclosure.

The electronic device 201 may include the whole or part of the configuration of, e.g., the electronic device 101 shown in FIG. 1. The electronic device 201 may include one or more processors (e.g., application processors (APs)) 210, a communication module 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298. The processor 210 may control multiple hardware and software components connected to the processor 210 by running, e.g., an operating system or application programs, and the processor 210 may process and compute various data. The processor 210 may be implemented in, e.g., a system on chip (SoC). According to an embodiment of the present disclosure, the processor 210 may further include a graphic processing unit (GPU) and/or an image signal processor. The processor 210 may include at least some (e.g., the cellular module 221) of the components shown in FIG. 2. The processor 210 may load a command or data received from at least one of other components (e.g., a non-volatile memory) on a volatile memory, process the command or data, and store resultant data in the non-volatile memory.

The communication module 220 may have the same or similar configuration to the communication interface 170. The communication module 220 may include, e.g., a cellular module 221, a Wi-Fi module 223, a bluetooth (BT) module 225, a GNSS module 227, a NFC module 228, and a RF module 229. The cellular module 221 may provide voice call, video call, text, or Internet services through, e.g., a communication network. The cellular module 221 may perform identification or authentication on the electronic device 201 in the communication network using a subscriber identification module 224 (e.g., the SIM card). According to an embodiment of the present disclosure, the cellular module 221 may perform at least some of the functions providable by the processor 210. According to an embodiment of the present disclosure, the cellular module 221 may include a communication processor (CP). According to an embodiment of the present disclosure, at least some (e.g., two or more) of the cellular module 221, the Wi-Fi module 223, the Bluetooth module 225, the GNSS module 227, or the NFC module 228 may be included in a single integrated circuit (IC) or an IC package. The RF module 229 may communicate data, e.g., communication signals (e.g., RF signals). The RF module 229 may include, e.g., a transceiver, a power amp module (PAM), a frequency filter, a low noise amplifier (LNA), or an antenna. According to an embodiment of the present disclosure, at least one of the cellular module 221, the Wi-Fi module 223, the bluetooth module 225, the GNSS module 227, or the NFC module 228 may communicate RF signals through a separate RF module. The subscription identification module 224 may include, e.g., a card including a subscriber identification module or an embedded SIM, and may contain unique identification information (e.g., an integrated circuit card identifier (ICCID) or subscriber information (e.g., an international mobile subscriber identity (IMSI)).

The memory 230 (e.g., the memory 130) may include, e.g., an internal memory 232 or an external memory 234. The internal memory 232 may include at least one of, e.g., a volatile memory (e.g., a dynamic RAM (DRAM), a static RAM (SRAM), a synchronous dynamic RAM (SDRAM), etc.) or a non-volatile memory (e.g., a one-time programmable ROM (OTPROM), a programmable ROM (PROM), an erasable and programmable ROM (EPROM), an electrically erasable and programmable ROM (EEPROM), a mask ROM, a flash ROM, a flash memory (e.g., a NAND flash, or a NOR flash), a hard drive, or solid-state drive (SSD). The external memory 234 may include a flash drive, e.g., a compact flash (CF) memory, a secure digital (SD) memory, a micro-SD memory, a min-SD memory, an extreme digital (xD) memory, a multi-media card (MMC), or a Memory Stick™. The external memory 234 may be functionally or physically connected with the electronic device 201 via various interfaces.

For example, the sensor module 240 may measure a physical quantity or detect an operational state of the electronic device 201, and the sensor module 240 may convert the measured or detected information into an electrical signal. The sensor module 240 may include at least one of, e.g., a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., a red-green-blue (RGB) sensor, a bio sensor 240I, a temperature/humidity sensor 240J, an illumination sensor 240K, or an Ultra Violet (UV) sensor 240M. Additionally or alternatively, the sensing module 240 may include, e.g., an e-nose sensor, an electromyography (EMG) sensor, an electroencephalogram (EEG) sensor, an electrocardiogram (ECG) sensor, an infrared (IR) sensor, an iris sensor, or a finger print sensor. The sensor module 240 may further include a control circuit for controlling at least one or more of the sensors included in the sensing module. According to an embodiment of the present disclosure, the electronic device 201 may further include a processor configured to control the sensor module 240 as part of the processor 210 or separately from the processor 210, and the electronic device 2701 may control the sensor module 240 while the processor 210 is in a sleep mode.

The input unit 250 may include, e.g., a touch panel 252, a (digital) pen sensor 254, a key 256, or an ultrasonic input device 258. The touch panel 252 may use at least one of capacitive, resistive, infrared, or ultrasonic methods. The touch panel 252 may further include a control circuit. The touch panel 252 may further include a tactile layer and may provide a user with a tactile reaction. The (digital) pen sensor 254 may include, e.g., a part of a touch panel or a separate sheet for recognition. The key 256 may include e.g., a physical button, optical key or key pad. The ultrasonic input device 258 may sense an ultrasonic wave generated from an input tool through a microphone (e.g., the microphone 288) to identify data corresponding to the sensed ultrasonic wave.

The display 260 (e.g., the display 160) may include a panel 262, a hologram device 264, a projector 266, and/or a control circuit for controlling the same. The panel 262 may be implemented to be flexible, transparent, or wearable. The panel 262, together with the touch panel 252, may be configured in one or more modules. According to an embodiment of the present disclosure, the panel 262 may include a pressure sensor (or pose sensor) that may measure the strength of a pressure by the user's touch. The pressure sensor may be implemented in a single body with the touch panel 252 or may be implemented in one or more sensors separate from the touch panel 252. The hologram device 264 may make three dimensional (3D) images (holograms) in the air by using light interference. The projector 266 may display an image by projecting light onto a screen. The screen may be, for example, located inside or outside of the electronic device 201. The interface 270 may include e.g., a high definition multimedia interface (HDMI) 272, a USB 274, an optical interface 276, or a D-subminiature (D-sub) 278. The interface 270 may be included in e.g., the communication interface 170 shown in FIG. 1. Additionally or alternatively, the interface 270 may include a mobile high-definition link (MHL) interface, a secure digital (SD) card/multimedia card (MMC) interface, or infrared data association (IrDA) standard interface.

The audio module 280 may converting, e.g., a sound signal into an electrical signal and vice versa. At least a part of the audio module 280 may be included in e.g., the input/output interface 145 as shown in FIG. 1. The audio module 280 may process sound information input or output through e.g., a speaker 282, a receiver 284, an earphone 286, or a microphone 288. For example, the camera module 291 may be a device for capturing still images and videos, and may include, according to an embodiment of the present disclosure, one or more image sensors (e.g., front and back sensors), a lens, an image signal processor (ISP), or a flash such as an LED or xenon lamp. The power manager module 295 may manage power of the electronic device 201, for example. According to an embodiment of the present disclosure, the power manager module 295 may include a power management Integrated circuit (PMIC), a charger IC, or a battery or fuel gauge. The PMIC may have a wired and/or wireless recharging scheme. The wireless charging scheme may include e.g., a magnetic resonance scheme, a magnetic induction scheme, or an electromagnetic wave based scheme, and an additional circuit, such as a coil loop, a resonance circuit, a rectifier, or the like may be added for wireless charging. The battery gauge may measure an amount of remaining power of the battery 296, a voltage, a current, or a temperature while the battery 296 is being charged. The battery 296 may include, e.g., a rechargeable battery or a solar battery.

The indicator 297 may indicate a particular state of the electronic device 201 or a part (e.g., the processor 210) of the electronic device, including e.g., a booting state, a message state, or recharging state. The motor 298 may convert an electric signal to a mechanical vibration and may generate a vibrational or haptic effect. The electronic device 201 may include a mobile TV supporting device (e.g., a GPU) that may process media data as per, e.g., digital multimedia broadcasting (DMB), digital video broadcasting (DVB), or mediaFlo™ standards. Each of the aforementioned components of the electronic device may include one or more parts, and a name of the part may vary with a type of the electronic device. According to various embodiments, the electronic device (e.g., the electronic device 201) may exclude some elements or include more elements, or some of the elements may be combined into a single entity that may perform the same function as by the elements before combined.

Figure 3:
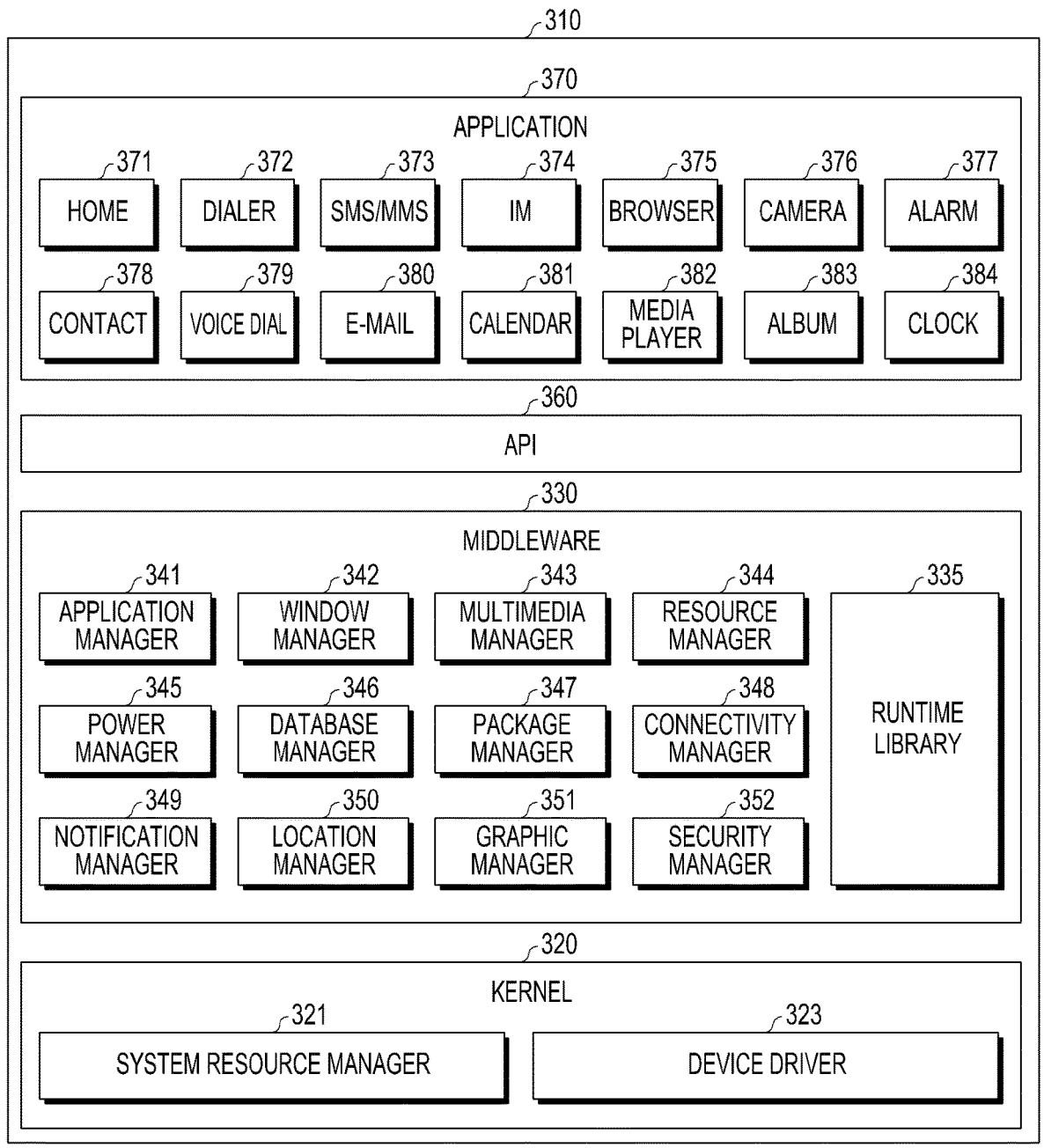
FIG. 3 is a block diagram illustrating a program module according to an embodiment of the present disclosure.

FIG. 3 is a block diagram illustrating a program module according to an embodiment of the present disclosure. According to an embodiment of the present disclosure, the program module 310 (e.g., the program 140) may include an operating system (OS) controlling resources related to the electronic device (e.g., the electronic device 101) and/or various applications (e.g., the application processor 147) driven on the operating system. The OS may include, e.g., Android™, iOS™, Windows™ Symbian™, Tizen™, or Bada™.

Referring to FIG. 3, the program module 310 may include a kernel 320 (e.g., the kernel 141), middleware 330 (e.g., the middleware 143), an API 360 (e.g., the API 145), and/or an application 370 (e.g., the application program 147). At least a part of the program module 310 may be preloaded on the electronic device or may be downloaded from an external electronic device (e.g., the electronic devices 102 and 104 or server 106).

The kernel 320 may include, e.g., a system resource manager 321 or a device driver 323. The system resource manager 321 may perform control, allocation, or recovery of system resources. According to an embodiment of the present disclosure, the system resource manager 321 may include a process managing unit, a memory managing unit, or a file system managing unit. The device driver 323 may include, e.g., a display driver, a camera driver, a Bluetooth driver, a shared memory driver, a USB driver, a keypad driver, a Wi-Fi driver, an audio driver, or an inter-process communication (IPC) driver. The middleware 330 may provide various functions to the application 370 through the API 360 so that the application 370 may use limited system resources in the electronic device or provide functions jointly required by applications 370. According to an embodiment of the present disclosure, the middleware 330 may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, or a security manager 352.

The runtime library 335 may include a library module used by a compiler in order to add a new function through a programming language while, e.g., the application 370 is being executed. The runtime library 335 may perform input/output management, memory management, or arithmetic function processing. The application manager 341 may manage the life cycle of, e.g., the applications 370. The window manager 342 may manage graphical user interface (GUI) resources used on the screen. The multimedia manager 343 may grasp formats necessary to play media files and use a codec appropriate for a format to perform encoding or decoding on media files. The resource manager 344 may manage the source code or memory space of the application 370. The power manager 345 may manage, e.g., the battery capability or power and provide power information necessary for the operation of the electronic device. According to an embodiment of the present disclosure, the power manager 345 may interwork with a basic input/output system (BIOS). The database manager 346 may generate, search, or vary a database to be used in the applications 370. The package manager 347 may manage installation or update of an application that is distributed in the form of a package file.

The connectivity manager 348 may manage, e.g., wireless connectivity. The notification manager 349 may provide an event, e.g., arrival message, appointment, or proximity alert, to the user. The location manager 350 may manage, e.g., locational information on the electronic device. The graphic manager 351 may manage, e.g., graphic effects to be offered to the user and their related user interface. The security manager 352 may provide system security or user authentication, for example. According to an embodiment of the present disclosure, the middleware 330 may include a telephony manager for managing the voice or video call function of the electronic device or a middleware module able to form a combination of the functions of the above-described elements. According to an embodiment of the present disclosure, the middleware 330 may provide a module specified according to the type of the operating system. The middleware 330 may dynamically omit some existing components or add new components. The API 360 may be a set of, e.g., API programming functions and may have different configurations depending on operating systems. For example, in the case of Android or iOS, one API set may be provided per platform, and in the case of Tizen, two or more API sets may be offered per platform.

The application 370 may include an application that may provide, e.g., a home 371, a dialer 372, an short messaging service (SMS)/multimedia messaging service (MMS) 373, an instant message (IM) 374, a browser 375, a camera 376, an alarm 377, a contact 378, a voice dial 379, an email 380, a calendar 381, a media player 382, an album 383, or a clock 384, a health-care (e.g., measuring the degree of workout or blood sugar), or provision of environmental information (e.g., provision of air pressure, moisture, or temperature information). According to an embodiment of the present disclosure, the application 370 may include an information exchanging application supporting information exchange between the electronic device and an external electronic device. Examples of the information exchange application may include, but is not limited to, a notification relay application for transferring specific information to the external electronic device, or a device management application for managing the external electronic device. For example, the notification relay application may transfer notification information generated by other application of the electronic device to the external electronic device or receive notification information from the external electronic device and provide the received notification information to the user. For example, the device management application may install, delete, or update a function (e.g., turn-on/turn-off the external electronic device (or some elements) or adjusting the brightness (or resolution) of the display) of the external electronic device communicating with the electronic device or an application operating on the external electronic device. According to an embodiment of the present disclosure, the application 370 may include an application (e.g., a health-care application of a mobile medical device) designated according to an attribute of the external electronic device. According to an embodiment of the present disclosure, the application 370 may include an application received from the external electronic device. At least a portion of the program module 310 may be implemented (e.g., executed) in software, firmware, hardware (e.g., the processor 210), or a combination of at least two or more thereof and may include a module, program, routine, command set, or process for performing one or more functions.

Figure 4A:
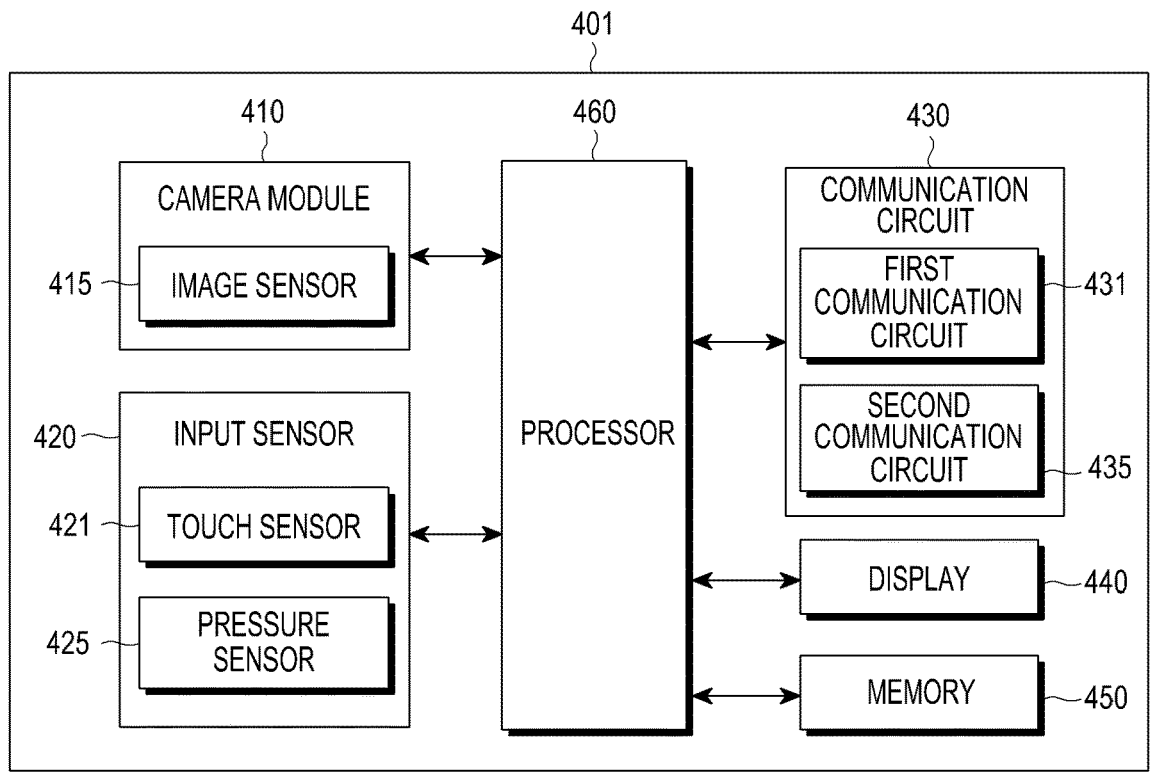
FIG. 4A is a block diagram illustrating an electronic device according to an embodiment of the present disclosure.

FIG. 4A is a block diagram illustrating an electronic device according to an embodiment of the present disclosure.

Figure 4B:
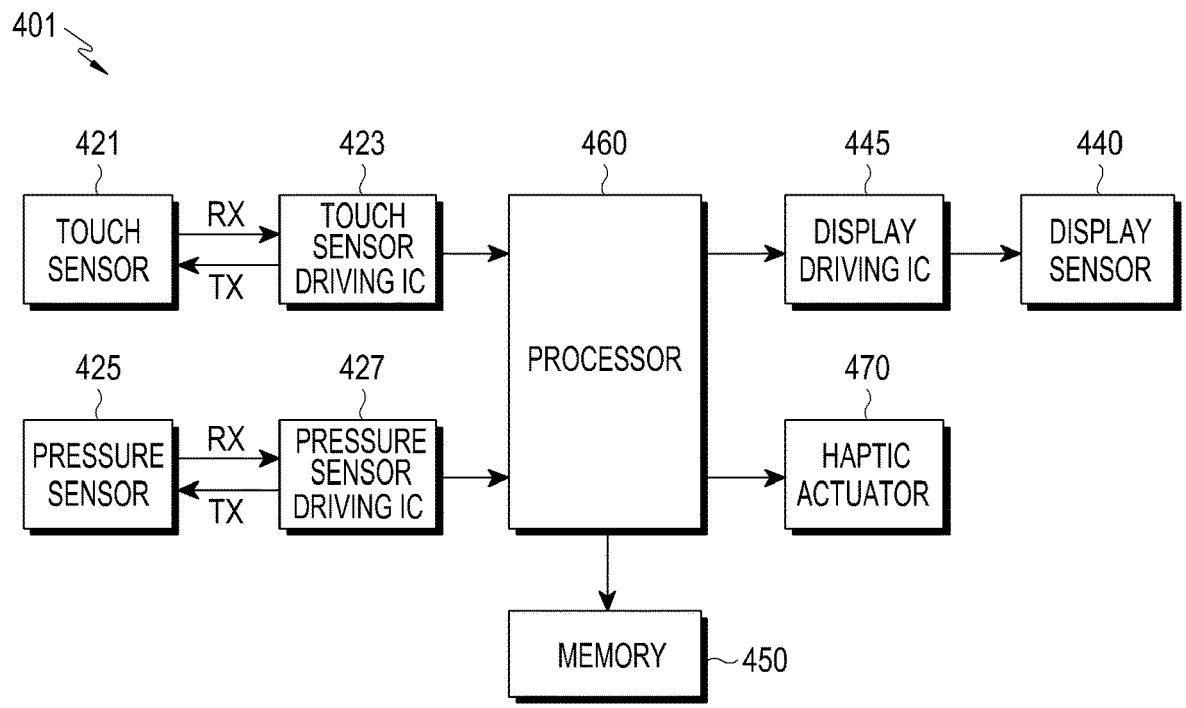
FIG. 4B is a view illustrating operations of input sensors of an electronic device according to an embodiment of the present disclosure.

FIG. 4B is a view illustrating operations of input sensors of an electronic device according to an embodiment of the present disclosure.

Figure 4C:
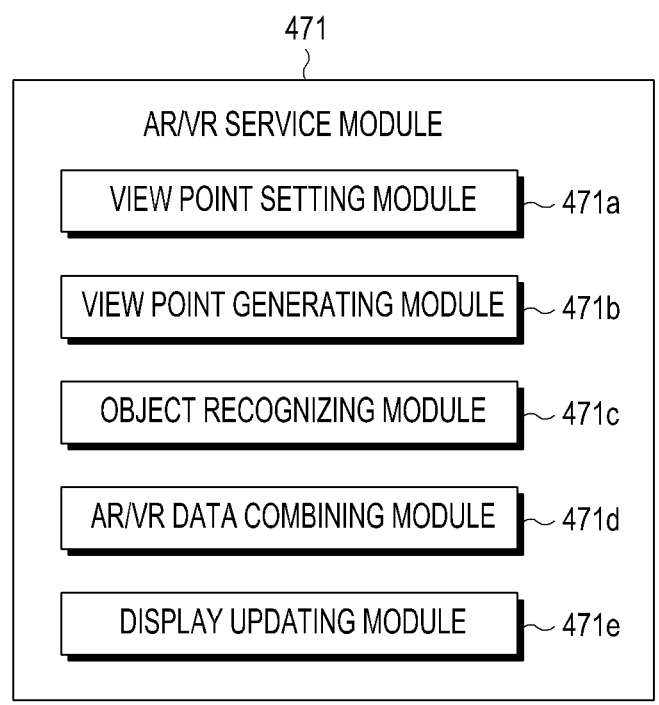
FIG. 4C is a block diagram illustrating a processor of an electronic device according to an embodiment of the present disclosure.

FIG. 4C is a block diagram illustrating a processor of an electronic device according to an embodiment of the present disclosure.

FIGS. 4A, 4B, and 4C illustrate only components related to various embodiments of the present disclosure, and other components than the above-listed components may also be included. For example, FIGS. 4A to 4B may illustrate the whole or part of the electronic device 101 of FIG. 1 or the electronic device 201 of FIG. 2.

Referring to FIG. 4A, according to an embodiment of the present disclosure, an electronic device 401 may include at least one of a camera module 410, an input sensor 420, a communication circuit 430 (e.g., a transceiver), a display 440, a memory 450, or a processor 460 (e.g., at least one processor).

The camera module 410 may capture image data at, at least, one position of the electronic device 401 under the control of the processor 460. The camera module 410 may include an image sensor 415.

The image sensor 415 may be a type of electronic sensor that may sense light reflected by an object and incident through a lens and convert an optical signal corresponding to the sensed light into an electrical signal to obtain the image data. For example, the image data may include at least one of image data or video data.

According to an embodiment of the present disclosure, the image sensor 415 include at least one of, e.g., a complementary metal oxide semiconductor (CMOS) sensor, a charge coupled device (CCD) sensor, a foveon sensor, or a complementary image sensor.

The input sensor 420 may detect a predetermined input that is generated by the user. The input sensor 420 may include at least one of, e.g., a touch sensor 421 or a pressure sensor 425. An input detected through the input sensor 420 may include at least one of, e.g., a touch input detected through the touch sensor 421 or a pressure input detected through the pressure sensor 425. The processor 460 may determine the attribute of the input detected through the input sensor 420. For example, upon receiving the input detected through the input sensor 420, the processor 460 may determine the attribute of the detected input. The attribute of the detected input may include at least one of, e.g., an input type (e.g., a touch input or pressure input), an input position, an input magnitude or strength, input duration, an input count, or an input direction.

The touch sensor 421 may be disposed between the display 440 and a cover window (not shown) covering the display 440 at a portion of the electronic device, e.g., an upper portion of the display 440, and the touch sensor 421 may detect a touch input made by the user's touch. The processor 460 may determine the attribute of the detected touch input. The attribute of the touch input may include at least one of, e.g., the type (e.g., touch input), position (e.g., X-Y coordinates), magnitude, duration, or number of times of the touch input.

According to an embodiment of the present disclosure, the touch sensor 421 may be implemented, e.g., in a resistive type, capacitive type, electromagnetic radiation (EMR) type, infrared (IR) type, or ultrasonic type or a combination of one or more of the types.

The pressure sensor 425 may be disposed at a portion of the electronic device 401, e.g., at a lower portion of the display 440, and the pressure sensor 425 may detect a pressure input made by the user. The processor 460 may determine the attribute of the detected pressure input. The attribute of the pressure input may include at least one of, e.g., the type (e.g., pressure input), position (e.g., X-Y coordinates), strength, duration, or direction of the pressure input.

The communication circuit 430 may perform communication connection with at least one external electronic device (e.g., the server 106 or electronic device 104 of FIG. 1) and may receive predetermined information from the external electronic device (e.g., the electronic device 104 or the server 106).

The communication circuit 430 may include at least one of, e.g., a first communication circuit 431 or a second communication circuit 435. The communication circuit 430 may include the whole or part of the communication interface 170 of FIG. 1 or the communication module 220 of FIG. 2. The communication circuit 430 (e.g., a transceiver) may be referred to as a communication unit or communication module, include the communication unit or communication module as its part, or may constitute the communication unit or the communication module.

According to an embodiment of the present disclosure, the first communication circuit 431 may provide data based on short-range communication. For example, the communication circuit 430 may perform communication connection with at least one external electronic device (e.g., the electronic device 104 or the server 106) connected with a first network through the first communication circuit 431. For example, the first communication circuit 431 may include at least one of, e.g., wireless fidelity (Wi-Fi), bluetooth, near-field communication (NFC), zigbee, z-wave, or global navigation satellite system (GNSS).

According to an embodiment of the present disclosure, the second communication circuit 435 may provide a packet data (or internet protocol)-based service. For example, the communication circuit 430 may perform communication with at least one external electronic device (e.g., the electronic device 104 or the server 106) through the second communication circuit 435. For example, the second communication circuit 435 may include at least one of a computer network (e.g., a local area network (LAN) or a wide area network (WAN)), internet, or telephone network.

The communication circuit 430 may receive information from at least one external electronic device (e.g., the electronic device 104 or the server 106) through at least one of, e.g., the first communication circuit 431 or the second communication circuit 435. For example, the information may be external image data or information associated with at least one object and requested by the electronic device 401.

In the disclosure, the term "object" may mean a target recognizable by the processor 460 in image data outputted through the display 440. For example, in this disclosure, the object may include a building or person. The object is not limited thereto and may rather include any target recognizable by the processor 460.

The display 440 may be disposed between a first surface (e.g., a front surface of the electronic device 401) that faces in a first direction of the electronic device 401 and a second surface (e.g., a rear surface of the electronic device 401) that faces in a second direction, which is an opposite direction of the first direction. A top surface of the display 440 may be exposed through the first surface. The display 440 may be formed in a size large enough to occupy a majority of the first surface of the electronic device 401.

According to an embodiment of the present disclosure, the display 440 may include a panel, such as a liquid crystal display (LCD) or active matrix organic light emitting diode (AMOLED) panel and may display various operation states of the electronic device 401 and various images according to the execution of an application and/or services.

For example, the display 440 may provide the user with a user interface (UI) corresponding to various reality services (e.g., service for providing virtual image based on at least one of a current view point, a virtually-shifted view point, or a virtually direction-changed view point in VR and/or AV services environment).

According to an embodiment of the present disclosure, the current view point may mean a view point corresponding to a view angle range that is formed with respect to a central view angle of the camera module 410 of the electronic device 401 at the current position of the electronic device 401 when the electronic device 401 runs a VR- or AR-related application. The virtually-shifted view point may mean a view point corresponding to a view angle range of the camera module 410 at a position virtually shifted in a direction of the central view angle of the camera module 410 through a predetermined pressure by the user without a substantial, physical move of the electronic device 401 from the current position For example, the virtually-shifted view point may include a view point corresponding to the view angle range of the camera module 410 at a virtual position within a zoominable (able to zoom-in) or zoomoutable (able to zoom-out) view angle range of the camera module 410 depending on the capability of the camera module 410 in the direction of the central view angle of the camera module 410. Also, the virtually-shifted view point may include a view point corresponding to a predetermined view angle range at a virtual position exceeding the zoominable or zoomoutable view angle range of the camera module 410 on the capability of the camera module 410 in the direction of the central view angle of the camera module 410. The virtual view angle range may include, e.g., a range corresponding to the view angle range of the camera module 410 at the virtual position exceeding the zoominable or zoomoutable view angle range of the camera module 410 in the direction of the central view angle of the camera module 410. The virtually direction-changed view point may mean a view point corresponding to a view angle range of the camera module 410 at a position where the central view angle of the camera module 410 of the electronic device 401 has been redirected from the virtually-shifted view point.

The display 440 may transmit an (analog) signal corresponding to at least one of inputs to the user interface (UI) to at least one of the processor 460, a touch sensor driving integrated circuit (IC) 423 and/or a pressure sensor driving IC 427 shown in FIG. 4B. The display 440 may receive at least one input through the UI. The display 440 may also receive a continuous movement of one input of the at least one input. The display 440 may transmit an (analog) signal corresponding to the received continuous movement to at least one of the processor 460, the touch sensor driving IC 423 and/or the pressure sensor driving IC 427 shown in FIG. 4B. As used herein, the term "input" may include a touch input (or a swipe input) detected through the touch sensor 421, a pressure input detected through the pressure sensor 425, or a combination thereof.

The display 440 may output at least a part of image data obtained from the image sensor 415 or information related to the obtained image data. For example, the display 440 may output the image data obtained from the image sensor 415. For example, the obtained image data may include at least one of a static image (e.g., a still image) or moving images (e.g., a video). The display 440 may output a virtual image that is generated based on at least a part of the obtained image data and information related to at least one object recognizable within the obtained image data. For example, corresponding to at least one object (e.g., a building or person) recognizable within the obtained image data, the display 440 may output information related to the object. The display 440 may output external image data received from the at least one external electronic device (e.g., the electronic device 104 or the server 106). For example, the received external image data may include at least one of a static image (e.g., a still image) or moving images (e.g., a video). The display 440 may also output a virtual image that is generated based on at least a part of the received external image data and information related to at least one external object recognizable within the received external image data. For example, corresponding to at least one external object (e.g., a building or person) recognizable within the received external image data, the display 440 may output information related to the external object.

The memory 450 may store commands or data related to at least one other component of the electronic device 401. The memory 450 may include the whole or part of the memory 130 of FIG. 1 or the memory 230 of FIG. 2. The memory 450 may further include an image buffer for storing images formed based on the image data obtained from the image sensor 415 on a per-frame basis. Further, the memory 450 may store at least one of the image data obtained from the image sensor 415, the information related to at least one object recognizable within the obtained image data, or at least one virtual image generated based on the image data and the information related to the at least one recognizable object. Further, the memory 450 may store at least one of the information related to at least one object recognizable within the image data, the external image data, information related to at least one external object recognizable within the external image data, or image data related to the external image data and the at least one recognizable external object, which are received from the at least one external electronic device (e.g., the electronic device 104 or the server 106).

The processor 460 may control the overall electronic device 401. For example, the processor 460 may display the image data obtained through the image sensor 415 on the display 440. For example, the processor 460, upon running a reality service (e.g., VR and/or AR)-related application, may display, on the display 440, image data obtained through the image sensor 415 of the camera module 410 at the current view point. Further, the processor 460 may determine an input (e.g., a touch input or pressure input) at or to one point in the displayed image data through the input sensor 420 and display image data corresponding to the determined input on the display 440. The image data corresponding to the determined input may include at least one of, e.g., image data obtained through the image sensor 415, image data previously stored in the memory 450, or image data received from at least one external electronic device (e.g., the electronic device 104 or server 106).

According to an embodiment of the present disclosure, the processor 460 may determine the current view point of the electronic device 401 based on the image data obtained through the image sensor 415. For example, the processor 460, upon running a reality service (e.g., VR and/or AR)-related application, may obtain image data through the camera module 410 of the electronic device 401, detect at least one of the position, attitude, or direction of the electronic device 401 from which the image data has been obtained, and determine that the current view point of the electronic device 401 is a view point corresponding to the camera module 410 (e.g., the central view angle of the image sensor 415) based on at least one of the detected position, attitude, or direction of the electronic device 401.

According to an embodiment of the present disclosure, the processor 460 may merge or synthesize first image data obtained through the image sensor 415 of the camera module 410 and information related to the first image data at the determined current view point, thereby generating a first virtual image. For example, the information related to the obtained first image data may include at least one of map information (e.g., two-dimensional (2D)/three-dimensional (3D) map information) based on the detected current position of the electronic device 401 or information (e.g., building information modeling (BIM)) regarding at least one object (e.g., a first object) recognizable within the obtained image data. The processor 460 may display the obtained first image data or the generated first virtual image on the display 440.

According to an embodiment of the present disclosure, the term "virtual image" may encompass not only a virtual image (or VR image) but also an AR image obtained by merging a real image with a virtual image or predetermined information.

According to an embodiment of the present disclosure, the processor 460 may determine whether an input is detected through the input sensor 420 while displaying the first image data or the first virtual image data obtained or generated at the determined current view point. For example, the input may include at least one of a touch input (or swipe input) or a pressure input.

According to an embodiment of the present disclosure, upon detecting an input (e.g., a first input) through the input sensor 420 while displaying the first image data or the first virtual image obtained or generated at the determined current view point, the processor 460 may determine a virtually-shifted view point of the electronic device 401 corresponding to the detected input. For example, the processor 460 may determine the virtually-shifted view point of the electronic device 401 based on an attribute of the detected input (e.g., the first input). According to an embodiment of the present disclosure, the attribute of the detected input (e.g., the first input) may include at least one of, e.g., an input type (e.g., a touch input or pressure input), an input position, an input magnitude, an input strength, input duration, an input count, or an input direction.

According to an embodiment of the present disclosure, the processor 460 may determine the virtually-shifted view point according to the level of the detected input (e.g., the first input). As used herein, the term "level" may mean the magnitude or strength of an input generated by the user. For example, where the input is a touch input, the level may be a predetermined magnitude corresponding to the position where the touch input has occurred. For example, where the input is a pressure input, the level may be the strength of the pressure input. The level may previously be set per step. The number of the level steps and/or different level differences between the steps may be set depending on the capability of the electronic device 401.

Further, the processor 460 may determine the depth of the virtually-shifted view point depending on the level of the detected input (e.g., the first input). For example, the processor 460 may put forward the depth of the virtually-shifted view point as the level of the detected input (e.g., the first input) increases and put backward the depth of the virtually-shifted view point as the level decreases. Or, its opposite is possible as well. The processor 460 may also perform control to stepwise or continuously shift the depth of the virtually-shifted view point depending on the level of the input.

As used herein, the term "depth" may mean at least one of the degree of distance/position movement, moving speed, view point layer, the degree of transparency or color, or a combination thereof, from a reference position (e.g., the position of the electronic device 401 or the position of the camera module 410) to a position virtually shifted. The depth may previously be set per step. The number of depth steps may be set to correspond to the number of level steps. Further, the degree of distance/position movement, moving speed, view point layer, degree of transparency or color, or a combination thereof, of the view point between the depths may be set to be different depending on the capability of the electronic device 401.

According to an embodiment of the present disclosure, when a predetermined input (e.g., the first input) is made while the display 440 displays the first image data or the first virtual image data obtained at the current view point, the processor 460 may display, on the display 440, first image data obtained at the virtually-shifted view point that has been virtually shifted by the depth corresponding to the level of the first input while the first input is maintained or first virtual image data generated based on the obtained first image data. For example, when a first level of first input is made while the display 440 displays the first image data or the first virtual image data obtained at the current view point, the processor 460 may display, on the display 440, second image data obtained at a first virtually-shifted view point virtually shifted from the current view point by a depth of one step while the first level of first input is maintained or second virtual image data generated based on the second image data. Further, when a second level of first input is made while the display 440 displays the first image data or the first virtual image data obtained at the current view point, the processor 460 may display, on the display 440, third image data obtained at a second virtually-shifted view point virtually shifted from the current view point by a depth of two steps while the second level of first input is maintained or third virtual image data generated based on the third image data.

According to an embodiment of the present disclosure, when the first input of the level changed stepwise is continuously made while the display 440 displays the first image data or the first virtual image data obtained at the current view point, the processor 460 may continuously display, on the display 440, image data obtained at the virtually-shifted view point virtually shifted by the depth corresponding to the level or virtual image data generated based on the obtained first image data. For example, when a first level of first input and a second level of first input are continuously made while the display 440 displays the first image data or the first virtual image data obtained at the current view point, the processor 460 may continuously display, on the display 440, the first virtual image data (or the first image data), the second virtual image data (or the second image data), and the third virtual image data (or the third image data).

According to an embodiment of the present disclosure, the processor 460 may determine the depth of the virtually-shifted view point according to the input duration of the detected input (e.g., the first input) while the display 440 displays the first image data or the first virtual image data obtained at the current view point. For example, the processor 460 may put forward the depth of the virtually-shifted view point as the input duration of the detected input (e.g., the first input) increases. Its opposite is possible as well. Alternatively, the processor 460 may perform control to stepwise or continuously shift the depth of the virtually-shifted view point depending on the input duration.

According to an embodiment of the present disclosure, the processor 460 may determine the depth of the virtually-shifted view point according to the input count of the detected input (e.g., the first input) while the display 440 displays the first image data or the first virtual image data obtained at the current view point. For example, the processor 460 may gradually put forward the depth of the virtually-shifted view point according to the input count of the detected input (e.g., the first input). Its opposite is possible as well. Alternatively, the processor 460 may perform control to stepwise or continuously shift the depth of the virtually-shifted view point depending on the input count.

According to an embodiment of the present disclosure, the processor 460 may calculate the position displacement of the 401 that corresponds to the position displacement from the current view point to the virtually-shifted view point. The processor 460 may detect the virtually shifted position of the electronic device 401 based on the calculated position displacement of the electronic device 401. The processor 460 may obtain or receive the second image data from at least one of the image sensor 415 of the electronic device 401 or at least one external electronic device (e.g., the electronic device 104 or server 106) at the detected virtually shifted position of the electronic device 401.

For example, the processor 460 may determine whether the detected virtually shifted position of the electronic device 401 falls within a zoominable or zoomoutable view angle range of the image sensor 415 and may obtain the second image data at the virtually-shifted view point corresponding to the virtually shifted position using at least one of the image sensor 415, the memory 450 storing the second image data corresponding to the virtually shifted position, or at least one external electronic device (e.g., the electronic device 104 or server 106), depending on the result of the determination.

For example, when the detected virtually shifted position of the electronic device 401 is within the zoominable or zoomoutable view angle range of the of the image sensor 415 with respect to the direction of the central view angle, the processor 460 may obtain the second image data at the virtually-shifted view point corresponding to the virtually shifted position.

According to an embodiment of the present disclosure, the processor 460 may obtain the second information at the virtually-shifted view point corresponding to the virtually shifted position through the image sensor 415 by zooming the image sensor 415 from the current position of the electronic device 401 to the virtually shifted position. When the second image data at the virtually-shifted view point is obtained through the image sensor 415 by zooming the image sensor 415, the quality of the obtained second image data may be deteriorated. In such case, the processor 460 may previously set and limit a threshold for the distance of the virtually-shifted view point of the electronic device 401 or a threshold for a scale factor of the image data in order to ensure a good quality of second image data obtained at the virtually-shifted view point.

For example, the processor 460 may set the threshold for the distance of the virtually-shifted view point to 30m to ensure the quality of the second image data obtained at the virtually-shifted view point. Also, the processor 460 may set the threshold for the scale factor of the second image data obtained at the virtually-shifted view point to, e.g., 0.5 to ensure the quality of the second image data obtained at the virtually-shifted view point. In this disclosure, the threshold set for the distance of the virtually-shifted view point and the threshold preset for the scale factor are not limited thereto, and different thresholds may be set depending on the capability of the electronic device 401.

Meanwhile, according to an embodiment of the present disclosure, the scale factor may be a parameter indicating the quality of image data, which may be represented in the following Equation 1:

$$\text{Scale Factor (SF)} = \text{number of pixels in obtained image data} / \text{number of pixels displayed on screen} \quad \text{Equation 1}$$

For example, where SF=4/1=4, four pixels in image data actually obtained are displayed, as one pixel, on the preview, downsizing is possible free from quality deterioration. Where SF=¼=0.25, one pixel in image data actually obtained is displayed, as four pixels, on the preview, a quality deterioration may occur, resulting in upsizing.

For example, where a threshold (e.g., 30 m) is set for the distance of the virtually-shifted view point of the electronic device 401, the processor 460 may obtain, through the image sensor 415, the second image data at the virtually-shifted view point corresponding to the virtually shifted position when the virtually shifted position of the electronic device 401 is within the zoominable or zoomoutable view angle range of the image sensor 415 with respect to the direction of the central view angle of the image sensor 415 and is not more than the threshold (e.g., 30m) for the distance of the virtually-shifted view point of the electronic device 401. As another example, when the virtually shifted position of the electronic device 401 exceeds the zoominable or zoomoutable view angle range of the image sensor 415 with respect to the direction of the central view angle of the image sensor 415 or is not less than the threshold (e.g., 30 m) for the distance of the virtually-shifted view point, the processor 460 may send a request for the second image data based on the virtually shifted position of the electronic device 401 to at least one of the memory 450 of the electronic device 401 or at least one external electronic device (e.g., the electronic device 104 or server 106) and receive the second image data.

As another example, where a threshold (e.g., 0.5) is set for the scale factor of the second image data obtained at the virtually shifted position of the electronic device 401, the processor 460 may determine that the second image data obtained at the virtually shifted position is the image data obtained at the virtually-shifted view point when the virtually shifted position of the electronic device 401 is within the zoominable or zoomoutable view angle range of the image sensor 415 with respect to the direction of the central view angle of the image sensor 415 and the scale factor of the second image data obtained through the image sensor 415 at the virtually shifted position of the electronic device 401 is not less than the threshold (e.g., 0.5). As another example, when the virtually shifted position of the electronic device 401 exceeds the zoominable or zoomoutable view angle range of the image sensor 415 with respect to the direction of the central view angle of the image sensor 415 or the scale factor of the second image data obtained through the image sensor 415 at the virtually shifted position of the electronic device 401 is less than the threshold (e.g., 0.5), the processor 460 may send a request for the second image data based on the virtually shifted position of the electronic device 401 to at least one of the memory 450 of the electronic device 401 or at least one external electronic device (e.g., the electronic device 104 or server 106) and receive the second image data.

According to an embodiment of the present disclosure, the processor 460 may generate the second virtual image data by merging or synthesizing the second image data, which is obtained through at least one of the image sensor 415, the memory 450 of the electronic device 401, or the at least one external electronic device (e.g., the electronic device 104 or server 106) at the determined virtually-shifted view point, and/or information related to the obtained second image data. For example, the information related to the second image data obtained at the determined virtually-shifted view point may include at least one of map information (e.g., 2D/3D map information) based on the virtually shifted position of the electronic device 401 or information (e.g., BIM information, indoor map information, or personal information) regarding at least one object (e.g., a second object) recognizable within the obtained second image data. The processor 460 may display, on the display 440, the second image data obtained at the determined virtually-shifted view point or the second virtual image data generated based on the obtained second image data.

According to an embodiment of the present disclosure, the processor 460 may display the second image data or the second virtual image data while the first input is maintained. The processor 460 may return from the virtually-shifted view point to the current view point unless the first input is maintained. For example, unless the first input is maintained, the processor 460 may return to the current view point, displaying the first image data obtained at the current view point or the first virtual image data generated based on the first image data.

According to an embodiment of the present disclosure, upon detecting an additional input (e.g., a second input) by the user while displaying the second image data obtained at the virtually-shifted view point or the second virtual image data generated based on the second image data while the first input is maintained, the processor 460 may provide various services, corresponding to the detected second input. The second input may be any one of, e.g., a touch input (or swipe input) or a pressure input.

According to an embodiment of the present disclosure, upon detecting an additional input (e.g., the second input) from the input sensor 420 while displaying the second image data obtained at the determined virtually-shifted view point or the second virtual image data generated based on the second image data while the first input is maintained, the processor 460 may set the virtually-shifted view point to be fixed. For example, where the virtually-shifted view point is set to be fixed by the detected second input, the user is not required to maintain the first input and the second input to keep displaying the second image data obtained at the virtually-shifted view point or the second virtual image data generated based on the second image data. Upon detecting an additional input (e.g., a third input) while the second image data or the second virtual image data is displayed after the virtually-shifted view point is set to be fixed by the detected second input, the processor 460 may release the fixing of the virtually-shifted view point and return from the virtually-shifted view point to the current view point. For example, upon detecting the third input after the virtually-shifted view point is set to be fixed by the second input so that the second image data or the second virtual image data is displayed at the virtually-shifted view point, the processor 460 may return to the current view point to display, on the display 440, the first image data obtained at the current view point or the first virtual image data generated based on the first image data.

According to an embodiment of the present disclosure, upon detecting an additional input (e.g., the second input) from the input sensor 420 while displaying the second image data obtained at the determined virtually-shifted view point or the second virtual image data generated based on the second image data while the first input is maintained, the processor 460 may make a setting to change from the virtually-shifted view point to a virtually direction-changed view point where the central view angle of the camera module 410 (e.g., the image sensor 415) has been redirected, corresponding to the detected second input while the detected second input is maintained. For example, the processor 460 may determine the virtually direction-changed view point of the electronic device 401 corresponding to the second input based on an attribute of the detected second input. According to an embodiment of the present disclosure, the attribute of the detected second input may include at least one of, e.g., an input position, an input direction, an input strength, input duration, or an input count. For example, the processor 460 may display third image data obtained at the virtually direction-changed view point where the central view angle of the camera module 410 has been redirected from the virtually-shifted view point corresponding to the attribute of the detected second input, or third virtual image data generated based on the third image data. Further, the processor 460 may determine the virtually direction-changed view point according to the level of each attribute of the detected second input.

For example, the processor 460 may determine the direction (e.g., up, down, left, or right) or angle (e.g., 0 degrees to 360 degrees) of the virtually direction-changed view point where the central view angle of the camera module 410 has been redirected, according to the position and distance between the position (e.g., where X-Y coordinates are (x,y)) of the detected second input and a center of the display 440 screen with respect to the center. For example, the center (e.g., where X-Y coordinates are (0,0)) of the display 440 screen may correspond to the central view angle of the camera module 410. The upper-lower direction of the central view angle of the camera module 410 and the degree, i.e., upper-lower angle, of the change of the upper-lower direction may be determined according to the position (e.g., the Y-axis coordinate) of the second input with respect to the horizontal axis (e.g., the X axis) passing through the center of the display 440 screen, and the left-right direction of the central view angle of the camera module 410 and the degree, i.e., left-right angle, of the change of the left-right direction may be determined according to the position (e.g., the X-axis coordinate) of the second input with respect to the vertical axis (e.g., the Y axis) passing through the center of the display 440 screen. Accordingly, where the second input is a touch input, the processor 460 may determine the angle and direction in which the central view angle of the camera module 410 has been redirected according to the position (x,y) of the detected second input with respect to the center (0,0) of the display 440 screen and may determine that the view point corresponding to the view angle range of the camera module 410 corresponding to the determined angle and direction is the virtually direction-changed view point. Further, the processor 460 may stepwise change the virtually direction-changed view point in the determined direction by a preset depth according to the level of the attribute of the second input. Likewise, even when the second input is, e.g., a swipe input, the processor 460 may determine the angle and direction in which the central view angle of the camera module 410 has been redirected according to the swiped length and direction of the second input with respect to the center (0,0) of the display 440 screen and may determine that the view point corresponding to the view angle range of the camera module 410 corresponding to the determined angle and direction is the virtually direction-changed view point.

According to an embodiment of the present disclosure, the processor 460 may calculate a variation in attitude or direction of the electronic device from the virtually-shifted view point to the virtually direction-changed view point. The processor 460 may detect at least one of a virtual changed attitude or a virtual changed direction based on the calculated variation in attitude or direction of the electronic device. The processor 460 may determine the virtually direction-changed view point based on at least one of the detected virtual changed attitude or virtual changed direction of the electronic device and may obtain or receive third image data from at least one of the image sensor 415 of the electronic device 401, the memory 450 of the electronic device 401, or at least one external electronic device (e.g., the electronic device 104 or server 106) at the determined virtually direction-changed view point.

According to an embodiment of the present disclosure, the variation in attitude or direction of the electronic device 401 may be detected based on a combination of information sensed from location-based sensors (not shown) included in the electronic device 401. For example, the information sensed from the location-based sensors for detecting the position, attitude, or direction of the electronic device 401 may include information sensed from at least one of, e.g., an acceleration sensor, a gyro sensor, a geomagnetic sensor, a gravity sensor, an air pressure sensor, or a combination thereof or may estimate the same using, e.g., the degree of displacement in a particular area of the image data inputted to the electronic device 401, i.e., a motion vector variation in the image data.

According to an embodiment of the present disclosure, the processor 460 may generate third virtual image data by merging or synthesizing the third image data obtained at the determined virtually direction-changed view point and/or information related to the obtained third image data. For example, the information related to the third image data obtained at the determined virtually direction-changed view point may include at least one of map information (e.g., 2D/3D map information) based on at least one of the changed attitude or the changed direction of the electronic device 401 or information (e.g., BIM information, indoor map information, or personal information) regarding at least one object (e.g., a third object) within the obtained third image data. The processor 460 may display the obtained third image data or the generated third virtual image on the display 440.

Further, the processor 460 may stepwise change the virtually direction-changed view point in the determined direction by a preset depth according to the strength, duration, or count of the second input.

Upon detecting an additional input (e.g., a third input) while displaying the third image data obtained at the virtually direction-changed view point, which has been changed from the virtually-shifted view point by the second input, or the third virtual image data generated based on the third image data while the second input is maintained, the processor 460 may set the virtually direction-changed view point to be fixed. For example, where the virtually direction-changed view point is set to be fixed by the detected third input, the user is not required to maintain the first input to the third input to keep displaying the third image data obtained at the virtually direction-changed view point or the third virtual image data generated based on the third image data. Upon detecting an additional input (e.g., a fourth input) while the third image data or the third virtual image data is displayed after the virtually direction-changed view point is set to be fixed by the third input, the processor 460 may return to the current view point. For example, upon detecting the fourth input after the virtually direction-changed view point is set to be fixed by the third input so that the third image data or the third virtual image data is displayed at the virtually direction-changed view point, the processor 460 may return to the current view point to display, on the display 440, the first image data obtained at the current view point or the first virtual image data generated based on the first image data.

According to an embodiment of the present disclosure, upon detecting an additional input (e.g., the second input) from the input sensor 420 while displaying the second image data obtained at the virtually-shifted view point or the second virtual image data generated based on the second image data while the first input is maintained, the processor 460 may perform a primary operation of controlling the depth of image data provided to the display 440 corresponding to the first input and a secondary operation of controlling at least one of direction-changing, fixing, or storing the view point of the image data provided to the display 440 corresponding to the second input. For example, upon detecting the second input while displaying the second image data obtained at the virtually-shifted view point or the second virtual image data generated based on the second image data while the first input is maintained, the processor 460 may perform control to change the depth (e.g., the degree of movement, moving speed, or moving step of the view point) of the second image data (or the second virtual image data) provided to the display 440 corresponding to the attribute of the first input. For example, where the first input is a pressure input, the processor 460 may control the depth of the view point so that the view point of the second image data (or the second virtual image data) provided to the display 440 is moved forwards or backwards between the current view point and the plurality of steps of virtually-shifted view points, corresponding to the variation in the strength of the first input. Simultaneously, the processor 460 may perform control so that the view point of the image data provided to the display 440 is direction-changed, fixed, or stored corresponding to the attribute of the second input. For example, where the second input is a swipe input, the processor 460 may rotate, up, down, left, or right, the direction of the view point of the second image data (or the second virtual image data) provided to the display 440 corresponding to the attribute (e.g., the magnitude and direction) of the swipe input. Where the second input is, e.g., a pressure input, the processor 460 may perform control to fix the view point of the image data or store the image data corresponding to the strength of the second input. For example, where the strength of the second input is a first level, the processor 460 may fix the view point of the second image data (or the second virtual image data). The processor 460 may perform control so that, where the strength of the second input is a second level, the second image data (or the second virtual image data) is stored as a still image, and where the strength of the second input is a third level, the second image data (or the second virtual image data) is stored as a video. Meanwhile, where the strength of the second input is the first level, upon detecting an additional input (e.g., the third input) of the same strength as the first level after the view point of the second image data (or the second virtual image data) is fixed, the processor 460 may release the fixing of the virtually-shifted view point and return from the virtually-shifted view point to the current view point.

According to an embodiment of the present disclosure, in the circumstance where the electronic device 401 provides a reality service, the processor 460 may change the view point of the reality service that the electronic device 401 provides to the user, corresponding to a pressure input entered by the user.

According to an embodiment of the present disclosure, in the circumstance where the electronic device 401 provides a reality service, the processor 460 may control view point information for the user corresponding to a pressure input from the user. For example, where the user applies a first level step of pressure input, the electronic device may shift the view point of the electronic device 401 a first depth ahead from the view point at which the reality service is currently provided to the user where the user applies a second level step of pressure input, the electronic device may shift the view point of the electronic device 401 a second depth ahead from the view point at which the reality service is currently provided to the user where the user applies a third level step of pressure input, the electronic device may shift the view point of the electronic device 401 a third depth ahead from the view point at which the reality service is currently provided to the user.

Where such a method for changing view points using a pressure input is applied to AR services, it may provide more exact information to the user in interoperation with a 3D map or indoor map, or BMI. For example, where a pressure input is applied to a building currently being shown on the screen, the view point of the service provided to the user may be moved to the inside of the building using building information, e.g., an indoor map, thereby allowing information about the inside of the building to be identified at the current position.

According to an embodiment of the present disclosure, the processor 460 may present such an effect as if the user is virtually moved although the user is not indeed in the above-described method of moving a view point. For example, to obtain information about a shop located before a road at the current view point, the user himself does not indeed move, but rather, the user may move to the position only by moving the view point in the AR circumstance. According to an embodiment of the present disclosure, when the user moves a device (e.g., the electronic device 401) displaying AR or changes the direction thereof after the view point has been moved, the view point may further be changed with respect to the moved/changed view point. In other words, when the user moves the view point of the screen 100m ahead through a pressure input and then turns the device to the left, the processor 460 may move the view point to the left with respect to the view point which is positioned 100m ahead and provide information about the position to the user. By doing so, the user may identify actual information and virtual information about an alley located ahead even without the user's move.

Further, the screen that the electronic device 401 provides to the user in the view point-changed circumstance, e.g., at the virtually-shifted view point or virtually direction-changed view point may be an image obtained through the camera of the electronic device 401 or a virtual screen reconfigured using a 3D/2D map stored in at least one of the memory 450 of the electronic device 401 or an external electronic device (e.g., the electronic device 104 or server 106).

According to an embodiment of the present disclosure, the screen provided to the user in the view point-changed circumstance may be a virtual image generated using picture information stored in the external electronic device (e.g., the electronic device 104 or server 106). According to an embodiment of the present disclosure, the electronic device 401 may combine part of a virtual image source, such as a picture or map, with part of an actual image obtained by the electronic device 401 through the camera module 410 (e.g., the image sensor 415), configure it as an image at the view point of the electronic device 401, and provide it to the user.

Referring to FIG. 4B, according to an embodiment of the present disclosure, the electronic device 401 may include at least one of a touch sensor driving IC 423, a pressure sensor driving IC 427, a display driving IC 445, or a haptic actuator 470.

The touch sensor driving IC 423 may convert an analog signal received from the touch sensor 421 into a digital signal (e.g. X and Y coordinates) and transmit the digital signal to the processor 460.

According to an embodiment of the present disclosure, the touch sensor driving IC 423 may convert an analog signal by an input (e.g., a touch input) detected through the touch sensor 421 into a digital signal (e.g., X-Y coordinates) and transmit the same to the processor 460. The processor 460 may determine the attribute of the detected input (e.g., a touch input) using the digital signal received from the touch sensor driving IC 423. For example, the attribute of the detected input (e.g., a touch input) may include at least one of a type, a position (e.g., X-Y coordinates), a magnitude, duration, or a count. Where the input is a swipe input among touch inputs, the attribute of the input may further include a direction.

The pressure sensor driving IC 427 may convert an analog signal received from the pressure sensor 425 into a digital signal (e.g. a Z coordinate) and transmit the digital signal to the processor 460.

According to an embodiment of the present disclosure, the pressure sensor driving IC 427 may convert an analog signal by an input (e.g., a pressure input) detected through the pressure sensor 425 into a digital signal (e.g., a Z coordinate) and transmit the same to the processor 460. The processor 460 may determine the attribute of the detected input (e.g., a pressure input) using the digital signal received from the pressure sensor driving IC 427. In this case, the attribute of the detected input (e.g., the pressure input) may include at least one of, e.g., a type, a strength (e.g., a Z coordinate), duration, a count, or a direction.

Further, the pressure sensor driving IC 427 may convert an analog signal received from the pressure sensor 425 into a digital signal (e.g. X-Y coordinates) and further transmit the digital signal to the processor 460.

According to an embodiment of the present disclosure, the pressure sensor driving IC 427 may convert an analog signal by an input (e.g., a pressure input) detected through the pressure sensor 425 into a digital signal (e.g., X-Y coordinates) and further transmit the same to the processor 460. The processor 460 may determine the attribute of the detected input (e.g., a pressure input) using the digital signal received from the pressure sensor driving IC 427. In this case, the attribute of the detected input (e.g., the pressure input) may include, e.g., an input position.

The display driving IC 445 may receive predetermined image information from the processor 460 and output the same to the display 440. The image information may include at least one of, e.g., internal image data obtained from the image sensor 415, external image data received from at least one external electronic device (e.g., the electronic device 104 or server 106), or at least one virtual image generated based on at least a part of the internal/external image data and information related to the internal/external image data.

The haptic actuator 470 may provide a tactile sense corresponding to an input detected through the input sensor 420 to the user. For example, the haptic actuator 470 may be driven to provide different tactile senses depending on input types or input operation types of an input detected through the input sensor 420. The input types may include at least one of, e.g., a touch input or a pressure input. The input operation types may include at least one of, e.g., a single input, a double input, a continuous input, a swipe, a drag, or a drag-and-drop.

Referring to FIG. 4C, according to an embodiment of the present disclosure, the processor 460 of the electronic device 401 may include an AR/VR service module 471. The AR/VR service module 471 may be divided into at least one sub module. For example, the AR/VR service module 471 may include at least one of a view point setting module 471*a*, a view point generating module 471*b*, an object recognizing module 471*c*, an AR/VR data combining module 471*d*, or a display updating module 471*e*.

The view point setting module 471*a* may determine view point information of an image that the electronic device 401 is to display on the screen of the display 440. In the view point setting module 471*a*, the view point information of the image may remain initialized in a state where there is no request for changing the view point of the electronic device 401.

According to an embodiment of the present disclosure, upon detecting an input through the input sensor 420 while the first image data obtained from the image sensor 415 or the first virtual image data generated based on the first image data is displayed through the display 440, the view point setting module 471*a* may determine a virtually-shifted view point of the electronic device 401 based on an attribute of the detected input. The attribute of the detected input may include at least one of an input type, an input position, an input magnitude or strength, input duration, an input count, or an input direction.

For example, the view point setting module 471*a* may determine the position of the electronic device 401 using at least one of the image data obtained from the image sensor 415 based on the attribute of the detected input, global positioning satellite (GPS) information, or motion information of the electronic device 401 and determine the virtually-shifted view point of the electronic device 401 using at least one of attitude and directional information of the electronic device 401 (e.g., the camera module 410) at the determined position of the electronic device or view angle information of the obtained image data. Accordingly, the virtually-shifted view point of the electronic device 401 may include at least part of virtual position information of the electronic device 401 which is set by an input and directional information of the camera module 410 according to the attitude or direction of the electronic device 401 at the virtual position.

The view point generating module 471*b* may generate an image, that the electronic device 401 is to display on the screen of the display 440 corresponding to the determined view point, using the view point determined from the view point setting module 471*a*. The view point generating module 471*b*, unless there is a request for changing the view point of the electronic device 401, may output, on the screen of the display 440 without a view point change, the image data obtained through the camera module 410 or the virtual image data generated based on the obtained image data.

For example, where the view point of the electronic device 401 is changed by an input through the input sensor 420 and/or a change in attitude/direction of the electronic device 401, the view point generating module 471*b* may generate image data or virtual image data corresponding to a virtually-shifted view point to which the view point of the electronic device 401 has been shifted using at least one of GPS information or the obtained image data (e.g., a still image or video). In order to, e.g., generate the virtual image data, the view point generating module 471*b* may generate and provide image data or virtual image data at the changed view point (e.g., the virtually-shifted view point or virtually direction-changed view point) using information, such as the GPS information provided from the inside/outside of the electronic device 401, the captured internal/external image data, the 3D/2D map information, an image database or BIM database, or personal information.

According to an embodiment of the present disclosure, the processor 460 may lower the operation screen updating speed and operate the generation of the image data or virtual image data as per the change in view point. In other words, the processor 460 may generate and update new image data or virtual image data at each time interval or when a predetermined view point change occurs, rather than providing continuous forms of image data or virtual image data, such as a video.

According to an embodiment of the present disclosure, the processor 460 may properly mix and use the magnification and movement of the image data or the virtual image data. For example, where steadily advancing the view point, the processor 460 may apply a method of generating image data (or virtual image data) and a method of magnifying the generated image data (or virtual image data) alternately or at predetermined intervals, thereby reducing the load of synthesizing an image. Such determination of the period of generation of image data may dynamically be made based on the operation state of the electronic device 401 necessary to generate image data, such as network speed, CPU load of the electronic device 401, or memory usage.

According to an embodiment of the present disclosure, such operation of identifying a change in view point and generating image data may be carried out in real-time by the user's input. A module (not shown) for predicting the user's action for the real-time operation may be added and operated. The module (not shown) for predicting the user's action may predict the user's future movement of the view point considering, e.g., the user's moving speed, moving direction, GPS and map information, or the presence or absence of additional information and may previously generate and provide a frame that contains image information for a predicted view point based on such prediction.

According to an embodiment of the present disclosure, upon generating the image data or virtual image data at the virtually-shifted view point, the view point generating module 471*b* may assign a priority to the information of image data used and make a selection. For example, the view point generating module 471*b* may generate first image data or first virtual image data, which is generated based on the first image data, using information (e.g., 3D map information) having a first priority and may generate second image data or second virtual image data, which is generated based on the second image data, by merging information (e.g., picture, 2D map information, or BIM information) having a second priority with the generated first image data.

For example, the view point generating module 471*b* may generate the first image data or first virtual image data using the information (e.g., a picture or camera preview image) having the first priority and may generate supplemented second image data or second virtual image data, which is generated based on the second image data, by merging the information (e.g., 3D map information about an area that is not present in the picture or the camera preview image) having the second priority with the generated first image data.

The object recognizing module 471*c* may recognize at least one object in the internal image data obtained through the image sensor 415 or the external image data received from at least one external electronic device (e.g., the electronic device 104 or server 106). The object recognizing module 471c may use at least one of various methods for recognizing an object in the image data according to the related art. Accordingly, the method of recognizing an object in the image data is skipped from the detailed description herein.

The AR/VR data combining module 471d may receive information related to at least one object recognized in the internal/external image data and synthesize or merge the object-related information with the internal/external image data, thereby combining them.

The object recognizing module 471c and the AR/VR data combining module 471d may play a role to interoperate the recognition of an object in the image data or virtual image data generated through the view point generating module 471b with augmented data and/or virtual data related thereto in order to provide a reality service, such as AR and/or VR. The electronic device 401 may generate final image data (e.g., virtual image data), which is to be provided to the user, by merging together additional information about at least one object recognized in the image data displayed on the screen of the display 440 or superposing the additional information in the image data through the object recognizing module 471c and the AR/VR data combining module 471d.

The display updating module 471e may update the final image data generated through the AR/VR data combining module 471d and output the updated final image data to the display 440 of the electronic device 401, thereby providing the same to the user.

Although the electronic device 401 is described herein to include components for performing a reality service, such as VR or AR, embodiments of the present disclosure are not limited thereto. For example, the electronic device 401 may interwork or combine with an external electronic device (e.g., a smartphone) capable of performing the reality service to provide the reality service.

According to an embodiment of the present disclosure, the electronic device 401 may include a housing, a touchscreen display (e.g., the display 440), a pressure sensor 425, an image sensor 415, a wireless communication circuit (e.g., the communication circuit 430), a memory 450, and/or at least one processor (e.g., the processor 460).

The housing may include a first surface that faces in a first direction and a second surface that faces in a second direction which is an opposite direction of the first direction. The touchscreen display 440 may be disposed between the first and second surfaces of the housing and may be exposed through the first surface. The pressure sensor 425 may be disposed between the first and second surfaces of the housing and may be configured to detect a pressure by an external object on the touchscreen display 440. The image sensor 415 may be disposed to be exposed through the second surface of the housing. The wireless communication circuit 430 may be disposed inside the housing. The at least one processor 460 may be electrically connected with the touchscreen display 440, the pressure sensor 425, the image sensor 415, and/or the wireless communication circuit 430. The memory 450 may be electrically connected with the at least one processor. The memory 450 may store instructions executed to enable the processor 460 to display a user interface on the touchscreen display 440, the user interface configured to show an image and/or a video based on at least a portion of data from the image sensor 415, detect a touch input for an object in the image and/or the video through the touchscreen display 440, display information related to the object on the user interface, detect a pressure by the external object on the touchscreen display 440 using the pressure sensor 425 while the image and/or the video is displayed, and perform a zooming operation on the image sensor based on at least a portion of the detected pressure.

According to an embodiment of the present disclosure, the instructions may enable the processor 460 to determine a position of the pressure on the user interface using at least one of the touchscreen display 440 or the pressure sensor 425 and determine whether to perform the zooming operation or to receive an external image or video using the wireless communication circuit 430 based on at least partly on the determined position and/or the detected pressure.

According to an embodiment of the present disclosure, the instructions may enable the processor 460 to, when the determined position is within a range selected from the displayed image and/or video, perform the zooming operation, and when the determined position is outside the selected range, receive the external image or video.

According to an embodiment of the present disclosure, the instructions may enable the processor 460 to, when the detected pressure is less than a threshold level, perform the zooming operation, and when the detected pressure is not less than the threshold level, receive the external image or video.

According to an embodiment of the present disclosure, the instructions may enable the processor 460 to receive the external image or video using the wireless communication circuit 430 and display the external image or video to replace at least a portion of the provided external image and/or video based on at least a portion of data from the image sensor 415.

According to an embodiment of the present disclosure, the electronic device 401 may include a housing, a touchscreen display (e.g., the display 440), an image sensor 415, a wireless communication circuit (e.g., the communication circuit 430), a memory 450, and/or at least one processor (e.g., the processor 460).

The housing may include a first surface that faces in a first direction and a second surface that faces in a second direction which is an opposite direction of the first direction. The touchscreen display 440 may be disposed between the first and second surfaces of the housing and may be exposed through the first surface. The image sensor 415 may be disposed to be exposed through the second surface. The wireless communication circuit 430 may be disposed inside the housing. The at least one processor 460 may be electrically connected with the touchscreen display 440, the image sensor 415, and the wireless communication circuit 430. The memory 450 may be electrically connected with the at least one processor 460. The memory 450 may store instructions executed to enable the processor 460 to display a user interface on the touchscreen display 440, the user interface configured to show an image and/or a video based on at least a portion of data from the image sensor 415, detect a first input for an object in the image and/or the video through the touchscreen display 440, display information related to the object on the user interface, detect a second input while the image and/or video is displayed, and perform a zooming operation on the image sensor 415 in response to the second input.

According to an embodiment of the present disclosure, the instructions may enable the processor 460 to detect a position of the second input on the user interface using the touchscreen display 440 and determine whether to perform the zooming operation or to receive an external image or video using the wireless communication circuit 430 based on at least a portion of the detected position.

According to an embodiment of the present disclosure, the instructions may enable the processor 460 to receive the external image or video using the wireless communication circuit 430 and display the external image or video to replace the provided external image and/or video based on at least a portion of data from the image sensor 415.

According to an embodiment of the present disclosure, the electronic device 401 may include a housing, a touchscreen display (e.g., the display 440), a pressure sensor 425, an image sensor 415, a wireless communication circuit (e.g., the communication circuit 430), a memory 450, and/or at least one processor (e.g., the processor 460).

The housing may include a first surface that faces in a first direction and a second surface that faces in a second direction which is an opposite direction of the first direction. The touchscreen display 440 may be disposed between the first and second surfaces of the housing and may be exposed through the first surface. The pressure sensor 425 may be disposed between the first and second surfaces and may be configured to detect a pressure by an external object on the touchscreen display 440. The image sensor 415 may be disposed to be exposed through the second surface. The wireless communication circuit 430 may be disposed inside the housing. The at least one processor 460 may be electrically connected with the touchscreen display 440, the pressure sensor 425, the image sensor 415, and the wireless communication circuit 430. The memory 450 may be electrically connected with the at least one processor. The memory 450 may store instructions executed to enable the processor 460 to display a user interface on the touchscreen display 440, the user interface configured to show an image and/or a video stored in the memory 450 and/or received through the wireless communication circuit 430, detect a touch input for an object in the image and/or the video through the touchscreen display 440, display information related to the object on the user interface, detect a pressure by the external object on the touchscreen display 440 using the pressure sensor 425 while the image and/or the video is displayed, and perform a visual effect operation related to the image and/or video based on at least a portion of the detected pressure.

According to an embodiment of the present disclosure, the visual effect operation may include a zooming operation on the image and/or video.

According to an embodiment of the present disclosure, the visual effect operation may include changing the transparency of an object displayed for the image and/or video.

According to an embodiment of the present disclosure, the electronic device may include an image sensor 415, a communication circuit 430, a display 440, an input sensor 420, and/or a processor 460.

The image sensor 415 may obtain image data. The communication circuit 430 may receive information related to the obtained image data from at least one external electronic device (e.g., the electronic device 104 or server 106). The display 440 may output at least a portion of the obtained image data or the information related to the obtained image data. The input sensor 420 may detect at least one input. The processor 460 may be configured to determine a current view point of the electronic device 401 based on the obtained image data, when the input is detected while displaying a first virtual image generated at the determined current view point, determine a virtually-shifted view point of the electronic device 401 corresponding to the detected input, and display a second virtual image generated at the determined virtually-shifted view point.

According to an embodiment of the present disclosure, the processor 460 may detect a position of the electronic device 401 from which the image data has been obtained and determines that a view point corresponding to the detected position of the electronic device 401 in the obtained image data is the current view point of the electronic device 401.

According to an embodiment of the present disclosure, the processor 460 may recognize at least one first object in the obtained image data, obtain first information related to the at least one first object recognized, generate the first virtual image corresponding to the current view point based on at least a portion of the obtained image data or the obtained first information related to the at least one first object, and display the generated first virtual image.

According to an embodiment of the present disclosure, upon detecting an input corresponding to the recognized, at least one, first object from the input sensor while displaying the first virtual image, the processor 460 may change an attribute of the at least one first object based on the obtained first information.

According to an embodiment of the present disclosure, the attribute of the at least one first object may include a degree of transparency.

According to an embodiment of the present disclosure, the processor 460 may determine whether a first input is detected from the input sensor 420 while displaying the first virtual image generated at the current view point. When the first input is detected, the processor 460 may determine the virtually-shifted view point of the electronic device 401 based on the detected attribute of the first input. The processor 460 may calculate a position displacement of the electronic device corresponding to a position displacement from the current view point to the virtually-shifted view point and detect a virtually shifted position of the electronic device based on the calculated position displacement of the electronic device. The processor 460 may obtain or receive image data from at least one of the image sensor 415 or the external electronic device at the detected virtually shifted position of the electronic device. The processor 460 may recognize at least one second object in the image data obtained or received at the detected virtually shifted position of the electronic device 401 and obtain second information related to the at least one second object recognized. The processor 460 may generate the second virtual image corresponding to the virtually-shifted view point based on at least a portion of the image data or the second information related to the at least one second object recognized and display the generated second virtual image.

According to an embodiment of the present disclosure, the attribute of the detected first input may include at least one of an input type, an input position, an input magnitude, an input strength, input duration, an input count, or an input direction.

According to an embodiment of the present disclosure, the processor 460 may display the second virtual image while the first input is maintained.

According to an embodiment of the present disclosure, the processor 460 may display the first virtual image unless the first input is maintained.

According to an embodiment of the present disclosure, the processor 460 may determine whether a second input is detected from the input sensor 420 while displaying the second virtual image generated at the virtually-shifted view point. When the second input is detected, the processor 460 may determine a virtually direction-changed view point redirected with respect to the virtually-shifted view point based on an attribute of the detected second input and calculate a variation in an attitude or direction of the electronic device 401 from the virtually-shifted view point to the virtually direction-changed view point to detect at least one of a virtual changed attitude or a virtual changed direction of the electronic device 401. The processor 460 may obtain or receive image data from at least one of the image sensor 415 or the external electronic device based on at least one of the detected virtual changed attitude or virtual changed direction of the electronic device 401. The processor 460 may recognize at least one third object in the image data obtained or received based on at least one of the detected virtual changed attitude or virtual changed direction of the electronic device 401 and obtain third information related to the at least one third object recognized. The processor 460 may generate a third virtual image corresponding to the virtually direction-changed view point based on at least a portion of the image data or the third information related to the at least one third object recognized and display the generated third virtual image.

According to an embodiment of the present disclosure, the attribute of the detected second input may include at least one of an input position or an input direction.

According to an embodiment of the present disclosure, the processor 460 may determine whether a second input is detected from the input sensor 420 while displaying the second virtual image generated at the virtually-shifted view point, and when the second input is detected, fix the virtually-shifted view point.

Figure 5:
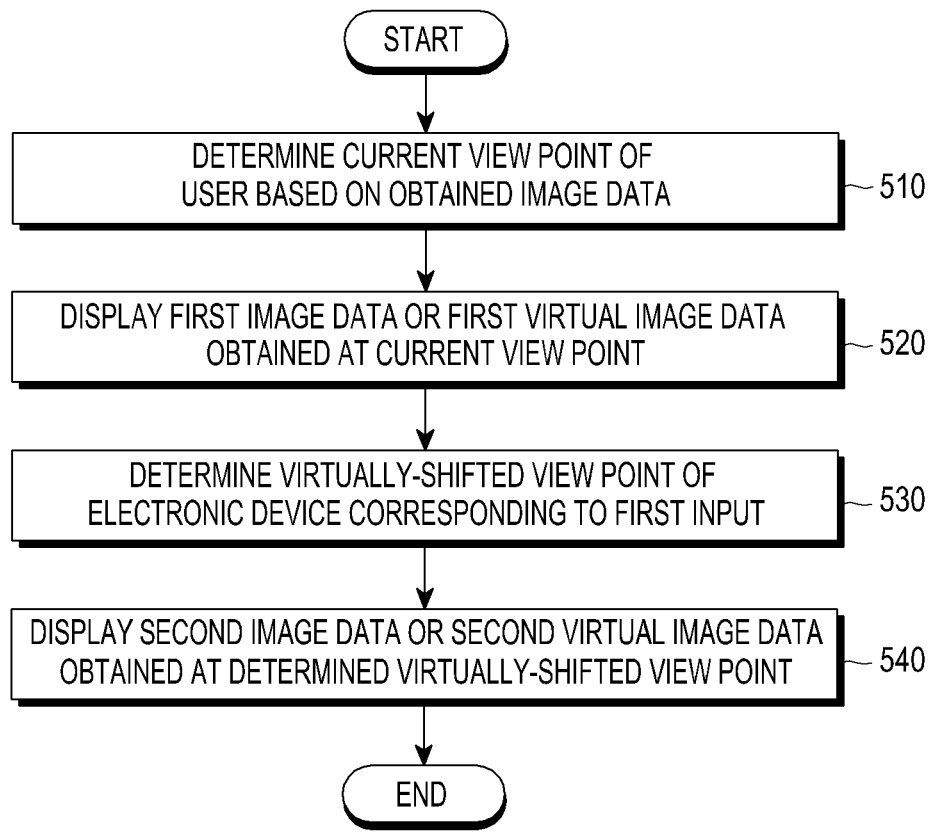
FIG. 5 is a flowchart illustrating a method for controlling an electronic device according to an embodiment of the present disclosure.

FIG. 5 is a flowchart illustrating a method for controlling an electronic device according to an embodiment of the present disclosure. A method for controlling an electronic device (e.g., the electronic device 401) may include operations 510 to 540. The method for controlling an electronic device may be performed by at least one of the electronic device (e.g., the electronic device 401) or a processor (e.g., the processor 460) of the electronic device.

In operation 510, for example, the electronic device may determine a user's current view point based on image data obtained through a camera module (e.g., the image sensor 415 in the camera module 410). For example, the electronic device, upon running a reality service (e.g., VR and/or AR)-related application, may obtain image data through the camera module of the electronic device, detect at least one of the position, attitude, or direction of the electronic device from which the image data has been obtained, and determine that a current view point of the electronic device is a view point corresponding to the camera module (e.g., the central view angle of the image sensor) based on at least one of the detected position, attitude, or direction of the electronic device.

According to an embodiment of the present disclosure, upon obtaining the image data through the image sensor, the electronic device may detect the current position of the electronic device through various positioning schemes, such as the GPS or short-range positioning devices using other communication network signals or a beacon.

According to an embodiment of the present disclosure, where the electronic device receives an input (e.g., at least one of a touch input or a pressure input) generated by the user, the electronic device may differentiate the magnitude or strength of the input and may calculate the position displacement from the current position of the electronic device to a virtual position to which the electronic device is to move in the direction of the central view angle of the camera module (e.g., the image sensor). The electronic device may determine the virtually-shifted view point based on the position displacement from the current position to the virtual position.

In operation 520, for example, the electronic device may display first image data that is obtained at the determined current view point or first virtual image data that is generated based on the first image data. For example, the electronic device may generate the first virtual image data by merging or synthesizing the first image data obtained through the image sensor of the electronic device at the determined current view point and/or information related to the first image data obtained at the current view point.

For example, the information related to the first image data obtained at the determined current view point may include at least one of map information (e.g., 2D/3D map information) based on the current position of the electronic device or information (e.g., BIM information, indoor map information, or personal information) regarding at least one object (e.g., a first object) within the obtained first image data. The electronic device may display, on the display (e.g., the display 440) of the electronic device, the obtained first image data or the generated first virtual image data.

In operation 530, for example, upon detecting the input (e.g., a first input) while displaying the first image data obtained at the determined current view point or the first virtual image data generated based on the first image data, the electronic device may determine the virtually-shifted view point of the electronic device corresponding to the detected first input.

For example, upon detecting the first input (e.g., a touch input or pressure input) through the input sensor (e.g., the touch sensor 421 or pressure sensor 425 of the input sensor 420) while displaying the first image data obtained at the determined current view point or the first virtual image data generated based on the first image data, the electronic device may determine the virtually-shifted view point of the electronic device corresponding to the attribute of the detected first input.

According to an embodiment of the present disclosure, the attribute of the detected first input may include at least one of, e.g., an input type (e.g., a touch input or pressure input), an input magnitude, an input strength, input duration, an input count, or an input direction. The electronic device may control the virtually-shifted view point to stepwise or continuously move according to the level of each attribute of the detected first input.

In operation 540, for example, the electronic device may display, on the display of the electronic device, second image data obtained at the determined virtually-shifted view point or second virtual image data generated based on the second image data while the first input is maintained.

According to an embodiment of the present disclosure, the electronic device may generate second virtual image data by merging or synthesizing the second image data, which is obtained through the image sensor or the at least one external electronic device (e.g., the electronic device 104 or server 106) at the determined virtually-shifted view point and/or information related to the obtained second image data.

For example, the information related to the second image data obtained at the determined virtually-shifted view point may include at least one of map information (e.g., 2D/3D map information) based on the virtually shifted position of the electronic device or information (e.g., BIM information, indoor map information, or personal information) regarding at least one object (e.g., a second object) within the obtained second image data.

According to an embodiment of the present disclosure, the electronic device may perform object recognition on the first or second image data (or the first or second virtual image data) obtained or generated at the current view point or virtually-shifted view point, search and obtain information about a corresponding object from an external electronic device or server (e.g., an augmented information server) based on the same, and attach the same to an object in the corresponding image data (or the corresponding virtual image data), thereby displaying, on the user's screen, additional information about an object present in the image data obtained or generated at the current view point or virtually-shifted view point.

Figure 6:
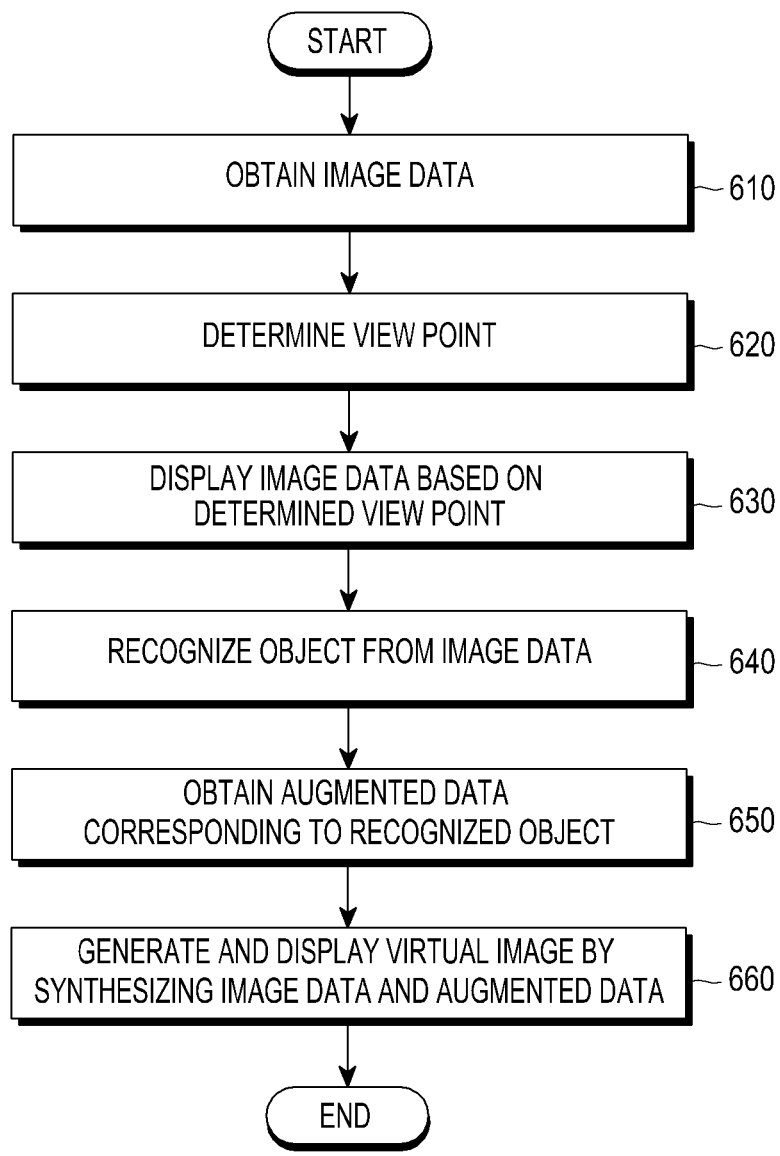
FIG. 6 is a flowchart illustrating a method for controlling an electronic device according to an embodiment of the present disclosure.

FIG. 6 is a flowchart illustrating a method for controlling an electronic device according to an embodiment of the present disclosure.

Referring to FIG. 6 is a flowchart illustrating a method for generating virtual image data based on image data obtained at a predetermined view point of the electronic device in operation 520 or 540 of FIG. 5. The method for controlling the electronic device may include operations 610 to 660. The method for controlling an electronic device may be performed by at least one of the electronic device (e.g., the electronic device 401) or a processor (e.g., the processor 460) of the electronic device.

In operation 610, for example, the electronic device may obtain predetermined image data through the camera module (e.g., the image sensor 415 in the camera module 410). The obtained image data may include at least one of a static image (e.g., a still image) or moving images (e.g., a video).

In operation 620, for example, the electronic device may determine the view point of the electronic device based on the image data obtained through the camera module. For example, the electronic device may detect at least one of the position, attitude, or direction of the electronic device from which the image data has been obtained and determine that the view point of the electronic device is a view point corresponding to the camera module (e.g., the central view angle of the image sensor) based on at least one of the detected position, attitude, or direction of the electronic device.

In operation 630, for example, the electronic device may display, on the display (e.g., the display 440), the image data obtained from the camera module based on the determined view point.

In operation 640, for example, the electronic device may recognize at least one object from the image data displayed on the display.

In operation 650, for example, the electronic device may obtain information (e.g., BIM information, indoor map information, or personal information) related to the at least one object recognized, from the memory (e.g., the memory 450) of the electronic device or at least one external electronic device (e.g., the electronic device 104 or server 106). Further, the electronic device may obtain information related to the image data obtained at the determined view point. The information related to the image data obtained at the determined view point may include map information (e.g., 2D/3D map information) based on the position of the electronic device corresponding to the determined view point.

In operation 660, for example, the electronic device may generate virtual image data by merging or synthesizing the image data obtained through the camera module of the electronic device at the determined view point or the image data obtained or received from at least one of the memory of the electronic device or at least one external electronic device at the determined view point with the information related to the obtained or received image data or information related to at least one object in the obtained or received image data and may display the generated virtual image data on the display.

Figure 7:
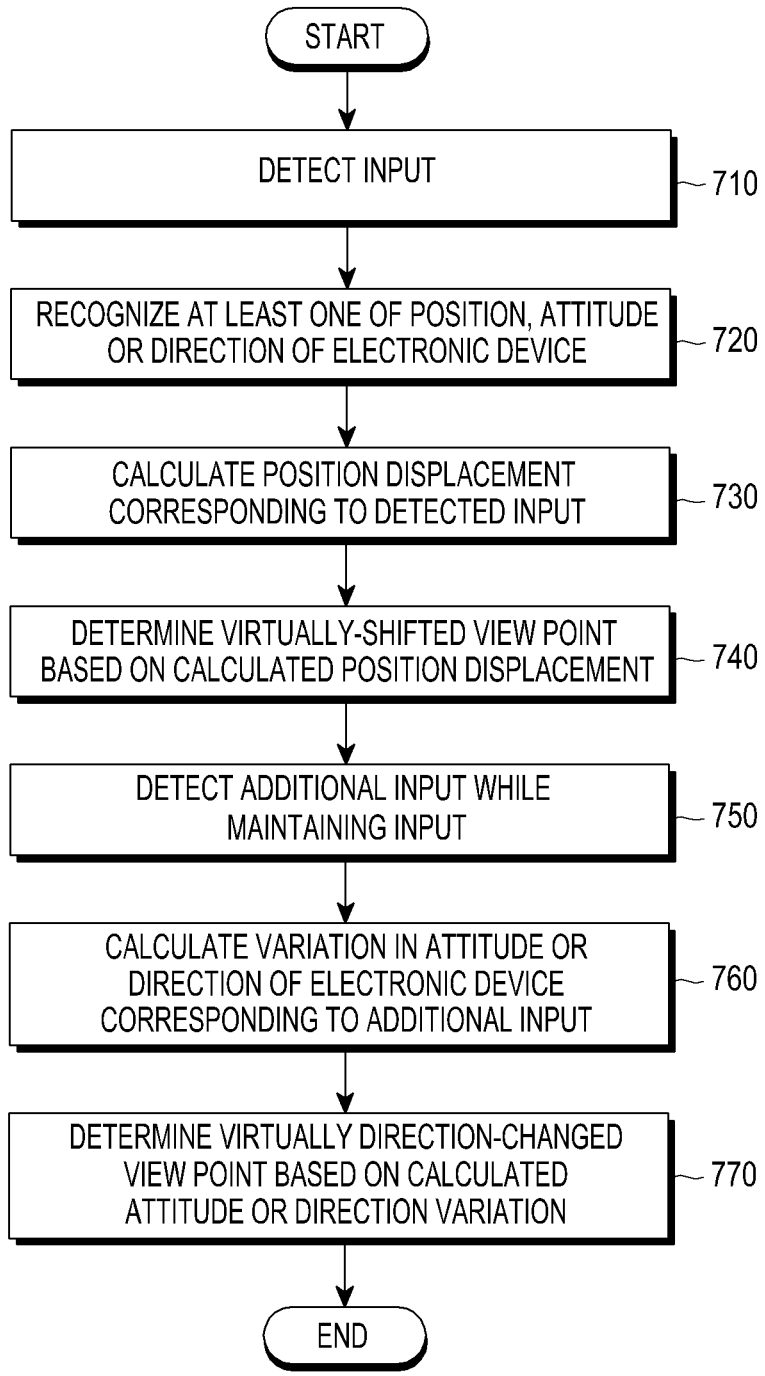
FIG. 7 is a flowchart illustrating a method for controlling an electronic device according to an embodiment of the present disclosure.

FIG. 7 is a flowchart illustrating a method for controlling an electronic device according to an embodiment of the present disclosure.

Referring to FIG. 7 is a flowchart illustrating a method for determining a virtual view point (e.g., a virtually-shifted view point or virtually direction-changed view point) of an electronic device (e.g., the electronic device 401). The method for controlling the electronic device may include operations 710 to 770. The method for controlling an electronic device may be performed by at least one of the electronic device (e.g., the electronic device 401) or a processor (e.g., the processor 460) of the electronic device.

In operation 710, for example, the electronic device, upon running an application related to a reality service, such as VR or AR, may detect an input (e.g., a first input) generated by the user while displaying, on the display (e.g., the display 440) of the electronic device, first image data obtained at the current view point of the electronic device or first virtual image data generated based on the first image data. For example, the electronic device may determine whether the first input is detected by periodically or aperiodically monitoring whether the first input (e.g., at least one of a touch input or pressure input) is detected through an input sensor (e.g., the touch sensor 421 or pressure sensor 425 of the input sensor 420) of the electronic device while displaying the first image data or the first virtual image data.

In operation 720, for example, when the input (e.g., the first input) is detected while displaying the first image data or the first virtual image data, the electronic device may recognize the position, attitude, or direction of the electronic device. For example, the electronic device may detect the position of the electronic device through a positioning device (not shown), such as a GPS device included in the electronic device. Also, the electronic device may detect at least one of the attitude or direction of the electronic device based on a combination of information sensed from, e.g., location-based sensors (not shown) (e.g., an acceleration sensor, a gyro sensor, a geo-magnetic sensor, a gravity sensor, or an air pressure sensor) included din the electronic device. The detected attitude or direction of the electronic device may be, e.g., the direction of the central view angle of the camera module (e.g., the image sensor 415 in the camera module 410) of the electronic device.

According to an embodiment of the present disclosure, upon recognizing the position of the electronic device through a positioning device (not shown), e.g., a GPS device, the electronic device may detect the input (e.g., the first input).

In operation 730, for example, the electronic device may calculate a position displacement of the electronic device corresponding to the detected first input. For example, the electronic device may calculate the position displacement of the electronic device corresponding to the detected first input based on an attribute of the detected input (e.g., the first input).

According to an embodiment of the present disclosure, the attribute of the detected input (e.g., the first input) may include at least one of, e.g., an input type (e.g., a touch input or pressure input), an input magnitude, an input strength, input duration, an input count, or an input direction.

The position displacement may previously be set according to the level of the first input based on, e.g., the attribute of the first input. For example, where the first input is a pressure input, the position displacement may previously be set corresponding to the strength level of the pressure input. For example, where the strength of the first input is a first level, the position displacement may be set to 10 m. The position displacement may be set to be increased by 10 m as the level is increased by one step.

Upon detecting the first input, the electronic device may determine the attribute of the first input and calculate the position displacement according to the level corresponding to the determined attribute of the first input. For example, where the attribute of the first input is a pressure input, and its strength is a first level, the electronic device may calculate the position displacement, which has been 10 m shifted in the direction of the central view angle of the camera module of the electronic device from the detected position, as the position displacement corresponding to the first input.

In operation 740, for example, the electronic device may determine the virtually-shifted view point of the electronic device based on the calculated position displacement. For example, the electronic device may determine that the position to which the detected position has been shifted by the calculated position displacement in the detected direction of the central view angle of the camera module is the virtually shifted position of the electronic device and may determine that the view point corresponding to the view angle range having the central view angle of the camera module as a reference at the determined virtually shifted position is the virtually-shifted view point of the electronic device.

In operation 750, for example, the electronic device may detect an additional input (e.g., a second input) while the detected input (e.g., the first input) is maintained. For example, the electronic device may detect an additional input (e.g., the second input) generated by the user while displaying the first image data or first virtual image data while the detected input is maintained. For example, the electronic device may determine whether the second input is detected by periodically or aperiodically monitoring whether the second input (e.g., a touch input or pressure input) is detected through the input sensor (e.g., the touch sensor 421 or pressure sensor 425 of the input sensor 420) of the electronic device while displaying the first image data or the first virtual image data while the detected first input is maintained.

In operation 760, for example, upon detecting the additional input (e.g., the second input) while displaying the first image data or first virtual image data while the detected input (e.g., the first input) is maintained, the electronic device may calculate a variation in the attitude or direction of the electronic device corresponding to the additional input. For example, the electronic device may calculate the variation in attitude or direction of the electronic device corresponding to the detected second input based on an attribute of the additional input (e.g., the second input).

According to an embodiment of the present disclosure, the attribute of the detected additional input (e.g., the second input) may include at least one of, e.g., an input type (e.g., a touch input or pressure input), an input position, an input magnitude, an input strength, input duration, an input count, or an input direction.

The variation in attitude or direction of the electronic device may be determined according to, e.g., the position or level of the second input based on the attribute of the second input. For example, the electronic device may determine the angle and direction in which the central view angle of the camera module has been redirected corresponding to the position of the second input. For example, the electronic device may determine the angle and direction in which the central view angle of the camera module has been redirected according to the position and distance between the center of the display screen of the electronic device and the position (e.g., where the X-Y coordinates are (x,y)) of the detected second input with respect to the center of the display screen. For example, the center (e.g., where the X-Y coordinates are (0,0)) of the display screen may correspond to the central view angle of the camera module. The upper-lower direction of the central view angle of the camera module and the degree, i.e., upper-lower angle, of the change of the upper-lower direction may be determined according to the position (e.g., the Y-axis coordinate) of the second input with respect to the horizontal axis (e.g., the X axis) passing through the center of the display screen, and the left-right direction of the central view angle of the camera module and the degree, i.e., left-right angle, of the change of the left-right direction may be determined according to the position (e.g., the X-axis coordinate) of the second input with respect to the vertical axis (e.g., the Y axis) passing through the center of the display screen. Accordingly, where the second input is a touch input, the electronic device may determine the angle and direction in which the central view angle of the camera module has been redirected according to the position (x,y) of the detected second input with respect to the center (0,0) of the display screen. Further, the electronic device may stepwise change the virtually direction-changed view point in the determined direction by a preset depth according to the level of the attribute of the second input. Likewise, also when the second input is, e.g., a swipe input, the electronic device may determine the angle and direction in which the central view angle of the camera module has been redirected according to the swiped length and direction of the second input with respect to the center (0,0) of the display screen.

The electronic device may calculate a variation in attitude or direction of the electronic device from the virtually shifted position to the determined angle and direction in which the central view angle of the camera module has been redirected. For example, the variation in attitude or direction of the electronic device may be detected based on a combination of location-based sensor information of the electronic device. For example, the location-based sensor information for detecting the position, attitude, and direction of the electronic device may be determined based on information detected from at least one of an acceleration sensor, a geo-magnetic sensor, a gravity sensor, an air pressure sensor, or a combination thereof. It may also be estimated using, e.g., a displacement of a particular area of the image data inputted to the electronic device, i.e., a motion vector variation of the image.

In operation 770, for example, the electronic device may determine the virtually direction-changed view point of the electronic device based on the calculated attitude or direction variation of the electronic device. For example, the electronic device may determine the direction in which the electronic device faces, i.e., the angle and direction in which the camera lens (e.g., the central view angle of the image sensor) faces, based on the calculated attitude or direction variation of the electronic device and may determine that a view point corresponding to the view angle range of the camera module corresponding to the determined angle and direction is the virtually direction-changed view point.

Figure 8:
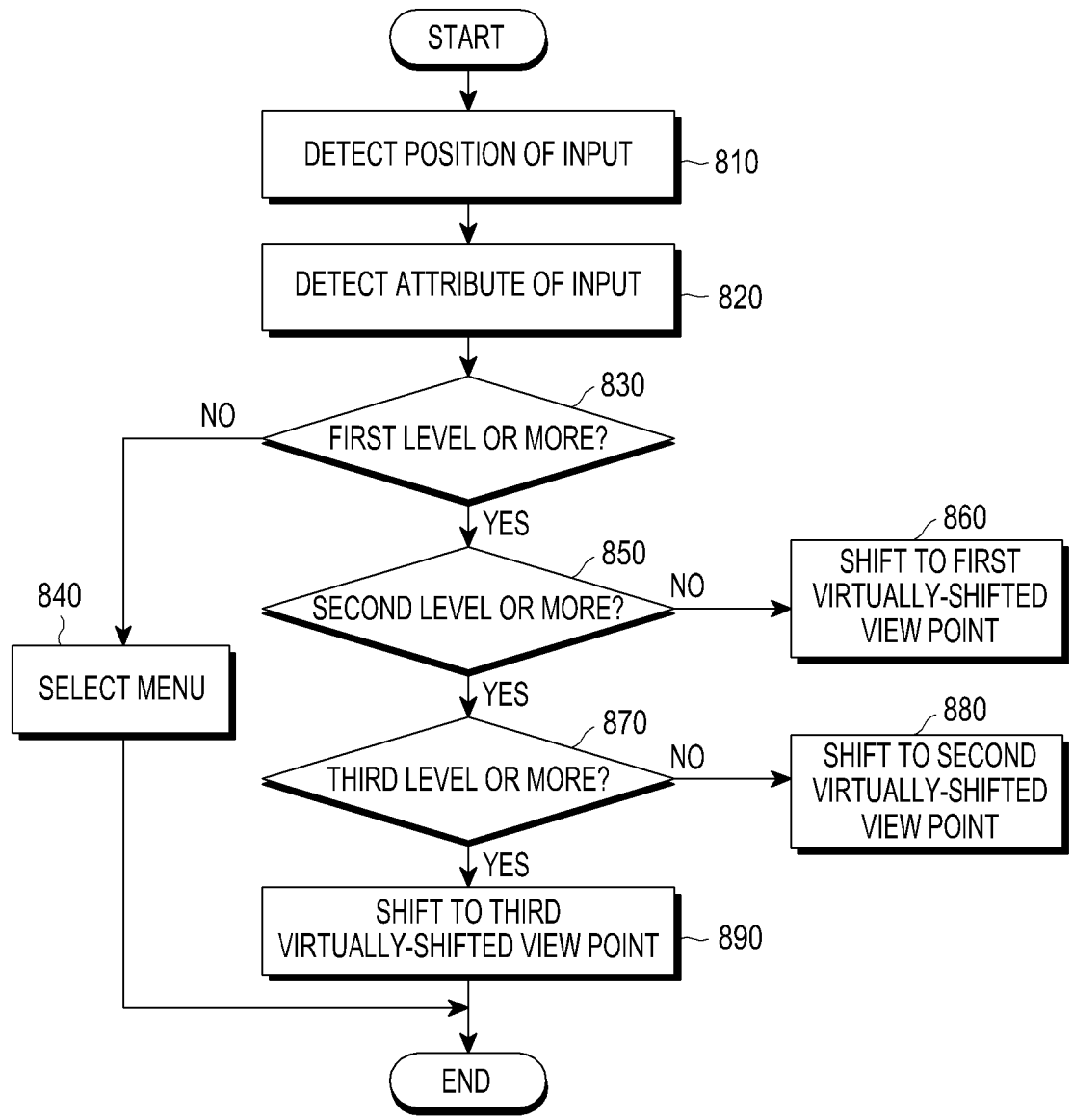
FIG. 8 is a flowchart illustrating a method for controlling an electronic device according to an embodiment of the present disclosure.

FIG. 8 is a flowchart illustrating a method for controlling an electronic device according to an embodiment of the present disclosure.

Referring to FIG. 8 is a flowchart illustrating a method for determining a virtually-shifted view point of an electronic device (e.g., the electronic device 401). The method for controlling the electronic device may include operations 810 to 890. The method for controlling an electronic device may be performed by at least one of the electronic device (e.g., the electronic device 401) or a processor (e.g., the processor 460) of the electronic device.

In operation 810, for example, the electronic device may detect the position of an input (e.g., a first input) while displaying first image data obtained at the user's current view point or first virtual image data generated based on the first image data.

In operation 820, for example, the electronic device may detect an attribute of the detected first input. For example, the attribute of the detected first input may include at least one of, e.g., an input type (e.g., a touch input or pressure input), an input position, an input magnitude, an input strength, input duration, an input count, or an input direction. The electronic device may control the virtually-shifted view point to stepwise or continuously move according to the level of each attribute of the detected first input.

In operation 830, for example, the electronic device may determine whether the attribute level of the first input is not less than a preset first level. When the attribute level of the first input is not less than the first level in operation 830, the electronic device may perform operation 850, and when the attribute level of the first input is less than the first level, the electronic device may perform operation 840.

In operation 840, for example, when the attribute level of the first input is less than the first level, the electronic device may select a menu corresponding to the first input in operation 840. In other words, when the attribute level of the first input is less than the first level, the electronic device may determine that the first input is not an input for virtually moving the view point of the electronic device.

In operation 850, for example, when the attribute of the first input is not less than the first level, the electronic device may determine whether the attribute level of the first input is not less than a preset second level. When the attribute level of the first input is not less than the second level in operation 850, the electronic device may perform operation 870, and when the attribute level of the first input is less than the second level, the electronic device may perform operation 860.

In operation 860, for example, when the attribute of the first input is less than the second level, the electronic device may move the view point of the electronic device to a first virtually-shifted view point corresponding to a first depth. For example, while the first input remains not less than the first level and less than the second level, the electronic device may be moved to the first virtually-shifted view point which has been virtually shifted by the first depth from the current view point. The electronic device may also display, on the display (e.g., the display 440) of the electronic device, second image data obtained at the first virtually-shifted view point or second virtual image data generated based on the second image data.

In operation 870, for example, when the attribute of the first input is not less than the second level, the electronic device may determine whether the attribute level of the first input is not less than a preset third level. When the attribute level of the first input is not less than the third level in operation 870, the electronic device may perform operation 890, and when the attribute level of the first input is less than the third level, the electronic device may perform operation 880.

In operation 880, for example, when the attribute of the first input is less than the third level, the electronic device may move the view point of the electronic device to a second virtually-shifted view point corresponding to a second depth. For example, while the first input remains not less than the second level and less than the third level, the electronic device may be moved to the second virtually-shifted view point which has been virtually shifted by the second depth from the current view point. The electronic device may also display, on the display of the electronic device, third image data obtained at the second virtually-shifted view point or third virtual image data generated based on the third image data.

In operation 890, for example, when the attribute of the first input is less than the third level, the electronic device may move the view point of the electronic device to a third virtually-shifted view point corresponding to a third depth. For example, while the first input remains not less than the third level, the electronic device may be moved to the third virtually-shifted view point which has been virtually shifted by the third depth from the current view point. The electronic device may also display, on the display of the electronic device, fourth image data obtained at the third virtually-shifted view point or fourth virtual image data generated based on the fourth image data.

Although the embodiment in which the first input has three steps form the first level to the third level have been described, embodiments of the present disclosure are not limited thereto, and more or less steps of levels may be configured depending on the capability of the electronic device.

Figure 9A:
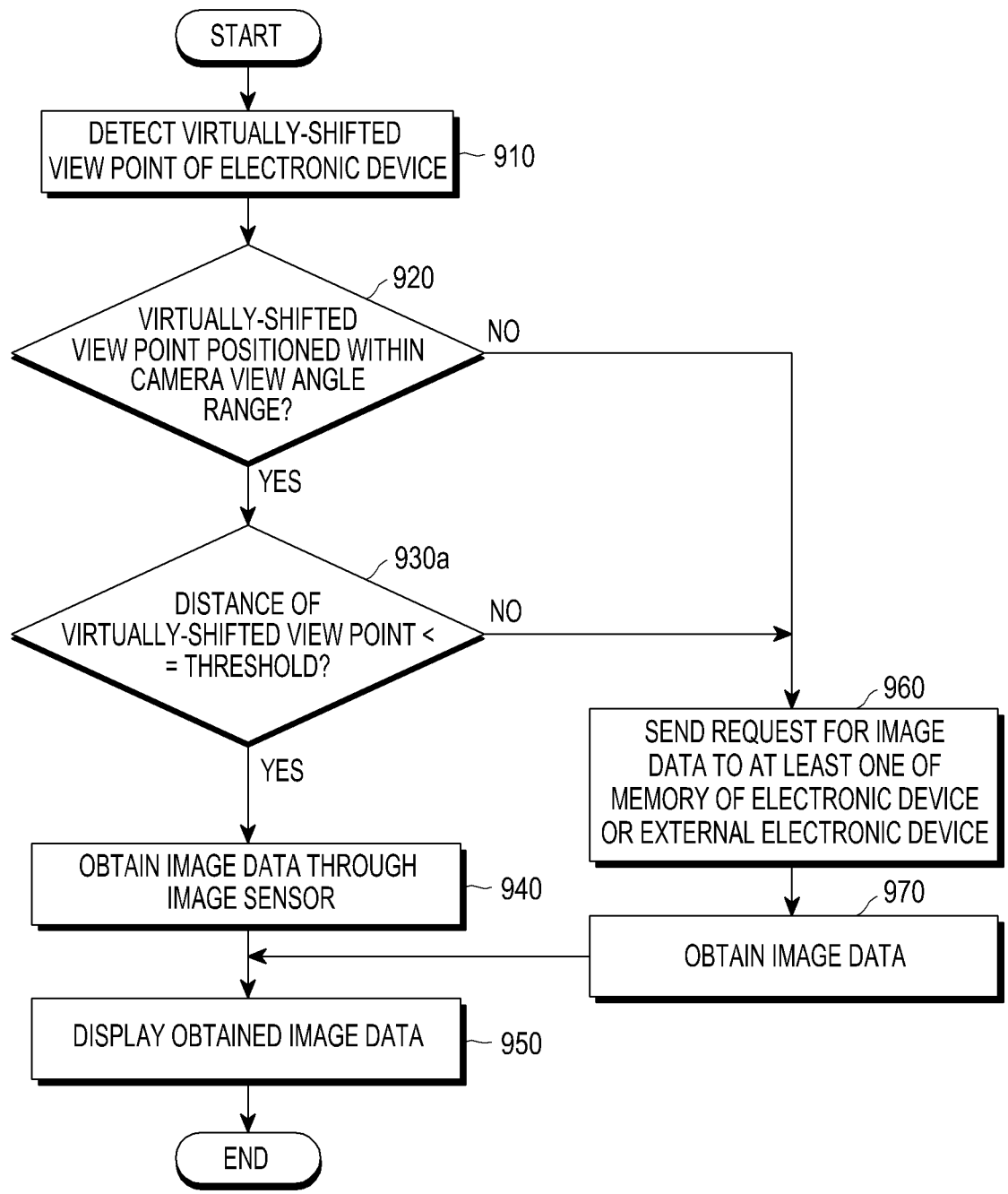
FIGS. 9A and 9B are flowcharts illustrating a method for controlling an electronic device according to various embodiments of the present disclosure.

FIG. 9A is a flowchart illustrating a method for controlling an electronic device according to an embodiment of the present disclosure. Referring to FIG. 9A is a flowchart illustrating a method for ensuring the quality of image data or virtual image data obtained at a virtually-shifted view point of an electronic device. The method for controlling an electronic device may include operations 910 to 970. The method for controlling an electronic device may be performed by at least one of the electronic device (e.g., the electronic device 401) or a processor (e.g., the processor 460) of the electronic device.

In operation 910, for example, upon detecting a first input while displaying first image data obtained at a current view point or first virtual image data generated based on the first image data, the electronic device may determine a virtually shifted position of the electronic device corresponding to the detected first input. For example, upon detecting the first input, the electronic device may determine an attribute of the first input and calculate a preset position displacement according to a level corresponding to the determined attribute of the first input. For example, where the attribute of the first input is a pressure input, and its strength is a first level, the electronic device may calculate a position displacement, which has been 10 m shifted in the detected direction of the central view angle of the camera module (e.g., the camera module 410) of the electronic device from the detected position, as the position displacement corresponding to the first input. For example, the electronic device may determine that the position to which the detected position has been shifted by the calculated position displacement in the detected direction of the central view angle of the camera module is the virtually shifted position of the electronic device and may determine that the view point corresponding to the view angle range having the central view angle of the camera module as a reference at the determined virtually shifted position is the virtually-shifted view point of the electronic device.

In operation 920, for example, the electronic device may determine whether the detected virtually shifted position of the electronic device is within a zoominable or zoomoutable view angle range of the camera module of the electronic device. When the detected virtually shifted position of the electronic device is within the zoominable or zoomoutable view angle range of the camera module of the electronic device in operation 920, the electronic device may perform operation 930a, and when the detected virtually shifted position of the electronic device is outside the zoominable or zoomoutable view angle range of the camera module of the electronic device, the electronic device may perform operation 960.

In operation 930a, for example, when the detected virtually shifted position of the electronic device is within the zoominable or zoomoutable view angle range of the camera module of the electronic device, the electronic device may determine whether the distance of the virtually-shifted view point of the electronic device is less than a threshold (e.g., 30m). When the distance of the virtually-shifted view point of the electronic device is less than the threshold in operation 930a, the electronic device may perform operation 940, and when the distance of the virtually-shifted view point of the electronic device is not less than the threshold, the electronic device may perform operation 960.

In operation 940, for example, the electronic device may obtain image data through an image sensor of the electronic device. The image data may be obtained by performing a zooming operation on the image sensor. The electronic device may also generate virtual image data based on the obtained image data.

In operation 950, for example, the electronic device may display the obtained image data on the display (e.g., the display 440) of the electronic device. The electronic device may also display the generated virtual image data on the display of the electronic device.

Meanwhile, in operation 960, for example, when the detected virtually shifted position of the electronic device is outside the zoominable or zoomoutable view angle range of the camera module of the electronic device or when the distance of the virtually-shifted view point is not less than the threshold (e.g., 30 m), the electronic device may send a request for image data, which is based on the virtually shifted position of the electronic device, to at least one of the memory (e.g., the memory 450) of the electronic device or at least one external electronic device (e.g., the electronic device 104 or server 106).

In operation 970, for example, the electronic device may obtain the image data, which is based on the virtually shifted position of the electronic device, from at least one of the memory or the at least one external electronic device in response to the request. The electronic device may also generate virtual image data based on the obtained image data.

The obtained image data or the virtual image data generated based on the obtained image data may be displayed on the display (e.g., the display 440) of the electronic device in operation 950.

Figure 9B:
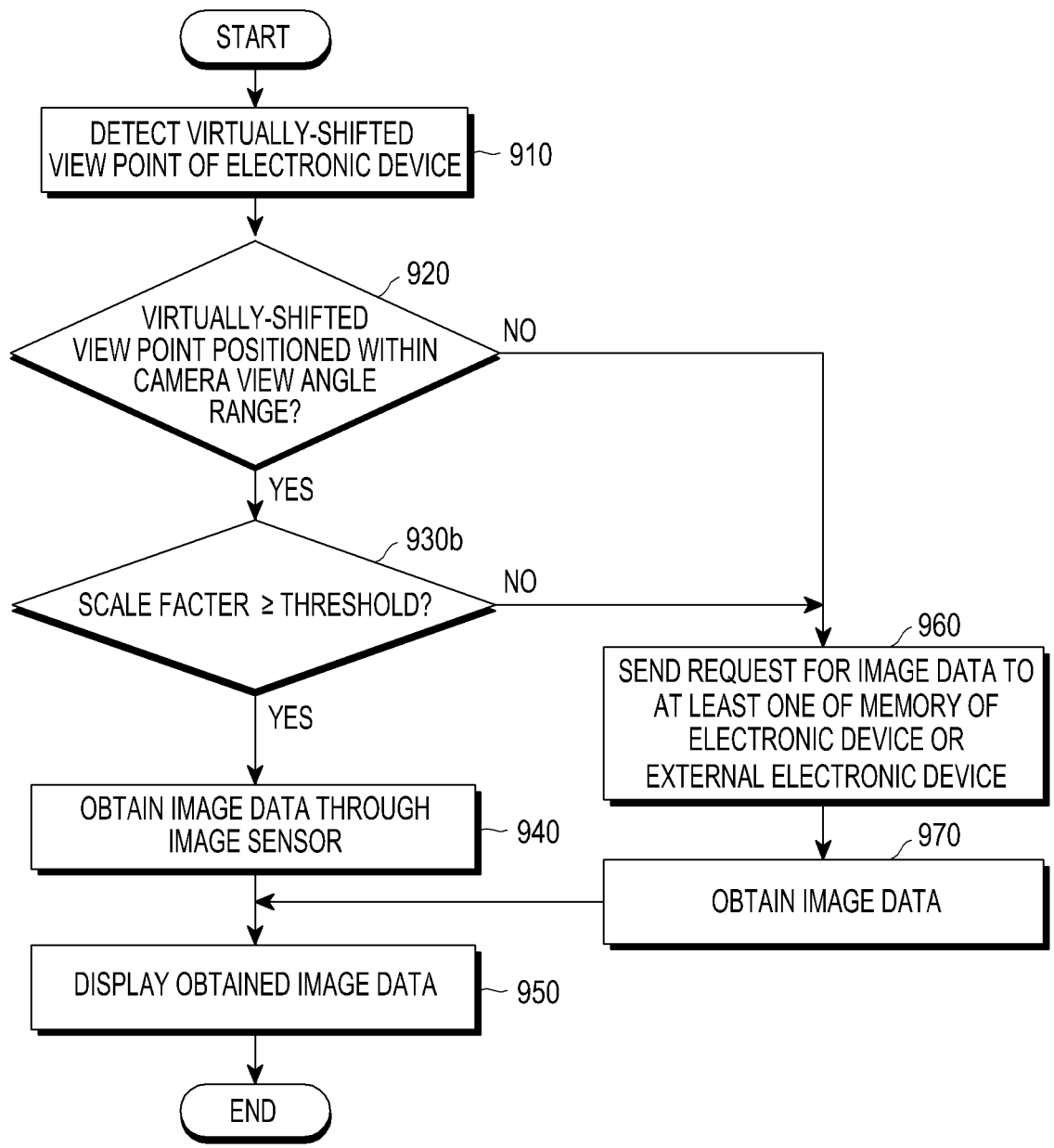

FIG. 9B is a flowchart illustrating a method for controlling an electronic device according to an embodiment of the present disclosure.

Referring to FIG. 9B is a flowchart illustrating a method for ensuring the quality of image data or virtual image data obtained at a virtually-shifted view point of an electronic device. The method for controlling an electronic device may include operations 910 to 970. The method for controlling an electronic device may be performed by at least one of the electronic device (e.g., the electronic device 401) or a processor (e.g., the processor 460) of the electronic device.

All of the operations of FIG. 9B, other than operation 930a, are the same as the operations of FIG. 9A, and the detailed description may apply to the same operations.

In operation 930b, for example, the electronic device may determine whether a scale factor of the image data obtained from the camera module (e.g., the image sensor 415 in the camera module 410) of the electronic device is not less than a threshold (e.g., 0.5). The scale factor may be a parameter indicating the quality of the image data. When the scale factor of the image data obtained through the camera module of the electronic device is not less than the threshold in operation 930b, the electronic device may perform operation 940, and when the scale factor of the obtained image data is less than the threshold, the electronic device may perform operation 960.

According to an embodiment of the present disclosure, the electronic device may obtain image data using an image sensor, display, on a display, the image data obtained using the image sensor, determine an input to a point in the displayed image data, and display pre-obtained image data corresponding to the input on the display.

According to an embodiment of the present disclosure, the electronic device may obtain image data, determine a current view point of the electronic device based on the obtained image data, when an input is detected while displaying a first virtual image generated at the determined current view point, determine a virtually-shifted view point of the electronic device corresponding to the detected input, and display a second virtual image generated at the determined virtually-shifted view point.

According to an embodiment of the present disclosure, upon determining the current view point of the electronic device based on the obtained image data, the electronic device may detect a position of the electronic device from which the image data has been obtained and determine that a view point corresponding to the detected position of the electronic device in the obtained image data is the current view point of the electronic device.

According to an embodiment of the present disclosure, upon displaying the first virtual image generated at the determined current view point, the electronic device may recognize at least one first object in the obtained image data, obtain first information related to the at least one first object recognized, generate the first virtual image corresponding to the current view point based on at least a portion of the obtained image data or the obtained first information related to the at least one first object, and display the generated first virtual image.

According to an embodiment of the present disclosure, upon determining the virtually-shifted view point of the electronic device, the electronic device may determine whether a first input is detected from an input sensor of the electronic device while displaying the first virtual image generated at the current view point, and when the first input is detected, determine the virtually-shifted view point of the electronic device based on an attribute of the detected first input. The attribute of the detected first input may include at least one of an input type, an input strength, input duration, or an input count.

According to an embodiment of the present disclosure, upon displaying the second virtual image generated at the determined virtually-shifted view point, the electronic device may calculate a position displacement of the electronic device corresponding to a position displacement from the current view point to the virtually-shifted view point, detect a virtually shifted position of the electronic device based on the calculated position displacement of the electronic device, obtain or receive image data from at least one of the image sensor or the external electronic device at the detected virtually shifted position of the electronic device, recognize at least one second object in the image data obtained or received at the detected shifted position of the electronic device, obtain second information related to the at least one second object recognized, generate the second virtual image corresponding to the virtually-shifted view point based on at least a portion of the image data or the second information related to the at least one second object recognized, and display the generated second virtual image.

According to an embodiment of the present disclosure, the electronic device may determine whether a second input is detected from the input sensor of the electronic device while displaying the second virtual image generated at the virtually-shifted view point, and when the second input is detected, determine a virtually direction-changed view point to which the virtually-shifted view point has been changed based on an attribute of the detected second input. The attribute of the detected second input may include at least one of an input position or an input direction.

According to an embodiment of the present disclosure, the electronic device may calculate a variation in an attitude or a direction of the electronic device from the virtually-shifted view point to the virtually direction-changed view point, detect at least one of a changed attitude or changed direction of the electronic device based on the calculated variation in the attitude or direction of the electronic device, obtain or receiving image data from at least one of the image sensor or the external electronic device based on at least one of the detected virtual changed attitude or changed direction of the electronic device, recognize at least one third object in the image data obtained or received based on at least one of the detected changed attitude or changed direction of the electronic device, obtain third information related to the at least one third object recognized, generate a third virtual image corresponding to the changed virtually-shifted view point based on at least a portion of the image data or the third information related to the at least one third object recognized, and display the generated third virtual image.

Figure 10A:
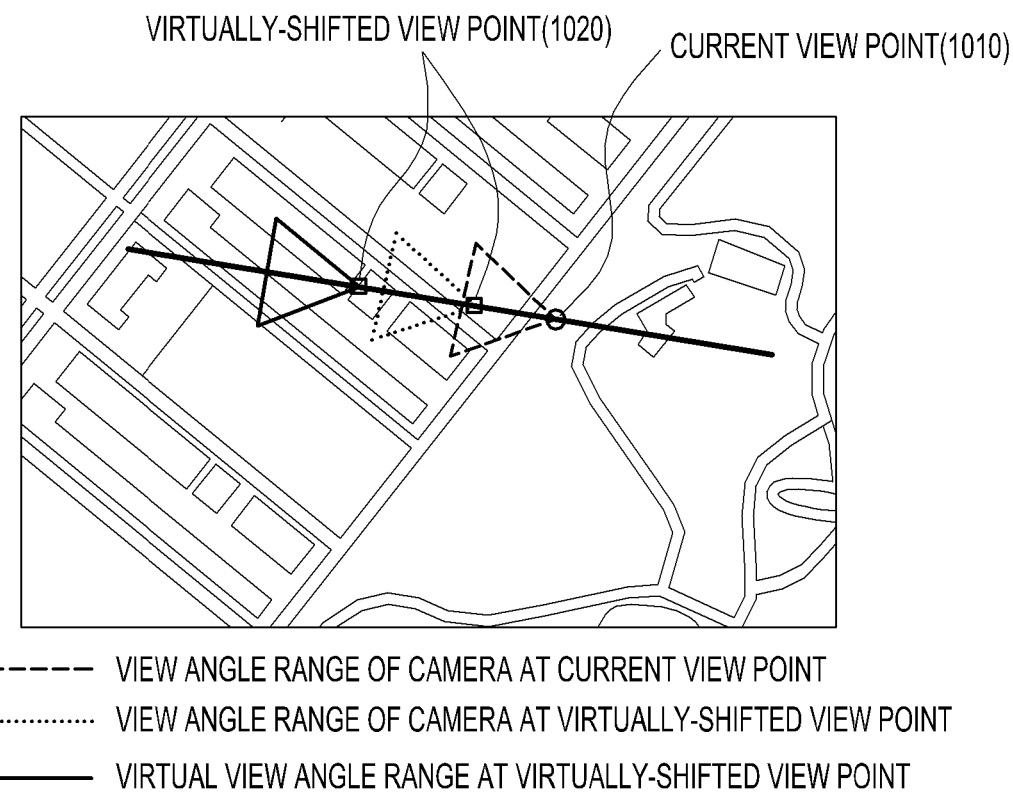
FIGS. 10A and 10B are views illustrating a current view point and virtual view points according to various embodiments of the present disclosure.
Figure 10B:
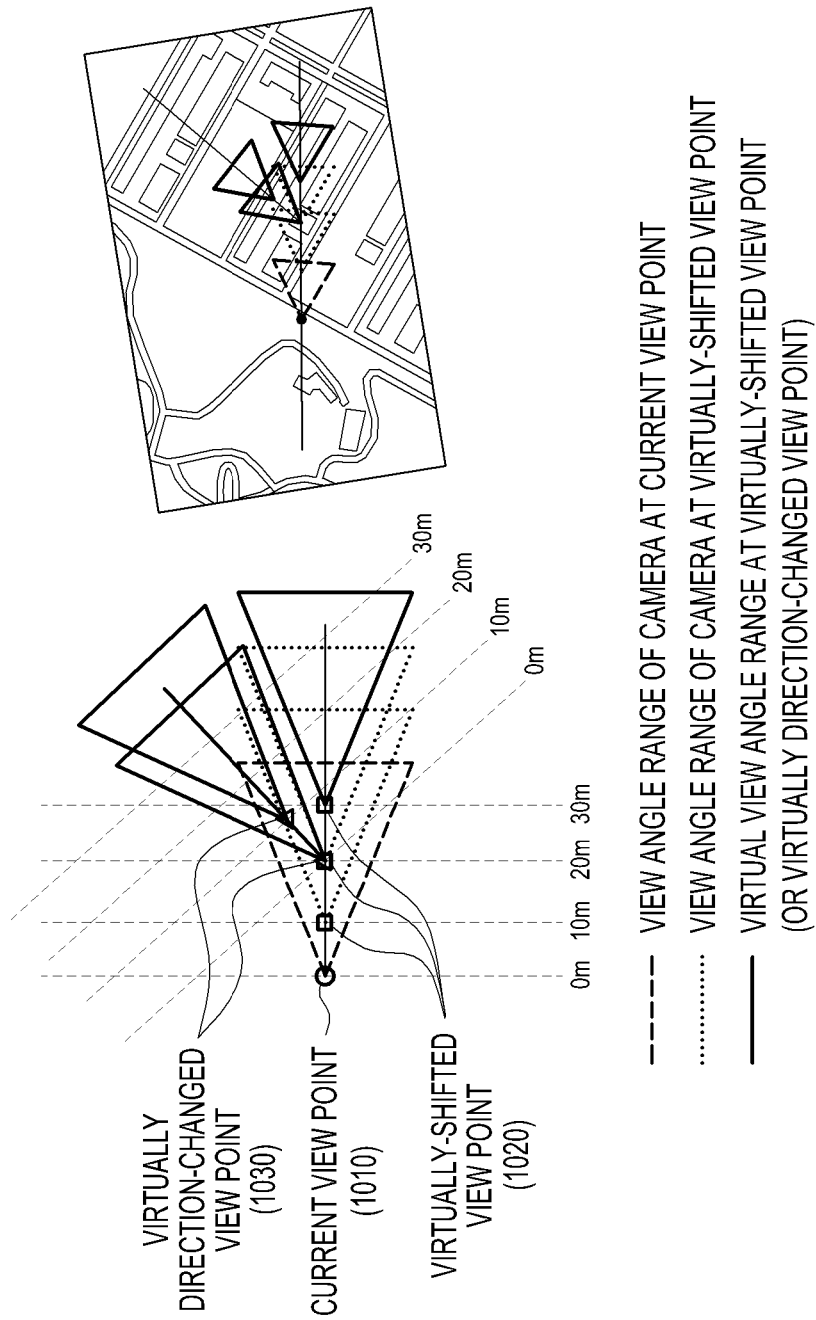

FIGS. 10A and 10B are views illustrating a current view point and virtual view points according to embodiments of the present disclosure.

Referring to FIG. 10A, according to an embodiment of the present disclosure, an electronic device (e.g., the electronic device 401) may obtain image data through a camera module (e.g., the image sensor 415 in the camera module 410) of the electronic device. At this time, the camera module (e.g., a lens) mounted on a surface of the electronic device may have a predetermined view angle range. For example, the camera module may receive image data obtained through a view angle range from about −30 degrees to about +30 degrees and display the image data on the display of the electronic device.

FIG. 10A illustrates a view angle range (which is a view angle range at the circled position and corresponds to the dashed lines) at the current view point 1010 of the electronic device and a view angle range (which is a view angle range at the squared position and corresponds to the dotted or solid lines) at the virtually-shifted view point 1020 upon obtaining actual image data through the camera module of the electronic device at the user's current position to receive a reality service, such as VR or AR. For example, when the user generates a first input in an input sensor (e.g., the touch sensor 421 or the pressure sensor 425 of the input sensor 420) while displaying first image data generated at the current view point 1010 and first virtual image data generated based on the first image data, the electronic device may virtually move the view point of the electronic device while the first input is maintained, corresponding to the first input detected through the input sensor. In this case, the view point of the electronic device may be changed to the virtually-shifted view point 1020 which has been virtually shifted from the current view point 1010 based on an attribute (e.g., at least one of an input type, an input position, an input magnitude (or strength), input duration, an input count, or an input direction) of the detected first input. According to an embodiment of the present disclosure, the virtually-shifted view point 1020 changed corresponding to the detected first input may be the view point of the camera module at the point which has been virtually shifted towards the center of the camera module with respect to the center (e.g., the central view angle) of the camera module at the current view point 1010.

According to an embodiment of the present disclosure, the virtually-shifted view point 1020 may be the view point (e.g., which corresponds to the dotted lines at the squared position) of the camera module which has been shifted corresponding to the level of the first input within a zoominable or zoomoutable view angle range of the camera module at the current position.

According to an embodiment of the present disclosure, the virtually-shifted view point 1020 may be the view point (e.g., which corresponds to the solid lines at the squared position) of an external electronic device at a point corresponding to the level of the first input within a range exceeding the zoominable or zoomoutable view angle range of the camera module.

Referring to FIG. 10B, upon detecting the first input entered by the user while displaying the first image data obtained at the current view point 1010 (e.g., which corresponds to the dashed lines, as the view angle range at the circled position) or the first virtual image data generated based on the first image data, a shift may be made to the virtually-shifted view point 1020 (e.g., which corresponds to the dotted lines or solid lines, as the view angle range at the squared position) based on the detected first input while the first input is maintained.

The electronic device may display, through the display, second image data obtained through at least one of the camera module of the electronic device or at least one external electronic device at the virtually-shifted view point 1020 and second virtual image data generated by merging or synthesizing the second image data and information related to the second image data. At this time, when the position of the virtually-shifted view point 1020 is within the zoominable or zoomoutable view angle range of the camera module of the electronic device (e.g., which corresponds to the dotted lines at the squared position), the second image data may be obtained through the camera module of the electronic device. When the position of the virtually-shifted view point 1020 exceeds the zoominable or zoomoutable view angle range of the camera module of the electronic device (e.g., which corresponds to the solid lines at the squared position), the second image data corresponding to the virtually-shifted view point 1020 may be obtained from at least one of the memory (e.g., the memory 450) of the electronic device or the at least one external electronic device (e.g., the electronic device 104 or server 106).

Meanwhile, upon failing to meet a threshold for the distance of the virtually-shifted view point set to ensure a good quality of second image data obtained through the camera module or a threshold for a scale factor for the image data obtained through the camera module although the position of the virtually-shifted view point 1020 is within the zoominable or zoomoutable range of the camera module of the electronic device (e.g., which corresponds to the dotted lines at the squared position), the second image data corresponding to the virtually-shifted view point 1020 may be obtained from at least one of the memory of the electronic device or the at least one external electronic device. For example, when the virtually shifted position corresponding to the virtually-shifted view point is not more than the threshold (e.g., 30 m) for the virtually-shifted view point, or the image data obtained at the virtually shifted position is not less than the threshold (e.g., 0.5) for the scale factor, the electronic device may obtain the second image data through the camera module of the electronic device. When the virtually shifted position corresponding to the virtually-shifted view point is larger than the threshold (e.g., 30 m) for the virtually-shifted view point, or the image data obtained at the virtually shifted position is less than the threshold (e.g., 0.5) for the scale factor, the electronic device may obtain the second image data corresponding to the virtually-shifted view point 1020 from at least one of the memory of the electronic device or the at least one external electronic device.

The electronic device may also determine a virtually direction-changed view point 1030 (e.g., which corresponds to the solid lines at the position indicated in triangle) based on a variation in attitude or direction of the electronic device from the virtually-shifted view point 1020. When the virtually direction-changed view point 1030 is determined, the electronic device may display, on the display, image data obtained at the virtually direction-changed view point 1030, which has shifted from the virtually-shifted view point, at least, up, down, left, or right, according to the attitude or direction variation of the electronic device, or virtual image data generated based on the obtained image data.

Since the image data obtained at the virtually direction-changed view point 1030 departs from the range corresponding to the central view angle of the camera module at the current view point of the electronic device, the electronic device may send a request for image data corresponding to the virtually direction-changed view point 1030 to at least one of the memory of the electronic device or the at least one external electronic device and obtain the image data therefrom.

Figure 11A:
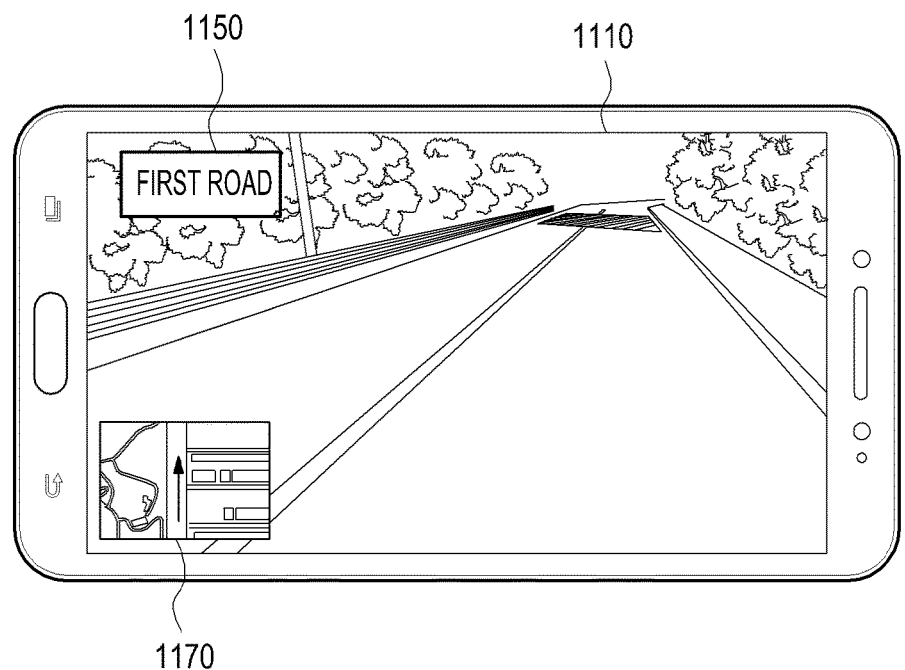
FIGS. 11A and 11B are user interface screens of an electronic device according to various embodiments of the present disclosure.
Figure 11B:
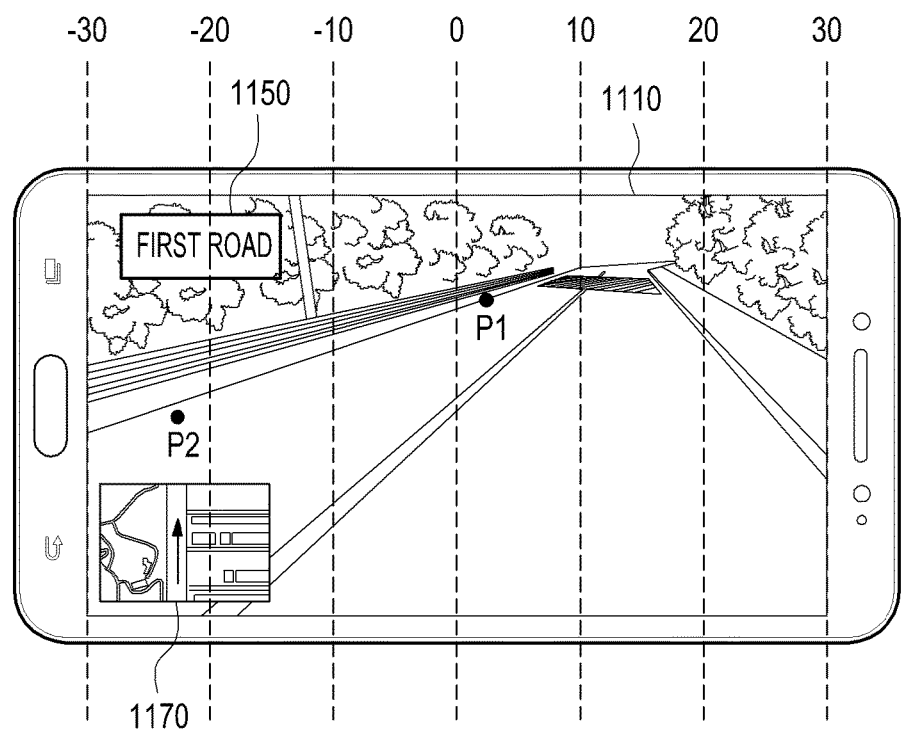

FIGS. 11A and 11B are user interface screens of an electronic device according to an embodiment of the present disclosure.

Referring to FIG. 11A, upon running an application related to a reality service, such as VR or AR, first image data obtained at the current view point of the camera module of the electronic device at the current position of the electronic device or first virtual image data 1110 generated based on the first image data may be displayed on the display. The first image data or the first virtual image data 1110 may include at least one of an area 1150 displaying a description for the image data 1110, an area 1170 displaying information related to the image data 1110, or a combination thereof. For example, the first image data or the first virtual image data 1110 may be an image representing a predetermined road. In this case, the name (e.g., 'first road') of the road may be shown on the area 1150, and a navigation map related to the road may be shown on the area 1170.

Referring to FIG. 11B, image data obtained at a corresponding view point of the electronic device within the view angle range (e.g., a range from −30 degrees to +30 degrees) of the camera module of the electronic device or virtual image data generated based on the obtained image data may be received and displayed on the display of the electronic device. When an input (e.g., a first input) is applied corresponding to any one point (e.g., a first point P1 or a second point P2) within the display screen, the electronic device may be moved corresponding to the first input in the direction of the center (e.g., the central view angle) of the camera module of the electronic device, i.e., to a virtually-shifted view point with respect to the position of the current center of the display screen. At this time, although the first input occurs at any point on the display, it may be moved to the virtually-shifted view point which has been virtually shifted in the direction of the central view angle of the camera module with respect to the center (e.g., the central view angle) of the camera module of the electronic device.

FIGS. 12A, 12B, 12C, 12D, 12E, 12F, 12G, 12H, and 12I are user interface screens of an electronic device according to an embodiment of the present disclosure. The input shown in FIGS. 12A to 12I may be a pressure input. The depth (e.g., distance/degree of movement) of the virtual view point may be adjusted corresponding to the level, i.e., strength, of the pressure input. In FIGS. 12A to 12I, a first input, which may be made by the user, is divided into a first level 1210-1 to a fourth level 1210-4 depending on its strength.

Figure 12A:
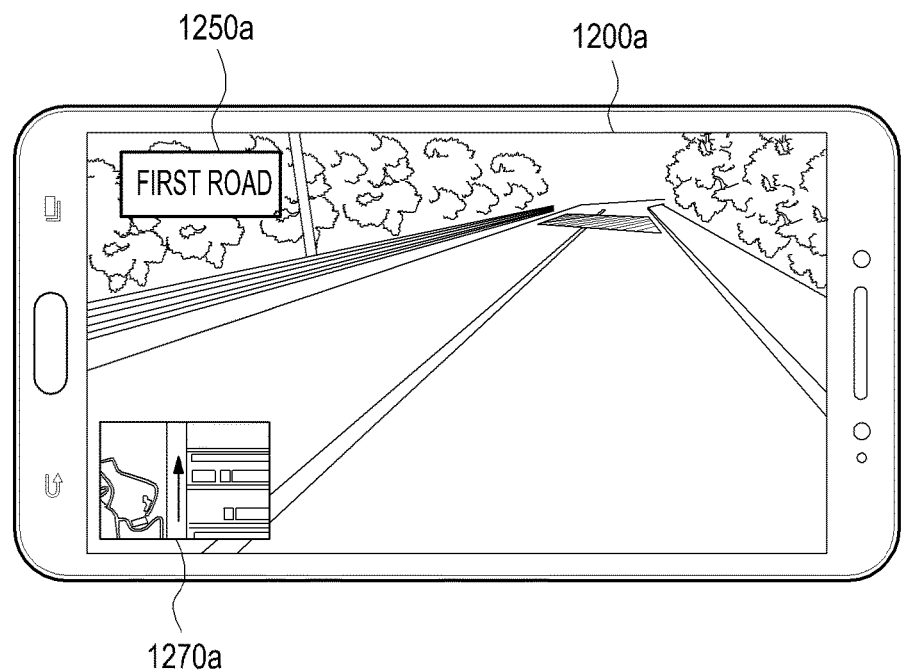
FIGS. 12A, 12B, 12C, 12D, 12E, 12F, 12G, 12H, and 12I are user interface screens of an electronic device according to various embodiments of the present disclosure.

Referring to FIG. 12A, upon running an application related to a reality service, such as VR or AR, first image data obtained through the camera module (e.g., the image sensor 415 in the camera module 410) of the electronic device (e.g., the electronic device 401) at the current view point or first virtual image data 1200a generated based on the first image data may be displayed on the display (e.g., the display 440) of the electronic device.

The first image data or the first virtual image data 1200a may include at least one of, e.g., an area 1250a displaying a description for corresponding image data 1200a, an area 1270a displaying information related to the image data 1200a, or a combination thereof. For example, the first image data or the first virtual image data 1200a may be an image representing a predetermined road. In this case, the name (e.g., 'first road') of the road may be shown on the area 1250a, and information (e.g., a navigation map) related to the road may be shown on the area 1270a.

Figure 12B:
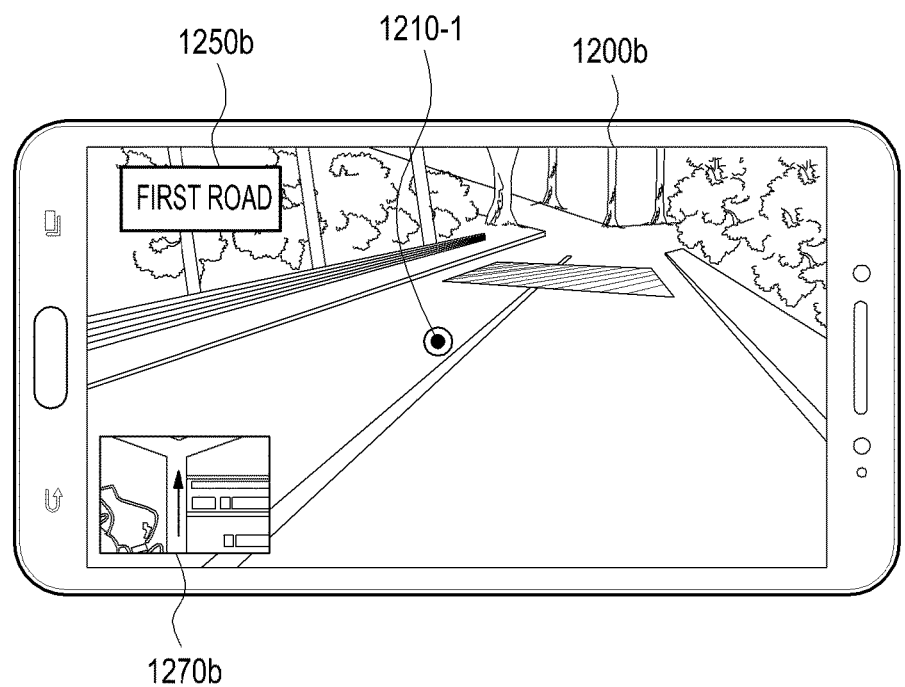

Referring to FIG. 12B, the first input 1210-1 may be entered to any one point on the display while the electronic device displays the first image data or first virtual image data 1200a of FIG. 12A. Upon detecting that the strength of the first input 1210-1 is the first level, the electronic device may display, on the display, second image data obtained at a first virtually-shifted view point, which has virtually been shifted according to the first level of first input 1210-1 while the first level of first input 1210-1 is maintained, or second virtual image data 1200b generated based on the second image data.

According to an embodiment of the present disclosure, the first virtually-shifted view point corresponding to the first level of first input 1210-1 may be a virtually-shifted view point that has been shifted by a first depth from the current position of the current view point. The first depth may previously be set. For description purposes, the first depth is set to 10 m. In other words, the second image data or the second virtual image data 1200b shown in FIG. 12B may be image data obtained through at least one of the camera module of the electronic device, the memory (e.g., the memory 450) of the electronic device, or at least one external electronic device (e.g., the electronic device 104 or server 106) at the first virtually-shifted view point, which has been virtually shifted forwards by the first depth, i.e., 10*m*, in the direction of the central view angle of the camera module with respect to the center of the camera module without a substantial move of the electronic device from the current position where the first image data or the first virtual image data 1200*a* (refer to FIG. 12A) has been obtained or virtual image data generated based on the obtained image data.

According to an embodiment of the present disclosure, where the first virtually-shifted view point, which has been shifted by the first depth from the current view point, is within a zoominable or zoomoutable view angle range of the camera module, the second image data or the second virtual image data 1200*b* may be image data obtained by zooming in or out the camera module by the first depth or virtual image data generated based on the obtained image data. Where the first virtually-shifted view point, which has been shifted by the first depth from the current view point, exceeds the zoominable or zoomoutable view angle range of the camera module, the second image data or the second virtual image data 1200*b* may be image data obtained through at least one of the memory of the electronic device or the at least one external electronic device or virtual image data generated based on the obtained image data. According to an embodiment of the present disclosure, the first virtually-shifted view point where the second image data or the second virtual image data 1200*b* is obtained or generated is assumed to be within the zoominable or zoomoutable view angle range of the camera module.

The second image data or the second virtual image data 1200*b* may include an area 1250*b* (e.g., first road) displaying a description for the image data 1200*b* or an area 1270*b* (e.g., a navigation map) displaying information related to the image data 1200*b*.

When the first level of first input 1210-1 is released while the second image data or the second virtual image data 1200*b* is displayed, the electronic device may return to the current view point, displaying on the display the first image data or first virtual image data 1200*a* obtained or generated at the current view point as shown in FIG. 12A.

The level of the first input 1210-1 may be changed to a level (e.g., the second level), which is larger than the first level while the second image data or second virtual image data 1200*b* is displayed while the first level of first input 1210-1 is maintained, and the second level of first input may be inputted.

Figure 12C:
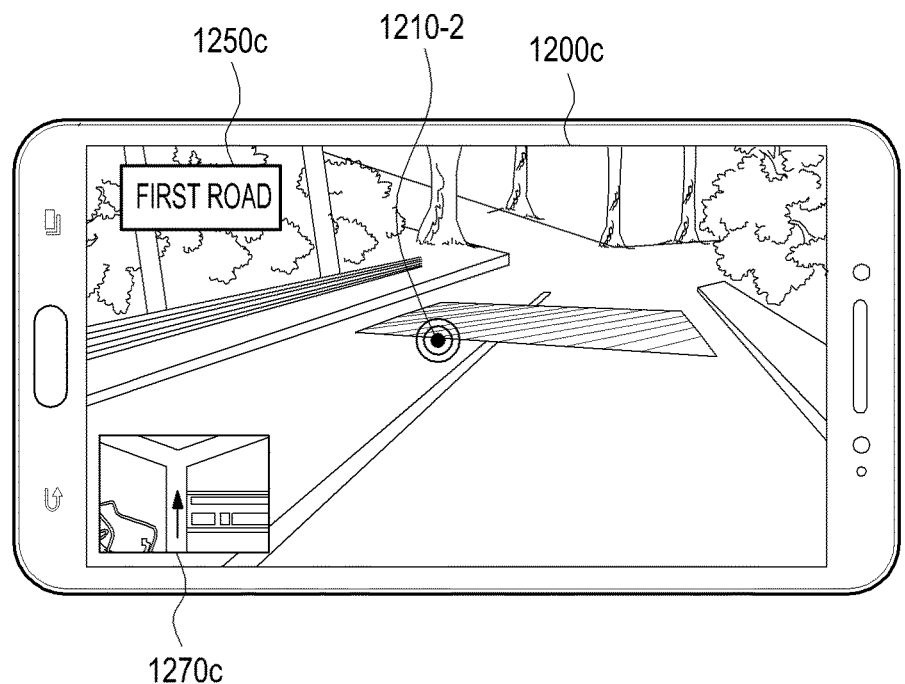

Referring to FIG. 12C, upon detecting the second level of first input 1210-2 while displaying the second image data or second virtual image data 1200*b* of FIG. 12B, the electronic device may display, on the display, third image data obtained at a second virtually-shifted view point, which has virtually been shifted according to the second level of first input 1210-2 while the second level of first input 1210-2 is maintained, or third virtual image data 1200*c* generated based on the third image data.

According to an embodiment of the present disclosure, the second level of first input 1210-2 may be larger in strength than the first level of first input 1210-1. The second virtually-shifted view point corresponding to the second level of first input 1210-2 may be a view point that has been shifted by the first depth from the position of the first virtually-shifted view point. In other words, the third image data or the third virtual image data 1200*c* shown in FIG. 12C may be image data obtained through at least one of the camera module of the electronic device, the memory of the electronic device, or at least one external electronic device at the second virtually-shifted view point, which has been virtually shifted forwards by the first depth, i.e., 10 m, in the direction of the central view angle of the camera module with respect to the center of the camera module without a substantial move of the electronic device from the position of the first virtually-shifted view point where the second image data or the second virtual image data 1200*b* as shown in FIG. 12B has been obtained or virtual image data generated based on the obtained image data.

According to an embodiment of the present disclosure, where the second virtually-shifted view point, which has been shifted by the first depth from the first virtually-shifted view point, is within a zoominable or zoomoutable view angle range of the camera module, the third image data or the third virtual image data 1200*c* may be image data obtained by zooming in or out the camera module by the first depth or virtual image data generated based on the obtained image data. Where the second virtually-shifted view point, which has been shifted by the first depth from the first virtually-shifted view point, exceeds the zoominable or zoomoutable view angle range of the camera module, the third image data or the third virtual image data 1200*c* may be image data obtained through at least one of the memory of the electronic device or the at least one external electronic device or virtual image data generated based on the obtained image data. According to an embodiment of the present disclosure, the second virtually-shifted view point is assumed to be within the zoominable or zoomoutable view angle range of the camera module.

The third image data or the third virtual image data 1200*c* may include an area 1250*c* (e.g., first road) displaying a description for the image data 1200*c* or an area 1270*c* (e.g., a navigation map) displaying information related to the image data 1200*c*.

When the strength of the second level of first input 1210-2 is changed from the second level to the first level while the third image data or third virtual image data 1200*c* is displayed, the electronic device may return to the first virtually-shifted view point which has been shifted backwards by the first depth from the second virtually-shifted view point, displaying on the display the second image data or second virtual image data 1200*b* (refer to FIG. 12B) obtained or generated at the first virtually-shifted view point.

When the second level of first input 1210-2 is released while the third image data or the third virtual image data 1200*c* is displayed, the electronic device may return to the current view point, displaying on the display the first image data or first virtual image data 1200*a* (refer to FIG. 12A) obtained or generated at the current view point.

Meanwhile, the strength of the second level of first input 1210-2 may be changed to a level (e.g., the third level), which is larger than the second level while the third image data or third virtual image data 1200*c* is displayed while the second level of first input 1210-2 is maintained, and the third level of first input may be inputted.

Figure 12D:
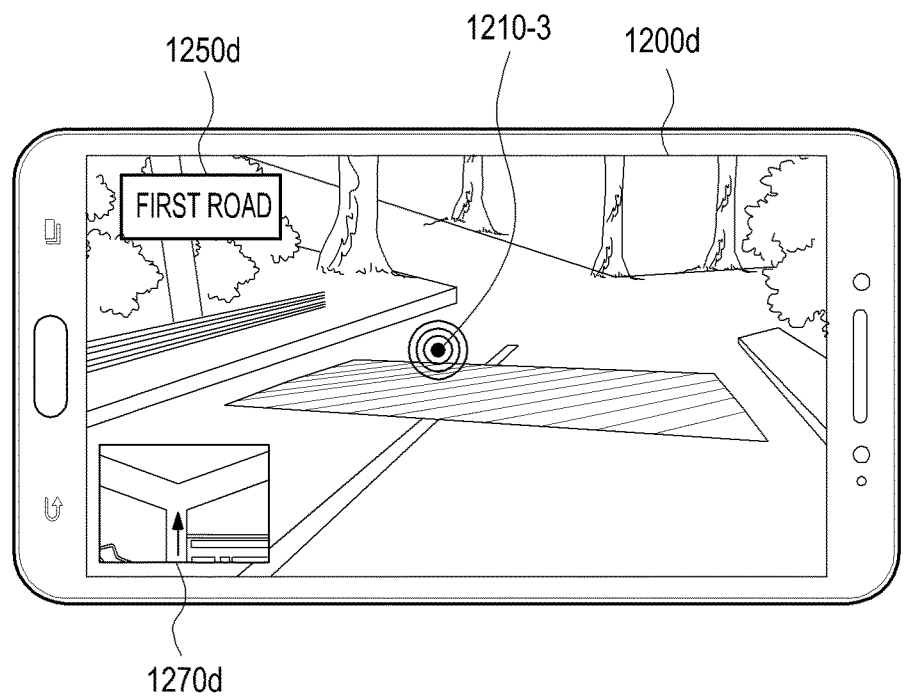

Referring to FIG. 12D, upon detecting the third level of first input 1210-3 while displaying the third image data or third virtual image data 1200*c* of FIG. 12C, the electronic device may display, on the display, fourth image data obtained at a third virtually-shifted view point, which has virtually been shifted according to the third level of first input 1210-3 while the third level of first input 1210-3 is maintained, or fourth virtual image data 1200*d* generated based on the fourth image data.

According to an embodiment of the present disclosure, the third level of first input 1210-3 may be larger in strength than the second level of first input. The third virtually-shifted view point corresponding to the third level of first input 1210-3 may be a view point that has been shifted by the first depth from the position of the second virtually-shifted view point. In other words, the fourth image data or the fourth virtual image data 1200d shown in FIG. 12D may be image data obtained through at least one of the camera module of the electronic device, the memory of the electronic device, or at least one external electronic device at the second virtually-shifted view point, which has been virtually shifted forwards by the first depth, i.e., 10 m, in the direction of the central view angle of the camera module with respect to the center of the camera module without a substantial move of the electronic device from the position of the second virtually-shifted view point where the third image data or the third virtual image data 1200c as shown in FIG. 12C has been obtained or virtual image data generated based on the obtained image data.

According to an embodiment of the present disclosure, where the third virtually-shifted view point, which has been shifted by the first depth from the second virtually-shifted view point, is within a zoominable or zoomoutable view angle range of the camera module, the fourth image data or the fourth virtual image data 1200d may be image data obtained by zooming in or out the camera module by the first depth or virtual image data generated based on the obtained image data. Where the third virtually-shifted view point, which has been shifted by the first depth from the second virtually-shifted view point, exceeds the zoominable or zoomoutable view angle range of the camera module, the fourth image data or the fourth virtual image data 1200d may be image data obtained through at least one of the memory of the electronic device or the at least one external electronic device or virtual image data generated based on the obtained image data. According to an embodiment of the present disclosure, the third virtually-shifted view point is assumed to be within the zoominable or zoomoutable view angle range of the camera module.

The fourth image data or the fourth virtual image data 1200d may include an area 1250d (e.g., first road) displaying a description for the image data 1200d or an area 1270d (e.g., a navigation map) displaying information related to the image data 1200d.

When the strength of the third level of first input 1210-3 is changed from the third level to the second level or first level while the fourth image data or fourth virtual image data 1200d is displayed, the electronic device may return to the second virtually-shifted view point or first virtually-shifted view point which has been shifted backwards by a depth corresponding to the level from the third virtually-shifted view point, displaying on the display the third image data or third virtual image data 1200c (refer to FIG. 12C) obtained or generated at the second virtually-shifted view point or the second image data or second virtual image data 1200b (refer to FIG. 12B) obtained or generated at the first virtually-shifted view point. Or, the electronic device may stepwise or continuously display the third image data or third virtual image data 1200c and the second image data or second virtual image data 1200b on the display.

When the third level of first input 1210-3 is released while the fourth image data or the fourth virtual image data 1200d is displayed, the electronic device may return to the current view point, displaying on the display the first image data or first virtual image data 1200a (refer to FIG. 12A) obtained or generated at the current view point.

Meanwhile, the strength of the third level of first input 1210-3 may be changed to a level (e.g., the fourth level), which is larger than the third level while the fourth image data or fourth virtual image data 1200d is displayed while the third level of first input 1210-3 is maintained, and the fourth level of first input may be inputted.

Figure 12E:
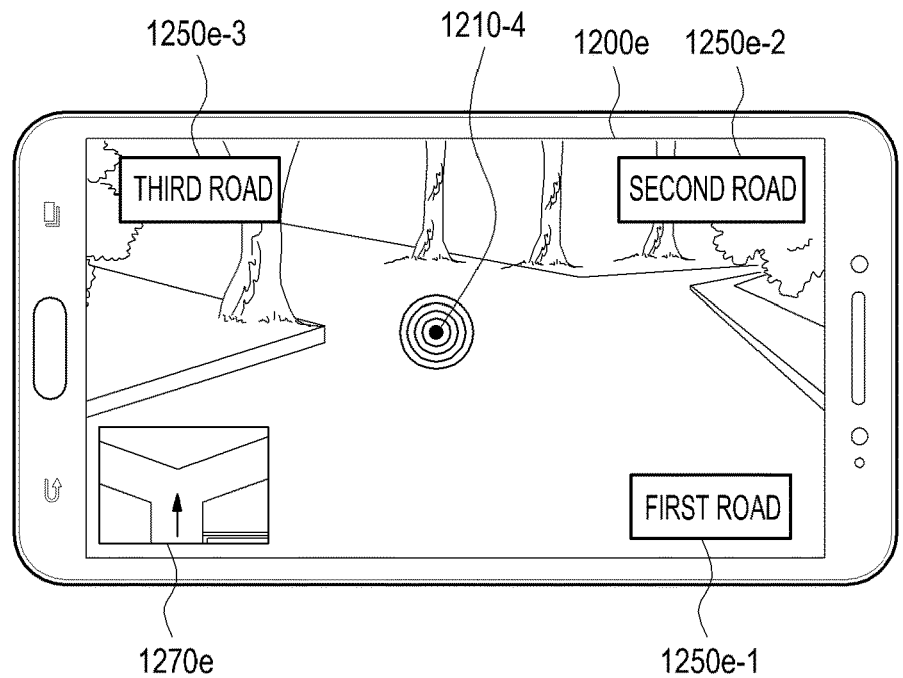

Referring to FIG. 12E, upon detecting the fourth level of first input 1210-4 while displaying the fourth image data or fourth virtual image data 1200d of FIG. 12D, the electronic device may display, on the display, fifth image data obtained at a fourth virtually-shifted view point, which has virtually been shifted according to the fourth level of first input 1210-4 while the fourth level of first input 1210-4 is maintained, or fifth virtual image data 1200e generated based on the fifth image data.

According to an embodiment of the present disclosure, the fourth level of first input 1210-4 may be larger in strength than the third level of first input. The fourth virtually-shifted view point corresponding to the fourth level of first input 1210-4 may be a view point that has been shifted by the first depth from the position of the third virtually-shifted view point. In other words, the fifth image data or the fifth virtual image data 1200e shown in FIG. 12E may be image data obtained through at least one of the camera module of the electronic device, the memory of the electronic device, or at least one external electronic device at the second virtually-shifted view point, which has been virtually shifted forwards by the first depth, i.e., 10 m, in the direction of the central view angle of the camera module with respect to the center of the camera module without a substantial move of the electronic device from the position of the third virtually-shifted view point where the fourth image data or the fourth virtual image data 1200d as shown in FIG. 12C has been obtained or virtual image data generated based on the obtained image data.

According to an embodiment of the present disclosure, where the fourth virtually-shifted view point, which has been shifted by the first depth from the third virtually-shifted view point, is within a zoominable or zoomoutable view angle range of the camera module, the fifth image data or the fifth virtual image data 1200e may be image data obtained by zooming in or out the camera module by the first depth or virtual image data generated based on the obtained image data. Where the fourth virtually-shifted view point, which has been shifted by the first depth from the third virtually-shifted view point, exceeds the zoominable or zoomoutable view angle range of the camera module, the fifth image data or the fifth virtual image data 1200e may be image data obtained through at least one of the memory of the electronic device or the at least one external electronic device or virtual image data generated based on the obtained image data. According to an embodiment of the present disclosure, the fourth virtually-shifted view point is assumed to be within the zoominable or zoomoutable view angle range of the camera module.

The fifth image data or the fifth virtual image data 1200e may include areas 1250e-1 to 1250e-3 (e.g., first road, second road, and third road) displaying descriptions for the image data 1200e or an area 1270e (e.g., a navigation map) displaying information related to the image data 1200e. The fifth image data or the fifth virtual image data may show, e.g., that two roads (e.g., the second road and the third road) may diverge at the end of the first road, and the area 1270e may also show such divergence of the two roads.

When the fourth level of first input 1210-4 is changed from the fourth level to the third level, the second level, or the first level while the fifth image data or fifth virtual image data 1200e is displayed, the electronic device may return to the third virtually-shifted view point, the second virtually-shifted view point, or the first virtually-shifted view point which has been shifted backwards by a depth corresponding to the level from the fourth virtually-shifted view point, displaying on the display the fourth image data or fourth virtual image data 1200d (refer to FIG. 12D) obtained or generated at the third virtually-shifted view point, the third image data or third virtual image data 1200c (refer to FIG. 12C) obtained or generated at the second virtually-shifted view point, or the second image data or second virtual image data 1200b (refer to FIG. 12B) obtained or generated at the first virtually-shifted view point. Or, the electronic device may stepwise or continuously display the fourth image data or fourth virtual image data 1200d, the third image data or third virtual image data 1200c (refer to FIG. 12C), and the second image data or second virtual image data 1200b (refer to FIG. 12B) on the display.

When the fourth level of first input 1210-4 is released while the fifth image data or the fifth virtual image data 1200e is displayed, the electronic device may return to the current view point, displaying on the display the first image data or first virtual image data 1200a (refer to FIG. 12A) obtained or generated at the current view point.

Figure 12F:
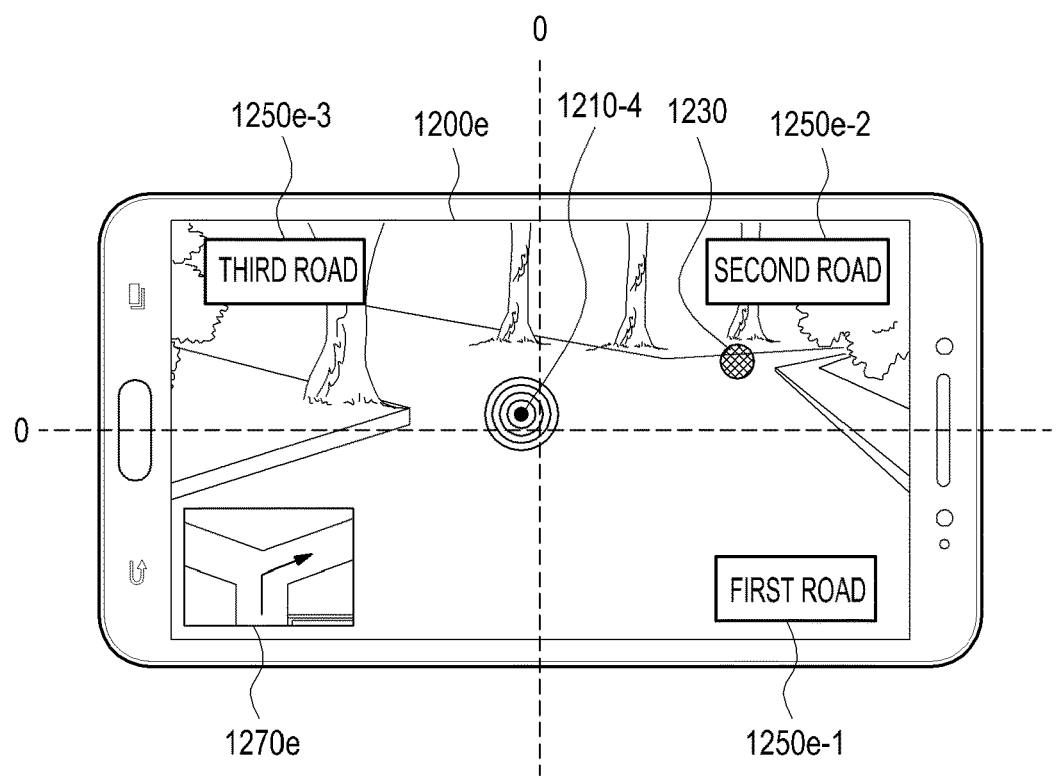

Meanwhile, an additional input (e.g., a second input) 1230, which is different from the fourth level of first input 1210-4, may be entered as shown in FIG. 12F, while the fifth image data or the fifth virtual image data 1200e is displayed and the fourth level of first input 1210-4 is maintained.

Referring to FIG. 12F, when the additional input (e.g., the second input) 1230, which is different from the fourth level of first input 1210-4, is entered while displaying the fifth image data or fifth virtual image data 1200e obtained or generated at the fourth virtually-shifted view point while the fourth level of first input 1210-4 is maintained as shown in FIG. 12E, the electronic device may make a change from the fourth virtually-shifted view point to a virtually direction-changed view point, where the direction of the camera module of the electronic device has been changed, corresponding to the second input 1230. For example, the electronic device may change from the fourth virtually-shifted view point to the virtually direction-changed view point corresponding to an attribute of the second input 1230. The attribute of the second input 1230 may include at least one of, e.g., an input position, an input direction, an input strength, input duration, or an input count. For example, the electronic device may determine the virtually direction-changed view point according to the level of each attribute of the second input 1230.

For example, when the second input 1230 is made while the fifth image data or the fifth virtual image data 1200e is displayed, the electronic device may determine the position of the second input 1230 with respect to the center of the display screen. Here, the center of the display screen may be identical to the center (e.g., the central view angle of the image sensor) of the camera module. For example, assuming that the X-Y coordinates of the center of the display screen are (0,0) as shown in FIG. 12F, the center may be denoted with a vertical axis dotted line (e.g., the Y axis) and a horizontal axis dotted line (e.g., the X axis) passing through the center. The vertical axis dotted line and the horizontal axis dotted line are virtual lines for describing the position of the second input 1230. The X axis may represent (+) coordinates to the right with respect to the center (0,0) and (−) coordinates to the left with respect to the center (0,0). The Y axis may represent (+) coordinates upwards with respect to the center (0,0) and (−) coordinates downwards with respect to the center (0,0).

When the second input 1230 is entered, the left-right direction and left-right angle of the change of the central view angle of the camera module may be determined depending on the position of the second input 1230 with respect to the vertical axis dotted line (e.g., the Y axis) passing through the center of the display screen, and the upper-lower direction and upper-lower angle of the change of the central view angle of the camera module may be determined depending on the position of the second input 1230 with respect to the horizontal axis dotted line (e.g., the X axis). The angle (e.g., 0 degrees to 360 degrees) of the left-right change may previously be set in proportion to the interval spaced apart from each central line (e.g., the X axis or Y axis dotted line). For example, the angle may increase away from each central line (e.g., the X axis or Y axis dotted line).

The center of the camera module, i.e., the central view angle, may be changed by the determined direction and angle from the fourth virtually shifted position. The electronic device may determine that the view point corresponding to the central view angle of the camera module of the determined direction and angle is the virtually direction-changed view point.

For example, when the X-Y coordinates of the second input 1230 are (3,1), the electronic device may determine that the camera module of the electronic device has been changed by an angle corresponding to 3 on the X axis to the right from the center of the display screen and has been changed by an angle corresponding to 1 on the Y axis upwards from the center of the display screen and may determine that the view point corresponding to the central view angle of the camera module of the determined direction and angle is the virtually direction-changed view point (e.g., a first virtually direction-changed view point) corresponding to the second input 1230.

Figure 12G:
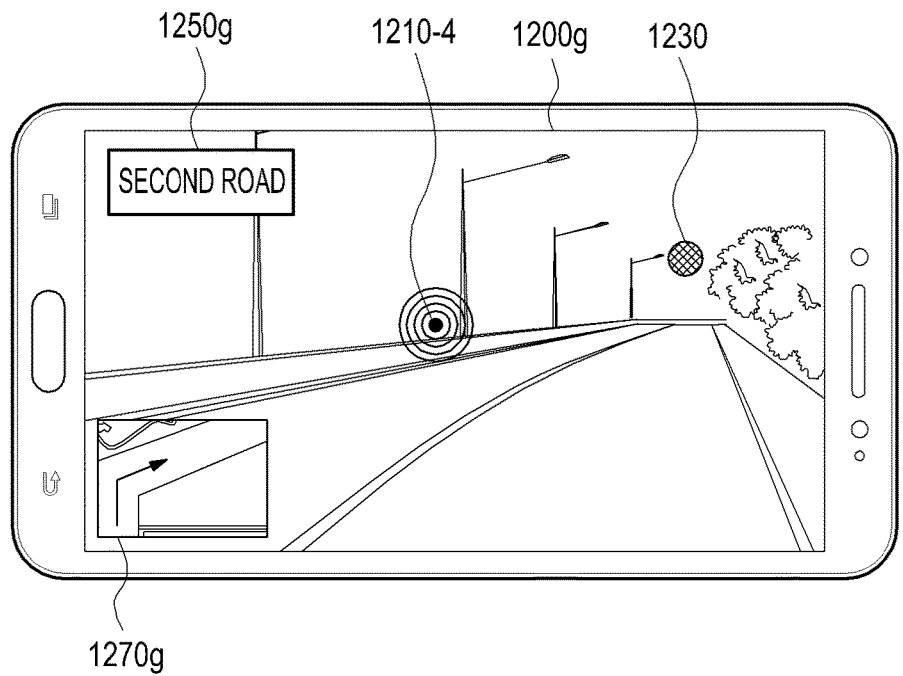

Referring to FIG. 12G, when the second input 1230 as shown in FIG. 12F is entered while the fifth image data or fifth virtual image data 1200e is displayed and the fourth level of first input 1210-4 is maintained, the electronic device may display, on the display, sixth image data obtained at the first virtually direction-changed view point to which the camera module has been redirected based on the second input 1230 while the fourth level of first input 1210-4 and the second input 1230 are maintained or sixth virtual image data 1200g generated based on the sixth image data.

According to an embodiment of the present disclosure, the first virtually direction-changed view point is assumed to be a view point to which the central view angle of the camera module has been changed in the right and upper directions by the angle corresponding to the X and Y coordinates of the second input 1230 from the fourth virtually-shifted view point. In other words, the sixth image data or the sixth virtual image data 1200g shown in FIG. 12G may be image data obtained through at least one of the memory of the electronic device or at least one external electronic device at the first virtually direction-changed view point, to which the central view angle of the camera module has been changed in the right and upper directions by the angle corresponding to the X and Y coordinates of the second input 1230 with respect to the center of the camera module without a substantial move of the electronic device from the position of the fourth virtually-shifted view point where the fifth image data or the fifth virtual image data 1200e (refer to FIG. 12E) has been obtained or virtual image data generated based on the obtained image data. According to an embodiment of the present disclosure, the first virtually direction-changed view point is assumed to be the one to which the central view angle of the camera module has been changed from a virtually shifted position (e.g., the fourth virtually shifted position) within the zoominable or zoomoutable view angle range of the camera module, corresponding to the second input 1230.

The sixth image data or the sixth virtual image data 1200g may include an area 1250g (e.g., second road) displaying a description for the image data 1200g or an area 1270g (e.g., a navigation map) displaying information related to the image data 1200g. Further, where a change is made from the virtually-shifted view point to the virtually direction-changed view point, for example, the area 1250g displaying the description for the image data 1200g in the sixth image data or the sixth virtual image data 1200g may be displayed, with its content changed. For example, where the road name (e.g., second road) in the sixth image data or sixth virtual image data 1200g is different from the road name (e.g., first road) in the fifth image data or fifth virtual image data 1200e, the road name (e.g., second road) changed according to the image data 1200g may be displayed on the area 1250g.

When the second input 1230 is released while the sixth image data or sixth virtual image data 1200g is displayed, returning to the view point corresponding to the level of the first input 1210-1 to 1210-4 occurs, and the image data or virtual image data obtained or generated at the returned view point may be displayed on the display. For example, when the second input 1230 is released while the sixth image data or the sixth virtual image data 1200g is displayed, returning to the fourth virtually-shifted view point corresponding to the fourth level of first input 1210-4 occurs, so that the fifth image data or fifth virtual image data 1200e (refer to FIG. 12E) may be displayed.

Although not shown, the electronic device may further display image data obtained at the virtually-shifted view point that has been virtually shifted in the direction of the central view angle of the camera module with respect to the center of the camera module at the first virtually direction-changed view point from the position of the first virtually direction-changed view point according to the level of the second input 1230 and virtual image data generated based on the obtained image data.

When the first input (e.g., the fourth level of first input 1210-4) is released while the sixth image data or the sixth virtual image data 1200g is displayed, the electronic device may return to the current view point, displaying on the display the first image data or first virtual image data 1200a (refer to FIG. 12A) obtained or generated at the current view point.

Figure 12H:
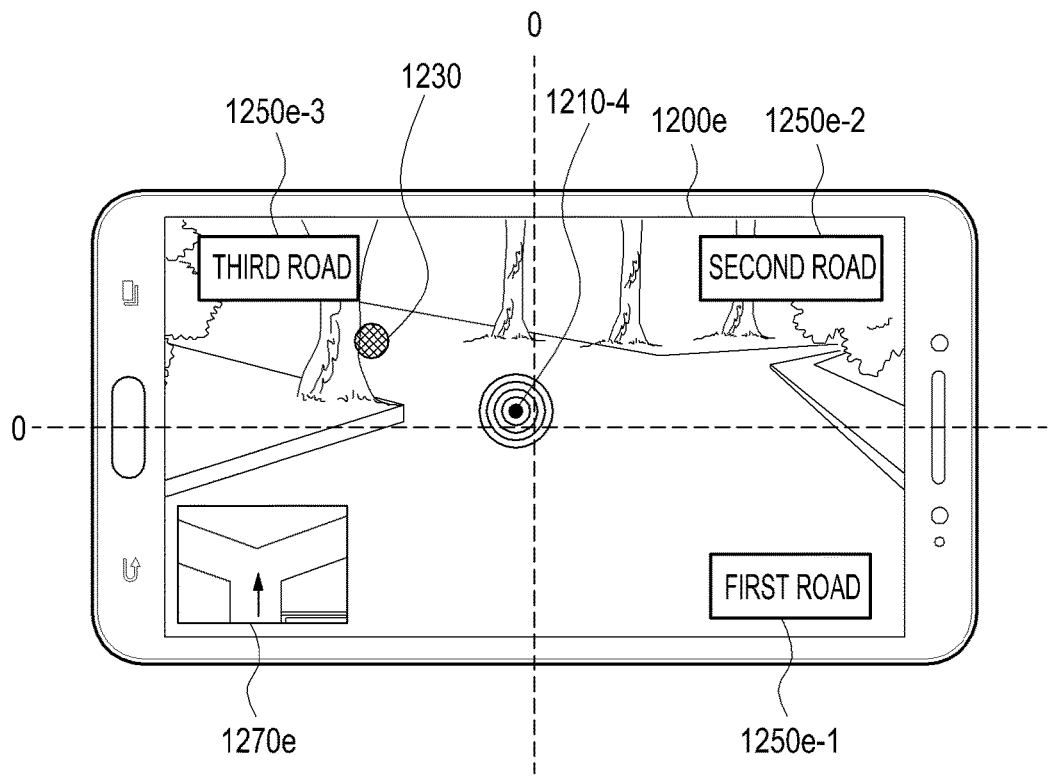

Referring to FIG. 12H, like in FIG. 12F, when an additional input (e.g., the second input) 1230, which is different from the first input 1210-4, is entered while displaying the fifth image data or fifth virtual image data 1200e obtained or generated at the fourth virtually-shifted view point while the fourth level of first input 1210-4 is maintained as shown in FIG. 12E, the electronic device may make a change from the fourth virtually-shifted view point to a virtually direction-changed view point, where the direction of the camera module of the electronic device has been changed, corresponding to the second input 1230. For example, the electronic device may make a change to the virtually direction-changed view point of the electronic device corresponding to an attribute of the second input 1230. The attribute of the second input 1230 may include at least one of, e.g., an input position, an input direction, an input strength, input duration, or an input count. For example, the electronic device may determine the virtually direction-changed view point according to the level of each attribute of the second input 1230.

For example, when the second input 1230 is made while the fifth image data or the fifth virtual image data 1200e is displayed, the electronic device may determine the position of the second input 1230 with respect to the center of the display screen.

For example, when the X-Y coordinates of the second input 1230 are (−3,1), the electronic device may determine that the camera module of the electronic device has been changed by an angle corresponding to 3 on the X axis to the left from the center of the display screen and has been changed by an angle corresponding to 1 on the Y axis upwards from the center of the display screen and may determine that the view point corresponding to the central view angle of the camera module of the determined direction and angle is the virtually direction-changed view point (e.g., a second virtually direction-changed view point) corresponding to the second input 1230.

Figure 12I:
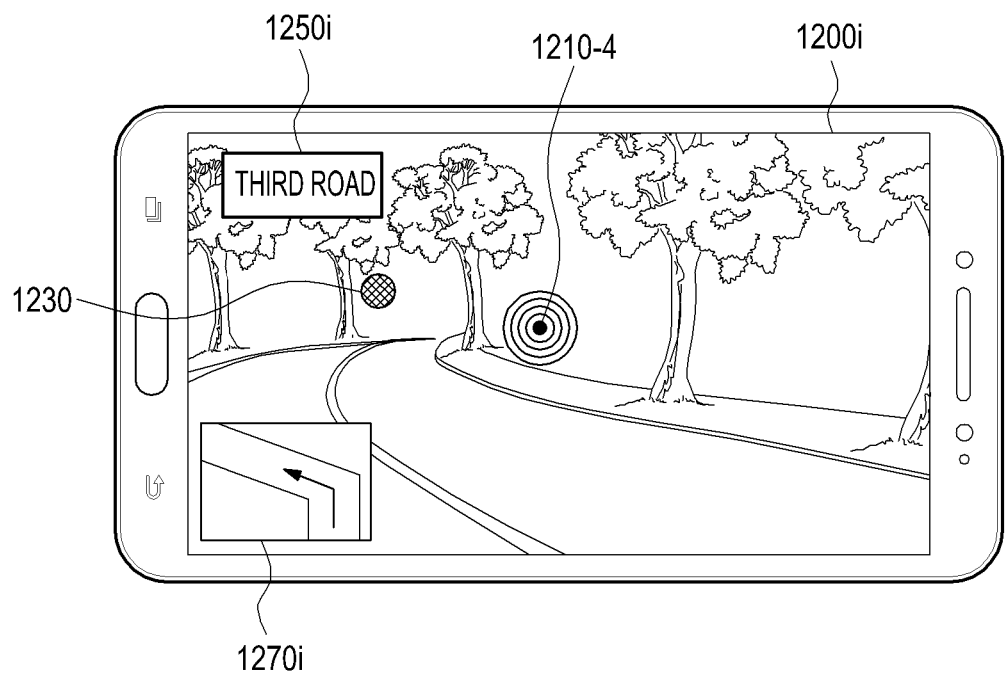

Referring to FIG. 12I, when the second input 1230 as shown in FIG. 12H is entered while the fifth image data or fifth virtual image data 1200e is displayed and the fourth level of first input 1210-4 is maintained, the electronic device may display, on the display, seventh image data obtained at the second virtually direction-changed view point to which the camera module has been redirected based on the second input 1230 while the first input 1210-4 and the second input 1230 are maintained or seventh virtual image data 1200i generated based on the seventh image data.

According to an embodiment of the present disclosure, the second virtually direction-changed view point is assumed to be a view point to which the central view angle of the camera module has been changed in the left and upper directions by the angle corresponding to the X and Y coordinates of the second input 1230 from the fourth virtually-shifted view point. In other words, the seventh image data or the seventh virtual image data 1200i shown in FIG. 12I may be image data obtained through at least one of the memory of the electronic device or at least one external electronic device at the second virtually direction-changed view point, to which the central view angle of the camera module has been changed in the left and upper directions by the angle corresponding to the X and Y coordinates of the second input 1230 with respect to the center of the camera module without a substantial move of the electronic device from the position of the fourth virtually-shifted view point where the fifth image data or the fifth virtual image data 1200e has been obtained or virtual image data generated based on the obtained image data. According to an embodiment of the present disclosure, the second virtually direction-changed view point is assumed to be the one to which the central view angle of the camera module has been changed from a virtually shifted position (e.g., the fourth virtually shifted position) within the zoominable or zoomoutable view angle range of the camera module, corresponding to the second input 1230.

The seventh image data or the seventh virtual image data 1200i may include an area 1250i (e.g., third road) displaying a description for the image data 1200i or an area 1270i (e.g., a navigation map) displaying information related to the image data 1200i. Further, where a change is made from the virtually-shifted view point to the virtually direction-changed view point, for example, the area 1250i displaying the description for the image data 1200i in the seventh image data or the seventh virtual image data 1200i may be displayed, with its content changed. For example, where the road name (e.g., third road) in the seventh image data or seventh virtual image data 1200i is different from the road name (e.g., first road) in the fifth image data or fifth virtual image data 1200*e*, the road name (e.g., third road) changed according to the image data 1200*i* may be displayed on the area 1250*i*.

When the second input 1230 is released while the seventh image data or seventh virtual image data 1200*i* is displayed, returning to the view point corresponding to the level of the first input 1210-1 to 1210-4 occurs, and the image data or virtual image data obtained or generated at the returned view point may be displayed on the display. For example, when the second input 1230 is released while the seventh image data or the seventh virtual image data 1200*i* is displayed, returning to the fourth virtually-shifted view point corresponding to the fourth level of first input 1210-4 occurs, so that the fifth image data or fifth virtual image data 1200*e* (refer to FIG. 12E) may be displayed.

Although not shown, the electronic device may further display image data obtained at the virtually-shifted view point that has been virtually shifted in the direction of the central view angle of the camera module with respect to the center of the camera module at the second virtually direction-changed view point from the position of the second virtually direction-changed view point according to the level of the second input 1230 and virtual image data generated based on the obtained image data.

When the first input (e.g., the fourth level of first input 1210-4) is released while the seventh image data or the seventh virtual image data 1200*i* is displayed, the electronic device may return to the current view point, displaying on the display the first image data or first virtual image data 1200*a* (refer to FIG. 12A) obtained or generated at the current view point.

Although the embodiment in which the first input 1210-1 to 1210-4 and/or the second input 1230 are pressure inputs has been described above, embodiments of the present disclosure are not limited thereto. For example, the first input 1210-1 to 1210-3 and/or the second input 1230 may include various types of inputs including a touch input, a swipe input, and/or a drag-and-drop input. The types of inputs 1210-1 to 1210-4 or 1230 are described below in greater detail with reference to FIGS. 13A to 13C.

Although in the above embodiments the virtually shifted position for the plurality of virtually-shifted view points (e.g., the first to fourth virtually-shifted view points) and/or the plurality of virtually direction-changed view points (e.g., the first and second virtually direction-changed view points) is assumed to be within the zoominable or zoomoutable view angle range of the camera module, embodiments of the present disclosure are not limited thereto. For example, although the virtually shifted position is outside the zoominable or zoomoutable view angle range of the camera module, a reality service, such as VR or AR, may be controlled in the same method as that described above except that the image data is obtained from at least one external electronic device, not from the camera module.

Figure 13A:
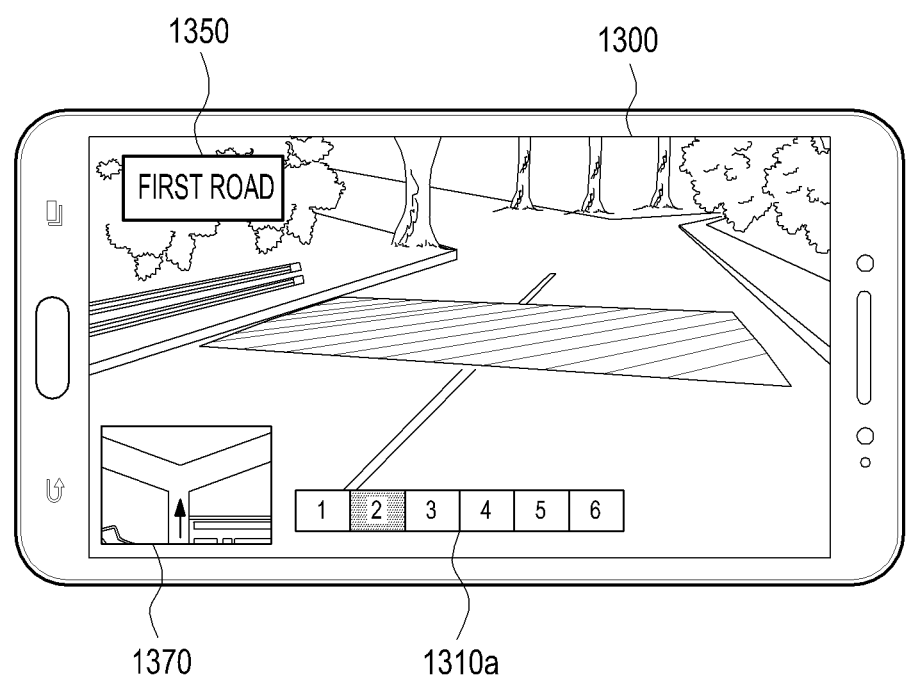
FIGS. 13A, 13B, and 13C are interface screens as per input types of an electronic device according to various embodiments of the present disclosure.
Figure 13B:
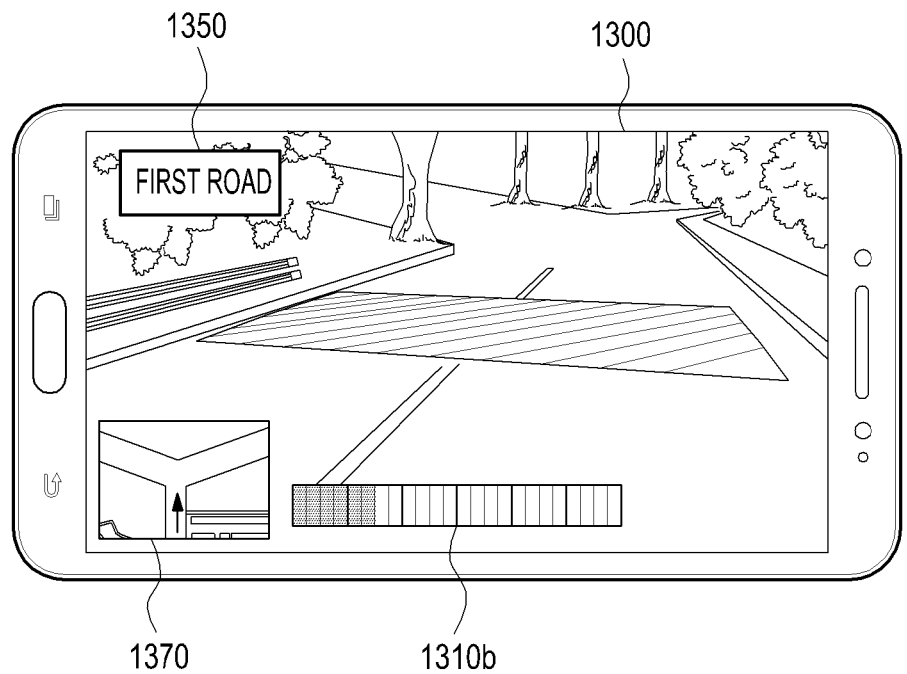
Figure 13C:
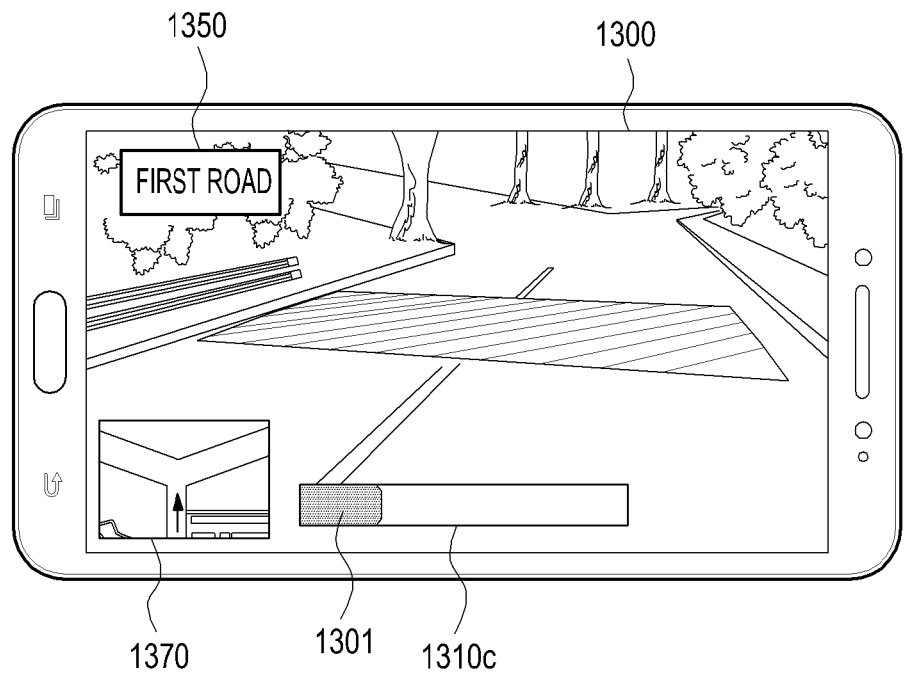

FIGS. 13A, 13B, 13C are interface screens as per input types of an electronic device according to embodiments of the present disclosure.

Referring to FIG. 13A, touch inputs may be used as inputs for moving to a predetermined virtually-shifted view point or virtually direction-changed view point while displaying first image data obtained at a current view point of an electronic device (e.g., the electronic device 401) or first virtual image data (e.g., the image data 1200*a* of FIG. 12A) generated based on the first image data. At least one input interface 1310*a* including multiple buttons previously set depending on levels, i.e., magnitudes, of a corresponding touch input may be displayed on a screen 1300 of a display (e.g., the display 440) of the electronic device.

Each button in the input interface 1310*a* may be a button having a toggle function that maintains a corresponding magnitude of touch input when the button is touched once and releases the touch input when the button is touched again.

The input interface 1310*a* may also include a plurality of input interfaces corresponding to the plurality of touch inputs. For example, the plurality of input interfaces may include a first touch input interface (e.g., an input interface 1310*a*) for adjusting the level of a first touch input for moving to the virtually-shifted view point and a second touch input interface (not shown) for adjusting the level of a second touch input for moving to the virtually direction-changed view point. The second touch input interface (not shown) may be the same in shape or form as the first touch input interface 1310*a*.

The display screen 1300 may include at least one of, e.g., an area 1350 displaying a description for corresponding image data (e.g., the first image data or first virtual image data 1200*a*), an area 1370 displaying information related to the image data 1200*a*, or a combination thereof. For example, the first image data or the first virtual image data 1200*a* may be an image representing a predetermined road. In this case, the name (e.g., 'first road') of the road may be shown on the area 1350, and information (e.g., a navigation map) related to the road may be shown on the area 1370.

Referring to FIG. 13B, swipe inputs of touch inputs may be used as inputs for moving to a predetermined virtually-shifted view point or virtually direction-changed view point while displaying first image data obtained at the current view point of the electronic device or first virtual image data (e.g., the image data 1200*a* of FIG. 12A) generated based on the first image data. At least one input interface 1310*b* including multiple level steps previously set depending on levels, i.e., magnitudes, of a corresponding swipe input may be displayed on the screen 1300 of the of the electronic device.

Each level step in the input interface 1310*b* may be a level step having a toggle function that, when swiped once to a corresponding size of level, maintains the level of the swipe input to the level step swiped, and when the swiped level step is swiped again, releases the swipe input of the level step.

The input interface 1310*b* may also include a plurality of input interfaces corresponding to the plurality of swipe inputs. For example, the plurality of input interfaces may include a first swipe input interface (e.g., an input interface 1310*b*) for adjusting the level of a first swipe input for moving to the virtually-shifted view point and a second swipe input interface (not shown) for adjusting the level of a second swipe input for moving to the virtually direction-changed view point. The second swipe input interface (not shown) may be the same in shape or form as the first swipe input interface 1310*b*.

Referring to FIG. 13C, drag-and-drop inputs of touch inputs may be used as inputs for moving to a predetermined virtually-shifted view point or virtually direction-changed view point while displaying first image data obtained at the current view point of the electronic device or first virtual image data (e.g., the image data 1200*a* of FIG. 12A) generated based on the first image data. At least one input interface 1310*c* for entering a drag-and-drop input to correspond to the level of the drag-and-drop input may be displayed on the screen 1300 of the of the electronic device.

An adjusting bar 1301 is dragged and maintained to a corresponding drag input size of level of the input interface 1310*c* to maintain the level of the dragged input. The dragged input may be released by dropping the dragged adjusting bar 1301.

The input interface may also include a plurality of input interfaces 1310*c* corresponding to a plurality of drag-and-drop inputs. For example, the plurality of input interfaces 1310*c* may include a first drag-and-drop input interface (e.g., an input interface 1310*c*) for adjusting the level of a first drag-and-drop input for moving to the virtually-shifted view point and a second drag-and-drop input interface (not shown) for adjusting the level of a second drag-and-drop input for moving to the virtually direction-changed view point. The second drag-and-drop input interface (not shown) may be the same in shape or form as the first drag-and-drop input interface 1310*c*.

When the touch input, swipe input, or drag-and-drop input is released through the input interfaces 1310*a* to 1310*c* as shown in FIGS. 13A to 13C, returning to the current view point may occur, so that the first image data or first virtual image data obtained at the current view point may be displayed on the display.

Figure 14A:
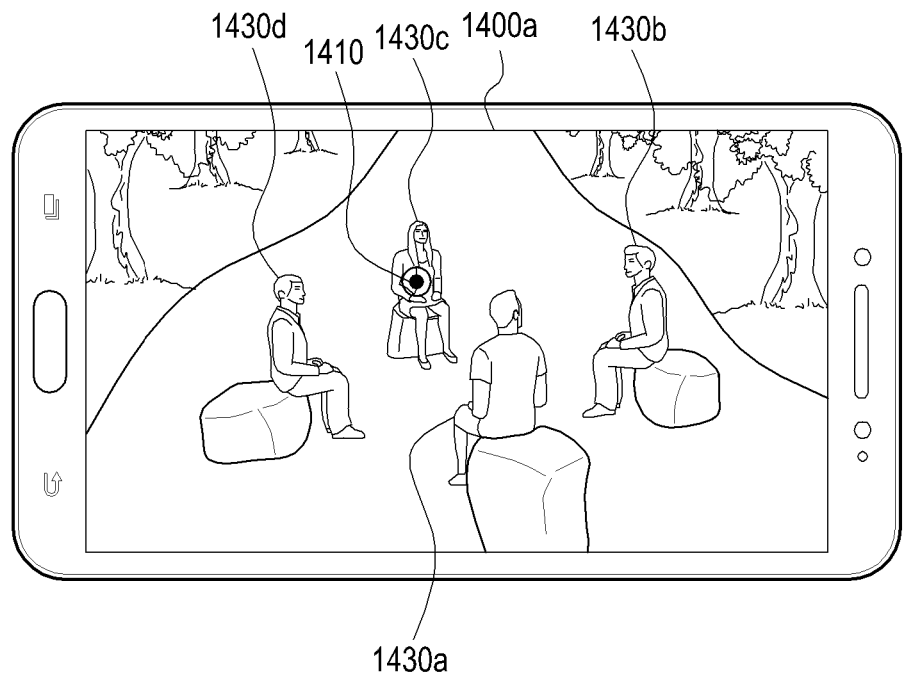
FIGS. 14A, 14B, and 14C are user interface screens of an electronic device according to various embodiments of the present disclosure.
Figure 14B:
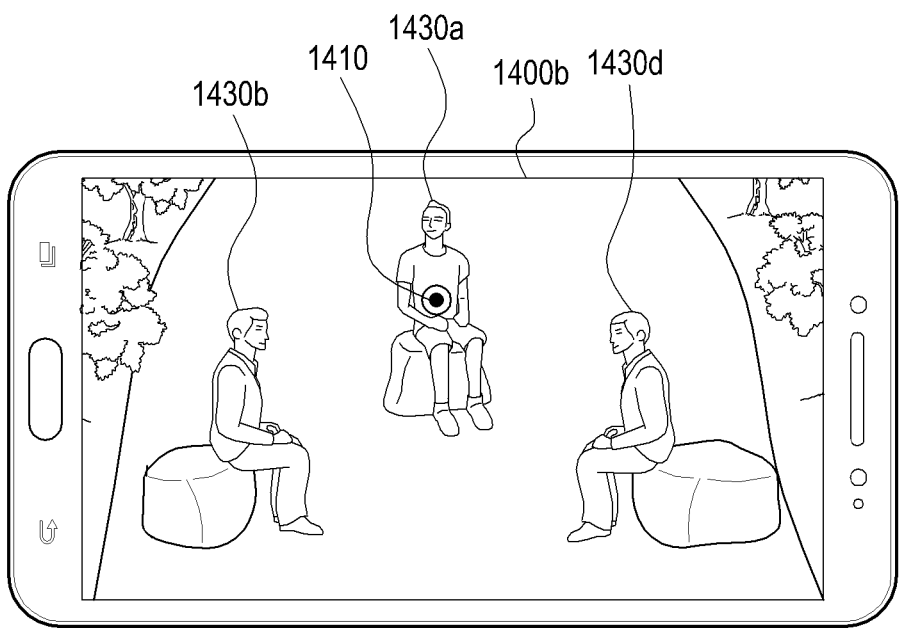
Figure 14C:
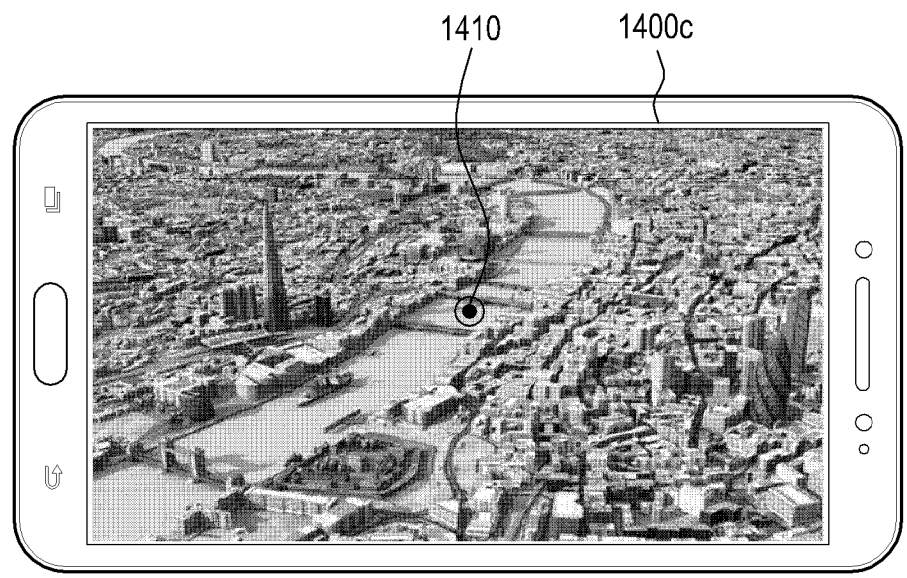

FIGS. 14A, 14B, and 14C are user interface screens of an electronic device according to an embodiment of the present disclosure. The input shown in FIGS. 14A to 14C may be a pressure input. The depth (e.g., a view point layer) of the virtually-shifted view point may be adjusted corresponding to the level, i.e., strength, of the pressure input.

Referring to FIG. 14A upon running an application related to a reality service, such as VR or AR, an electronic device (e.g., the electronic device 401) may display, on a display (e.g., the display 440) of the electronic device, first image data obtained at the current view point or first virtual image data 1400*a* generated based on the first image data. The electronic device may recognize at least one object (e.g., persons 1430*a* to 1430*d*) within the first image data or the first virtual image data 1400*a*. When a first input 1410 for at least one (e.g., a third person 1430*c*) of the at least one object 1430*a* to 1430*d* is generated by the user while the first image data or the first virtual image data 1400*a* is displayed, the electronic device may make a change to the virtually-shifted view point corresponding to the first input 1410.

For example, upon detecting the first input 1410 while displaying the first image data or first virtual image data 1400*a* obtained or generated at the current view point, the electronic device may move to the virtually-shifted view point where the view point layer has virtually shifted from the current view point based on an attribute of the first input 1410 while the first input 1410 is maintained. For example, the electronic device may change the view point of the electronic device from the current view point to the virtually-shifted view point where the view point layer has virtually shifted to the view point of the object 1430*c* selected by the first input 1410.

Referring to FIG. 14B, the electronic device may display, on the display of the electronic device, second image data obtained at the virtually-shifted view point where the view point layer has been changed to the view point of the object 1430*c* selected by the first input 1410 from the current view point while the first input 1410 is maintained or second virtual image data 1400*b* generated based on the second image data.

For example, when the user generates the first input 1410 for one (e.g., the third person 1430*c*) of the at least one object 1430*a*, 1430*b*, 1430*c*, and/or 1430*d* while displaying the first image data or the first virtual image data obtained or generated at the current view point, the view point layer is changed from the current view point to the virtually-shifted view point corresponding to the view point of the object 1430*c* while the first input 1410 is maintained, and the electronic device may display, on the display, the second image data or the second virtual image data 1400*b* obtained or generated at the virtually-shifted view point changed.

When the first input 1410 is released while displaying the second image data or the second virtual image data 1400*b* obtained or generated at the virtually-shifted view point, the electronic device may return to the current view point, displaying the first image data or the first virtual image data 1400*a* (refer to FIG. 14A) obtained or generated at the current view point.

When an additional input (e.g., a second input) (not shown), which is different from the first input 1410, is entered while displaying the second image data or second virtual image data 1400*b* obtained or generated at the virtually-shifted view point while the first input 1410 is maintained, the electronic device may fix the virtually-shifted view point corresponding to the first input 1410 so that the virtually-shifted view point is maintained. For example, the second input may be an input corresponding to any one point on the display screen. When the second input is generated while displaying the second image data or the second virtual image data 1400*b* obtained at the virtually-shifted view point where the view point layer has been shifted from the current view point to the view point of the object 1430*c* corresponding to the first input 1410, the electronic device may fix the virtually-shifted view point so that the first input 1410 is maintained even though the first input 1410 and the second input (not shown) are not continuously maintained. In other words, even without continuously maintaining the first input 1410 and the second input (not shown), the electronic device may keep displaying, on the display, the second image data or the second virtual image data 1400*b* obtained or generated at the virtually-shifted view point.

Referring to FIG. 14C, according to an embodiment of the present disclosure, upon detecting the first input 1410 generated at a point on the display screen by the user through an input sensor (e.g., the touch sensor 421 or the pressure sensor 425 of the input sensor 420) of the electronic device while displaying the first image data obtained at the current view point of the electronic device or the first virtual image data (not shown) generated based on the first image data, the electronic device may make a change to the virtually-shifted view point corresponding to the first input 1410.

For example, referring to FIG. 14C, upon detecting the first input 1410 to one point on the display screen by the user while displaying the first image data or first virtual image data (not shown) obtained or generated at the current view point, the electronic device may make a change to the virtually-shifted view point where the view point layer has virtually changed from the current view point of the electronic device to an omniscient view point corresponding to the first input 1410 while the first input 1410 is maintained. The electronic device may display, on the display, the second image data obtained at the virtually-shifted view point, e.g., the omniscient view point, or the second virtual image data 1400*c* generated based on the second image data.

Figure 15A:
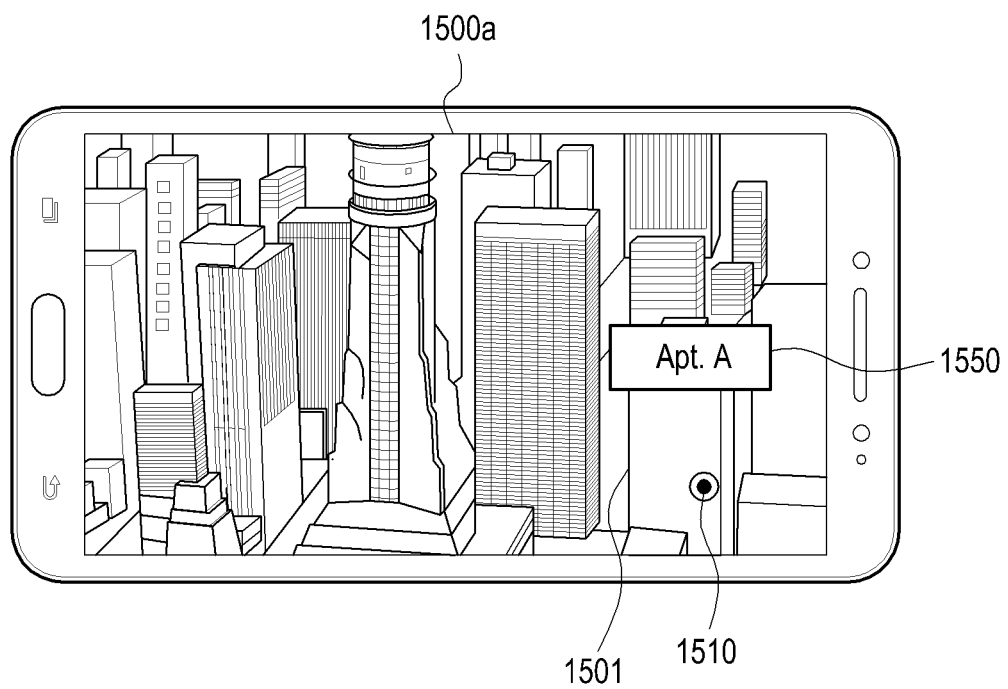
FIGS. 15A, 15B, 15C, 15D, and 15E are user interface screens of an electronic device according to various embodiments of the present disclosure.
Figure 15B:
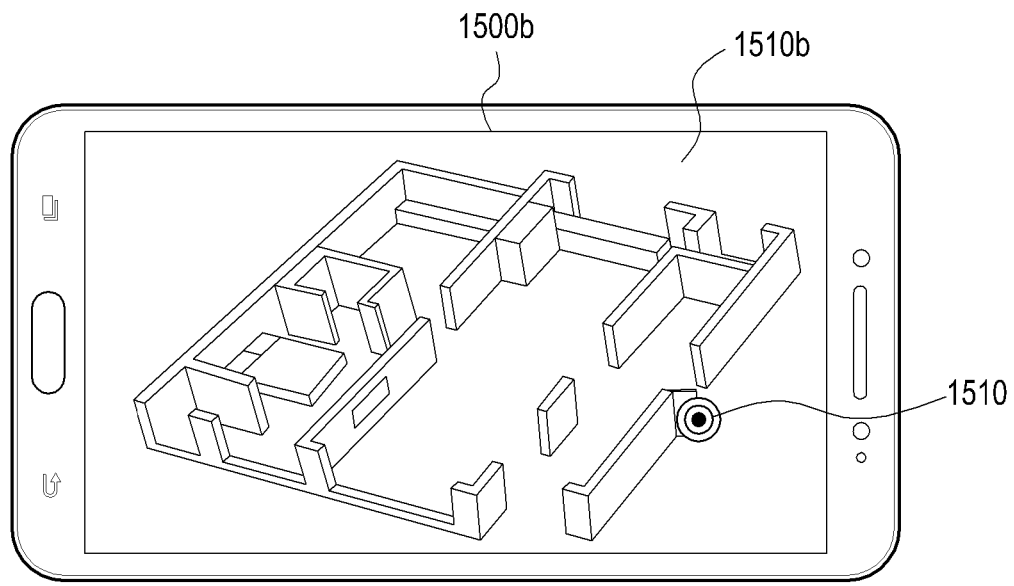
Figure 15C:
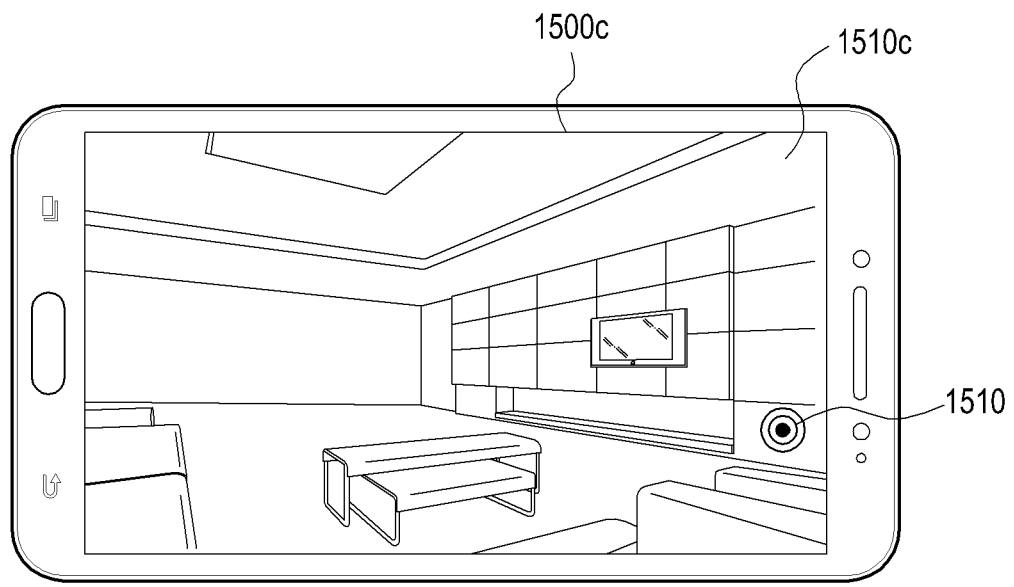

FIGS. 15A, 15B, and 15C are user interface screens of an electronic device according to an embodiment of the present disclosure. The input shown in FIGS. 15A to 15E may be a pressure input. The depth (e.g., a view point layer, degree of transparency or color) of the virtually-shifted view point may be adjusted corresponding to the level, i.e., strength, of the pressure input.

Referring to FIG. 15A, upon running an application related to a reality service, such as VR or AR, an electronic device (e.g., the electronic device 401) may display, on a display (e.g., the display 440) of the electronic device, first image data obtained at the current view point or first virtual image data 1500a generated based on the first image data. The electronic device may recognize at least one object (e.g., a building 1501) within the first image data or the first virtual image data 1500a. The first image data or the first virtual image data 1500a may include an area 1550 displaying information (e.g., at least one of the name, size, height, area, use, number of floors, use guide, or a combination thereof) related to the at least one object 1501 recognized. When a first input 1510 for each recognized object 1501 is generated by the user while the first image data or the first virtual image data 1500a is displayed, the electronic device may make a change to the virtually-shifted view point corresponding to the first input 1510.

Referring to FIGS. 15B and 15C, when there is the first input 1510 corresponding to any one object (e.g., the building 1501) of the at least one object recognized within the first image data or the first virtual image data 1500a (refer to FIG. 15A), there may occur a change to the virtually-shifted view point where the view point layer has shifted from the current view point to the view point of the object 1501 corresponding to the first input 1510 while the first input 1510 is maintained.

For example, as shown in FIG. 15B, when the first input 1510 corresponding to the object 1501 is entered while the first image data or the first virtual image data 1500a (refer to FIG. 15A) is displayed, the electronic device may display, on the display, second image data obtained at a first virtually-shifted view point where the view point layer for the view point of the object 1501 has been changed by the depth corresponding to the corresponding level from the current view point corresponding to the level of the first input 1510 while the first input 1510 is maintained and second virtual image data 1500b generated based on the second image data.

According to an embodiment of the present disclosure, where the level of the first input 1510 shown in FIG. 15B is a first level, there may occur a change to the first virtually-shifted view point where the view point layer for the object 1501 has virtually been one step shifted to the inside by the first depth from the current view point corresponding to the first level. The first depth may previously be set to, e.g., the view point layer that has virtually been one step shifted to the inside from the current view point. For example, the second image data or the second virtual image data 1500b may be image data obtained or generated at the first virtually-shifted view point where the view point layer has virtually been one-depth shifted to the inside from the current view point. The second image data or second virtual image data 1500b obtained or generated at the first virtually-shifted view point may be information obtained from at least one of the memory (e.g., the memory 450) of the electronic device or at least one external electronic device (e.g., a 3D map server or BIM server), and the obtained information may include at least one of BIM information or indoor map information about the corresponding object 1501 (e.g., Apt. 1). In FIG. 15B, the second image data or the second virtual image data 1500b may be information about the object 1501. For example, an internal structure view of the object 1501 (e.g., Apt. 1) may be displayed on the display.

As shown in FIG. 15C, when the first input 1510 corresponding to the object 1501 is entered while the first image data or the first virtual image data 1500a (refer to FIG. 15A) is displayed, the electronic device may display, on the display, third image data obtained at a second virtually-shifted view point where the view point layer for the view point of the object 1501 has been changed by the depth corresponding to the corresponding level from the current view point corresponding to the level of the first input 1510 while the first input 1510 is maintained and third virtual image data 1500c generated based on the third image data.

According to an embodiment of the present disclosure, where the level of the first input 1510 shown in FIG. 15C is a level (e.g., a second level) larger than the level (e.g., the first level) of the first input 1510 shown in FIG. 15B, there may occur a change to a second virtually-shifted view point where the view point layer for the object 1501 has virtually been two-step shifted to the inside by the second depth from the current view point corresponding to the second level. The second depth may previously be set to, e.g., the view point layer that has virtually been one step shifted to the inside from the first virtually-shifted view point. For example, the third image data or the third virtual image data 1500c shown in FIG. 15C may be image data obtained or generated at the second virtually-shifted view point where the view point layer has virtually been two-depth shifted to the inside from the current view point. The third image data or third virtual image data 1500c obtained or generated at the second virtually-shifted view point may be information obtained from at least one of the memory of the electronic device or at least one external electronic device (e.g., a 3D map server or BIM server), and the obtained information may include at least one of BIM information or indoor map information about the corresponding object 1501 (e.g., Apt. 1). In FIG. 15C, the third image data or the third virtual image data 1500c may be information about the object 1501. For example, an actual inside picture of the object 1501 (e.g., Apt. 1) may be displayed on the display.

In FIGS. 15B and 15C, when the first input 1510 is released, the electronic device may return to the current view point, displaying on the display the first image data or first virtual image data 1500a (refer to FIG. 15A) obtained or generated at the current view point.

In FIGS. 15B and 15C, when the first input 1510 is stepwise or continuously entered according to the level of the first input 1510, the electronic device may stepwise or continuously display, on the display, the image data obtained or generated at the second virtually-shifted view point (e.g., the third image data or the third virtual image data 1510c (refer to FIG. 15C)) and the image data obtained at the first virtually-shifted view point (e.g., the second image data or the second virtual image data 1510b (refer to FIG. 15B) in order or in an opposite order. Further, when the first input 1510 is stepwise or continuously released according to the level of the first input 1510, the electronic device may stepwise or continuously display, on the display, the third image data or third virtual image data 1500c (refer to FIG. 15C) at the second virtually-shifted view point, the second image data or second virtual image data 1500b (refer to FIG. 15B) at the first virtually-shifted view point, and the first image data or first virtual image data 1500a (refer to FIG. 15A) obtained or generated at the current view point to which the electronic device returns.

Figure 15D:
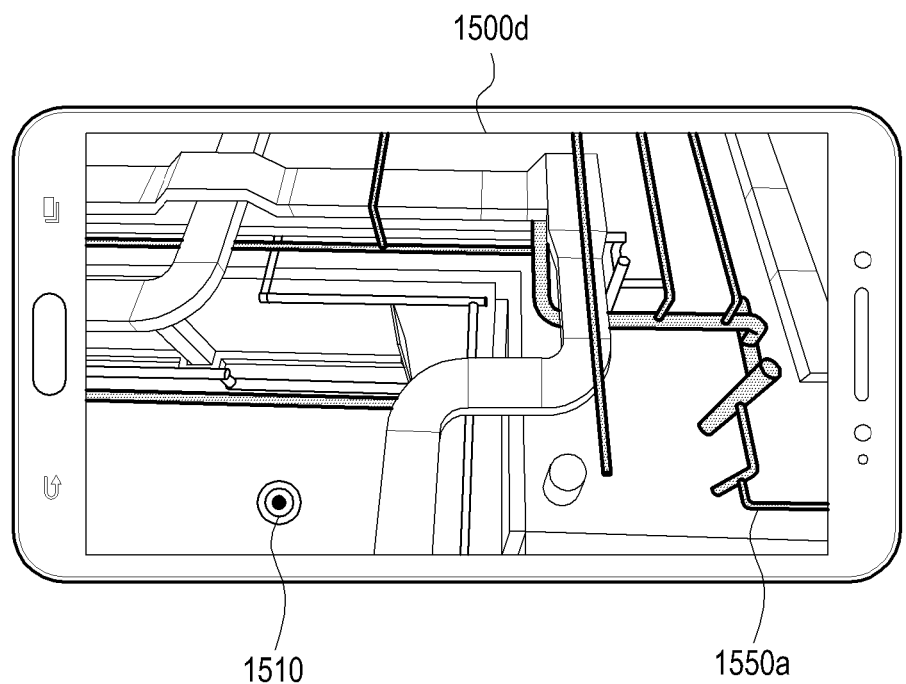
Figure 15E:
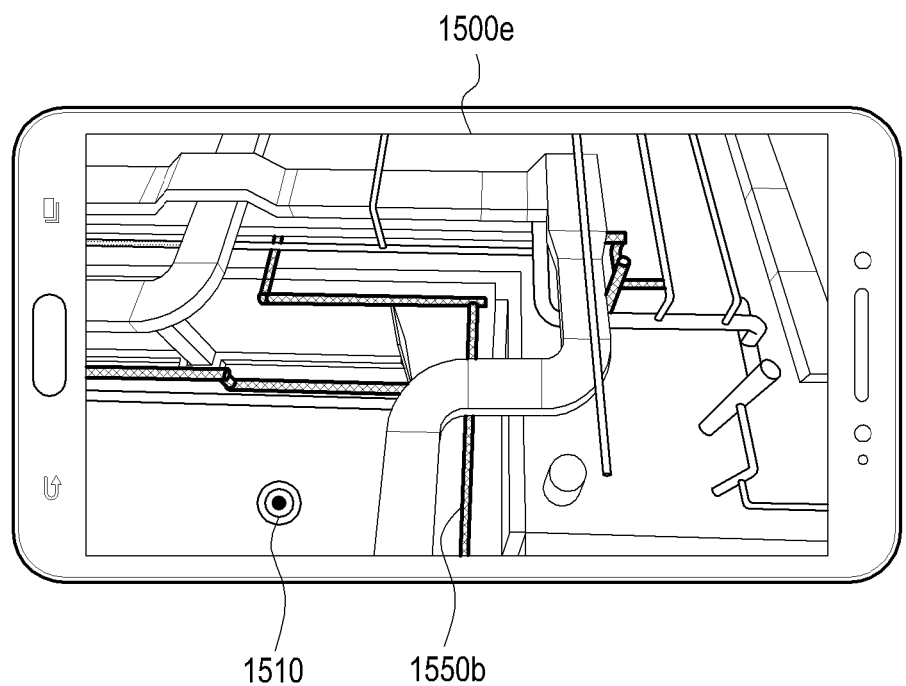

Referring to FIGS. 15D and 15E, when there is the first input 1510 corresponding to any one object (e.g., the building 1501) of the at least one object recognized within the first image data or the first virtual image data 1500a (refer to FIG. 15A), there may occur a change to the virtually-shifted view point where at least one of the degree of transparency or color of the object 1501 has been changed corresponding to the first input 1510 while the first input 1510 is maintained.

For example, as shown in FIG. 15D, when the first input 1510 corresponding to the object 1501 is entered while the first image data or the first virtual image data 1500a (refer to FIG. 15A) is displayed, the electronic device may display, transparently or in a particular color on the display, at least a portion 1500d of fourth image data obtained at the first virtually-shifted view point where at least one of the degree of transparency or color for the object 1510 has been changed by the depth corresponding to the corresponding level from the current view point corresponding to the level of the first input 1510 while the first input 1510 is maintained and fourth virtual image data generated based on the fourth image data.

According to an embodiment of the present disclosure, the level of the first input 1510 shown in FIG. 15D is assumed to be the first level in which case the electronic device may make a change to the first virtually-shifted view point where the degree of transparency or color for the object 1501 has been one-step changed from the current view point by the first depth corresponding to the first level. The first depth may previously be set to, e.g., a view point where at least one of the degree of transparency or color of a portion (e.g., a first area 1550a) of the object 1501 corresponding to the first depth has been changed from the current view point. For example, the first area 1550a may be a first pipe (e.g., a water pipe). For example, the at least portion 1500d of the fourth image data or the fourth virtual image data may be at least a portion of image data obtained or generated at the first virtually-shifted view point where at least one of the degree of transparency or color of the first area 1550a of the object 1501 has been changed by one depth from the current view point.

As shown in FIG. 15E, when the first input 1510 corresponding to the object 1501 is entered while the first image data or the first virtual image data 1500a (refer to FIG. 15A) is displayed, the electronic device may display, transparently or in a particular color on the display, at least a portion 1500e of fifth image data obtained at the second virtually-shifted view point where at least one of the degree of transparency or color for the object 1510 has been changed by the depth corresponding to the corresponding level from the current view point corresponding to the level of the first input 1510 while the first input 1510 is maintained and fifth virtual image data generated based on the fifth image data.

According to an embodiment of the present disclosure, the level of the first input 1510 shown in FIG. 15E is assumed to be a level (e.g., a second level) larger than the level (e.g., the first level) of the first input 1510 shown in FIG. 15D in which case the electronic device may make a change to the second virtually-shifted view point where the degree of transparency or color for the object 1501 has been two-step changed by the second depth from the current view point corresponding to the second level. The second depth may previously be set to, e.g., a view point where at least one of the degree of transparency or color of a portion (e.g., a second area 1550b) of the object 1501 corresponding to the second depth has been changed from the current view point. For example, the second area 1550b may be a second pipe (e.g., a gas pipe). For example, the at least portion 1500e of the fifth image data or the fifth virtual image data may be at least a portion of image data obtained or generated at the second virtually-shifted view point where at least one of the degree of transparency or color of the second area 1550b of the object 1501 has been two-depth changed from the current view point.

According to an embodiment of the present disclosure, the second area 1550b of the object 1501 shown corresponding to the second level of the first input 1510 may be configured to show a more detailed or specific area than the first area 1550a (refer to FIG. 15D) of the object 1501 shown corresponding to the first level of the first input 1510.

In FIGS. 15D and 15E, when the first input 1510 is released, the electronic device may return to the current view point, displaying on the display the first image data or first virtual image data 1500a (refer to FIG. 15A) obtained at the current view point.

In FIGS. 15D and 15E, when the first input 1510 is stepwise or continuously entered according to the level of the first input 1510, the electronic device may stepwise or continuously display, on the display, the image data obtained or generated at the second virtually-shifted view point (e.g., at least a portion 1500e of the fifth image data or the fifth virtual image data as shown in FIG. 15E) and the image data obtained at the first virtually-shifted view point (e.g., the fifth image data or the fifth virtual image data 1500d shown in FIG. 15D) in order or in an opposite order. Further, when the first input 1510 is stepwise or continuously released according to the level of the first input 1510, the electronic device may stepwise or continuously display, on the display, at least a portion 1500e (refer to FIG. 15E) of the fifth image data or fifth virtual image data at the second virtually-shifted view point, at least a portion 1500d (refer to FIG. 15D) of the fourth image data or fourth virtual image data at the first virtually-shifted view point, and the first image data or first virtual image data 1500a (refer to FIG. 15A) obtained or generated at the current view point to which the electronic device returns.

Although examples in which the inputs (e.g., the first input 1510) is pressure inputs are described above in connection with FIGS. 15A to 15E, embodiments of the present disclosure are not limited thereto. For example, the inputs may include other various types of inputs, such as touch inputs, swipe inputs, drag inputs, or drag-and-drop inputs.

The term 'module' may refer to a unit including one of hardware, software, and firmware, or a combination thereof. The term 'module' may be interchangeably used with a unit, logic, logical block, component, or circuit. The module may be a minimum unit or part of an integrated component. The module may be a minimum unit or part of performing one or more functions. The module may be implemented mechanically or electronically. For example, the module may include at least one of application specific integrated circuit (ASIC) chips, field programmable gate arrays (FPGAs), or programmable logic arrays (PLAs) that perform some operations, which have already been known or will be developed in the future.

According to an embodiment of the present disclosure, at least a part of the device (e.g., modules or their functions) or method (e.g., operations) may be implemented as instructions stored in a computer-readable storage medium e.g., in the form of a program module. The instructions, when executed by at least one processor (e.g., the processor 120), may enable the processor to carry out a corresponding function. The computer-readable storage medium may be e.g., the memory 130.

The computer-readable storage medium may include a hardware device, such as hard discs, floppy discs, and magnetic tapes (e.g., a magnetic tape), optical media such as compact disc ROMs (CD-ROMs) and digital versatile discs (DVDs), magneto-optical media such as floptical disks, ROMs, RAMs, flash memories, and/or the like. Examples of the program instructions may include not only machine language codes but also high-level language codes which are executable by various computing means using an interpreter. The aforementioned hardware devices may be configured to operate as one or more software modules to carry out various embodiments of the present disclosure, and vice versa.

Modules or programming modules in accordance with various embodiments of the present disclosure may include at least one or more of the aforementioned components, omit some of them, or further include other additional components. Operations performed by modules, programming modules or other components in accordance with various embodiments of the present disclosure may be carried out sequentially, simultaneously, repeatedly, or heuristically. Furthermore, some of the operations may be performed in a different order, or omitted, or include other additional operation(s).

According to an embodiment of the present disclosure, there is provided a storage medium storing commands configured to be executed by at least one processor to enable the at least one processor to perform at least one operation, wherein the at least one operation may include obtaining image data using an image sensor, displaying, on a display, the image data obtained using the image sensor, determining an input to a point in the displayed image data, and displaying pre-obtained image data corresponding to the input on the display.

According to an embodiment of the present disclosure, there is provided a storage medium storing commands configured to be executed by at least one processor to enable the at least one processor to perform at least one operation, wherein the at least one operation may include obtaining image data, determining a current view point of the electronic device based on the obtained image data, when an input is detected while displaying a first virtual image generated at the determined current view point, determining a virtually-shifted view point of the electronic device corresponding to the detected input, and displaying a second virtual image generated at the determined virtually-shifted view point.

As is apparent from the foregoing description, according to the embodiments of the present disclosure, an electronic device that provides a reality service environment, such as VR and/or AR, may provide a user with a service through the user's pressure input as well as a touch input. For example, there may be provided an intuitive UI/UX corresponding to at least one of the type, position, magnitude (or strength), duration, number of times, or direction of an input through the pressure sensor and/or touch sensor of the electronic device. Thus, the learning required for the user in a reality service, such as VR or AR, may be minimized, and the user's convenience and usability of the electronic device may be enhanced.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
   an image sensor configured to obtain image data;
   a communication circuit configured to receive information related to the obtained image data from at least one external electronic device;
   a display configured to output at least a portion of the obtained image data or the information related to the obtained image data;
   an input sensor configured to detect at least one input; and
   at least one processor configured to:
      determine a current view point of the electronic device based on first image data obtained from the image sensor,
      identify a first input detected through the input sensor while a first virtual image associated with the first image data is displayed on the display,
      identify an attribute corresponding to the first input based on sensor data obtained from the input sensor, the attribute corresponding to the first input including at least one of an input type, an input position, an input magnitude, an input strength, an input duration, an input count, or an input direction,
      identify a portion of the first virtual image corresponding to the first input,
      determine a virtually-shifted view point of the electronic device based on the attribute corresponding to the first input, the identified portion of the first virtual image, and the current view point of the electronic device,
      calculate a position displacement of the electronic device corresponding to a position displacement from the current view point to the virtually-shifted view point,
      detect a virtually shifted position of the electronic device based on the calculated position displacement of the electronic device,
      obtain second image data from at least one of the image sensor or the at least one external electronic device, the second image data being associated with the detected virtually shifted position of the electronic device,
      recognize at least one second object in the second image data,
      obtain second information related to the at least one second object recognized from the second image data,
      generate a second virtual image corresponding to the virtually-shifted view point of the electronic device based at least in part on the first image data, the second image data, or the second information,
      in response to generating the second virtual image, control the display to continuously display the second virtual image while the first input is maintained, and
      control the display to display the first virtual image if the first input is not maintained.

2. The electronic device of claim 1,
   wherein the at least one processor is further configured to:
      detect a position of the electronic device from which the first image data has been obtained, and
   wherein, to determine the current view point of the electronic device, the at least one processor is further configured to:
      determine the current view point of the electronic device further based on the detected position of the electronic device.

3. The electronic device of claim 1, wherein the at least one processor is further configured to:
   recognize at least one first object in the first image data,
   obtain first information related to the at least one first object recognized in the first image data, generate the first virtual image corresponding to the current view point based on the obtained first information related to the at least one first object recognized in the first image data, and control the display to display the first virtual image.

4. The electronic device of claim 3, wherein, in a case that the identified portion of the first virtual image includes the at least first object, the at least one processor is further configured to change an attribute of the at least one first object based on the obtained first information.

5. The electronic device of claim 4, wherein the attribute of the at least one first object includes a degree of transparency.

6. The electronic device of claim 1, wherein the at least one processor is further configured to:

receive, via the input sensor, an indication that a second input is received while the second virtual image is displayed on the display, determine a virtually direction-changed view point redirected with respect to the virtually-shifted view point based on an attribute of the second input based on the indication received from the input sensor, calculate a variation in an altitude or direction of the electronic device from the virtually-shifted view point to the virtually direction-changed view point to determine at least one of a virtual changed altitude or a virtual changed direction of the electronic device, obtain, from at least one of the image sensor or the at least one external electronic device, third image data associated with at least one of the detected virtual changed altitude or virtual changed direction of the electronic device, recognize at least one third object in the third image data associated with at least one of the detected virtual changed altitude or virtual changed direction of the electronic device, obtain third information related to the at least one third object recognized from the third image data, generate a third virtual image corresponding to the virtually direction-changed view point based on at least a portion of the third image data or the third information related to the at least one third object recognized from the third image data, and control the display to display the generated third virtual image.

7. The electronic device of claim 6, wherein the attribute of the second input includes at least one of an input position or an input direction.

8. The electronic device of claim 1, wherein the at least one processor is further configured to:

receive, from the input sensor, an indication that a second input is received while the second virtual image is displayed on the display, and fix the virtually-shifted view point based on the second input.

9. A method for controlling an electronic device, the method comprising:

obtaining image data;

determining a current view point of the electronic device based on the obtained image data;

identifying a first input is detected through an input sensor while a first virtual image associated with the obtained image data is displayed on a display;

identifying an attribute corresponding to the first input based on sensor data obtained from an input sensor, the attribute corresponding to the first input including at least one of an input type, an input position, an input magnitude, an input strength, an input duration, an input count, or an input direction;

identifying a portion of the first virtual image corresponding to the first input;

determining a virtually-shifted view point of the electronic device based on the attribute corresponding to the first input, the identified portion of the first virtual image, and the current view point of the electronic device;

calculating a position displacement of the electronic device corresponding to a position displacement from the current view point to the virtually-shifted view point;

detecting a virtually shifted position of the electronic device based on the calculated position displacement of the electronic device;

obtaining second image data from at least one of the image sensor or an external electronic device, the second image data being associated with the detected virtually shifted position of the electronic device;

recognizing at least one second object in the second image data;

obtaining second information related to the at least one second object recognized from the second image data;

generating a second virtual image corresponding to the virtually-shifted view point of the electronic device based at least in part on the first image data, the second image data, or the second information;

in response to generating the second virtual image, continuously displaying a second virtual image while the first input is maintained; and if the first input is not maintained, displaying the first virtual image.

10. The method of claim 9, wherein the determining of the current view point of the electronic device based on the obtained image data further comprises:

detecting a position of the electronic device from which the image data has been obtained; and determining the current view point of the electronic device based on the detected position of the electronic device.

* * * * *